US012688648B2

(12) United States Patent
Mammou et al.

(10) Patent No.: US 12,688,648 B2
(45) Date of Patent: Jul. 21, 2026

(54) MOTION COMPRESSION FOR EFFICIENT DYNAMIC MESH CODING

(71) Applicant: Apple Inc., Cupertino, CA (US)

(72) Inventors: Khaled Mammou, Danville, CA (US); Alexandros Tourapis, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 628 days.

(21) Appl. No.: 18/166,179

(22) Filed: Feb. 8, 2023

(65) Prior Publication Data

US 2023/0290010 A1 Sep. 14, 2023

Related U.S. Application Data

(60) Provisional application No. 63/368,793, filed on Jul. 19, 2022, provisional application No. 63/269,211, filed on Mar. 11, 2022, provisional application No. 63/269,219, filed on Mar. 11, 2022, provisional application No. 63/269,217, filed on Mar. 11, 2022, (Continued)

(51) Int. Cl.
| | |
|---|---|
| *G06T 9/00* | (2006.01) |
| *G06T 15/04* | (2011.01) |
| *G06T 17/20* | (2006.01) |
| *G06V 10/25* | (2022.01) |

(52) U.S. Cl.
CPC .............. *G06T 17/20* (2013.01); *G06T 15/04* (2013.01); *G06T 17/205* (2013.01); *G06V 10/25* (2022.01); *G06T 9/001* (2013.01); *G06T 2200/04* (2013.01)

(58) Field of Classification Search
None
See application file for complete search history.

(56) References Cited

U.S. PATENT DOCUMENTS

| | | | |
|---|---|---|---|
| 883,136 | A | 3/1908 | Johnson |
| 6,046,744 | A | 4/2000 | Hoppe |

(Continued)

FOREIGN PATENT DOCUMENTS

| | | | | |
|---|---|---|---|---|
| EP | 3882859 A1 | 9/2021 | | |
| WO | WO-2020123252 A1 * | 6/2020 | ............. | G06T 9/001 |

OTHER PUBLICATIONS

Don Fussell; "Subdivision Curves", University of Texas at Austin, CS384G Computer Graphics Course—Lecture 17—Fall 2010; 20 pgs. [retrieved from https://www.cs.utexas.edu/users/fussell/courses/cs384g-fall2011/lectures/lecture17-Subdivision_curves.pdf].

(Continued)

*Primary Examiner* — Thomas D Lee
(74) *Attorney, Agent, or Firm* — Fletcher Yoder, P.C.

(57) ABSTRACT
A method of encoding motion data associated with an input data corresponding to set of 3D meshes M(i), the motion data including at least one of geometry and vertex attribute changes from one frame to another, can include: dividing input mesh M(i) into a set of patches P(i, j), each patch P(i, j) corresponding to a corresponding patch P(k, l) in a previously encoded reference frame; quantizing at least one of vertices and attributes of each patch P(i, j); predicting residuals based on a difference between quantized vertices or attributes of each patch P(i, j) with respect to corresponding patch P(k, l) in the previously encoded reference frame; and entropy encoding the predicted residuals.

26 Claims, 38 Drawing Sheets
(13 of 38 Drawing Sheet(s) Filed in Color)

Related U.S. Application Data provisional application No. 63/269,214, filed on Mar. 11, 2022, provisional application No. 63/269,218, filed on Mar. 11, 2022, provisional application No. 63/269,213, filed on Mar. 11, 2022.

(56) References Cited

U.S. PATENT DOCUMENTS

| | | | |
|---|---|---|---|
| 6,047,088 | A | 4/2000 | van Beek |
| 6,573,890 | B1 | 6/2003 | Lengyel |
| 6,801,215 | B1 | 10/2004 | Silva |
| 8,665,267 | B2 | 3/2014 | Joshi |
| 9,442,905 | B1 | 9/2016 | Kawaguchi |
| 10,861,233 | B1 | 12/2020 | De Goes |
| 11,100,721 | B1 | 8/2021 | Bois |
| 2004/0090438 | A1 | 5/2004 | Alliez |
| 2007/0053435 | A1 | 3/2007 | Kirenko |
| 2007/0081593 | A1 | 4/2007 | Jeong |
| 2008/0031325 | A1 | 2/2008 | Qi |
| 2008/0036760 | A1 | 2/2008 | Smith |
| 2008/0181522 | A1 | 7/2008 | Hosaka |
| 2009/0168880 | A1 | 7/2009 | Jeon |
| 2010/0036647 | A1 | 2/2010 | Reem |
| 2017/0140631 | A1 | 5/2017 | Pietrocola |
| 2017/0208417 | A1 | 7/2017 | Thakur |
| 2017/0287112 | A1 | 10/2017 | Stafford |
| 2018/0152688 | A1 | 5/2018 | Graziosi |
| 2019/0213778 | A1 | 7/2019 | Du |
| 2020/0050965 | A1 | 2/2020 | Harvill |
| 2020/0098137 | A1 | 3/2020 | Hemmer |
| 2020/0211230 | A1 | 7/2020 | Zhao |
| 2020/0219323 | A1 | 7/2020 | Varshney |
| 2020/0265552 | A1 | 8/2020 | Hemmer |
| 2020/0265611 | A1 | 8/2020 | Hemmer |
| 2020/0286261 | A1 | 9/2020 | Faramarzi |
| 2020/0327719 | A1 | 10/2020 | Mason |
| 2021/0014522 | A1 | 1/2021 | Jung |
| 2021/0217203 | A1* | 7/2021 | Kim .................... G06T 9/001 |
| 2022/0108482 | A1 | 4/2022 | Graziosi |
| 2022/0108483 | A1 | 4/2022 | Graziosi |
| 2022/0164994 | A1 | 5/2022 | Joshi |
| 2022/0329886 | A1 | 10/2022 | Phillips |
| 2023/0169732 | A1 | 6/2023 | Wickramasinghe |
| 2023/0171427 | A1 | 6/2023 | Bachhuber |
| 2023/0297737 | A1 | 9/2023 | Beriot |

OTHER PUBLICATIONS

Sweldens et al.: "Morning Section: Introductory Material—Building Your Own Wavelets at Home"; Chapter 1 [retrieved from http://www.mat.unimi.it/users/naldi/lifting.pdf].
Garland et al.; "Surface Simplification Using Quadric Error Metrics"; 8 pgs. [retrived from https://www.cs.cmu.edu/~garland/Papers/quadrics.pdf].
Wikipedia—Subdivision surface ; 5 pgs.[retrieved from https://en.wikipedia.org/wiki/Subdivision_surface].
Rahul Sheth; "Open 3D Graphics Compression" ; 2 pgs.[retrieved from https://github.com/amd/rest3d/tree/master/server/o3dgc].
Draco 3D Data Compression; 3 pgs. [retrieved from https://google.github.io/draco/].
Peng et al.; "Technologies for 3D mesh compression: A survey"; J. Vis. Commun. Image R. 16 (2005) pp. 688-733 [retrieved on http://mcl.usc.edu/wp-content/uploads/2014/01/200503-Technologies-for-3D-triangular-mesh-compression-a-survey.pdf].
Maglo et al.; "3D mesh compression: survey, comparisons and emerging trends"; ACM Computing Surveys, vol. 9, No. 4, Article 39, Publication date: Sep. 2013; 40 pgs. [retrieved from https://perso.liris.cnrs.fr/glavoue/travaux/revue/CSUR2015.pdf].
Wikipedia—Z-order curve; 8 pgs. [retrieved from https://en.wikipedia.org/wiki/Z-order_curve].
"Smoothing"; 55 pgs. [retrieved from https://graphics.stanford.edu/courses/cs468-12-spring/LectureSlides/06_smoothing.pdf].

Liu et al.; "Seamless: Seam erasure and seam-aware decoupling of shape from mesh resolution"; CraGL Computational Reality Creativity and Graphics Lab; 4 pgs. [retrieved from https://cragl.cs.gmu.edu/seamless/].
Sebastian Sylvan, "Fixing Texture Seam With linear Least-Squares"; [retrieved from https://www.sebastiansylvan.com/post/LeastSquaresTextureSeams/].
Michael Bunnell; "Chapter 7. Adaptive Tessellation of Subdivision Surfaces with Displacement Mapping"; Nvidia—GPU Gems 2; 16 pgs. [retrieved from https://developer.nvidia.com/gpugems/gpugems2/part-i-geometric-complexity/chapter-7-adaptive-tessellation-subdivision-surfaces].
Schafer et al.; Dynamic Feature-Adaptive Subdivision; 8 pgs. [retrieved from https://niessnerlab.org/papers/2015/0dynamic/schaefer2015dynamic.pdf].
Pakdel, et al.; "Incremental adaptive loop subdivision" ; Computational Science and Its Applications—ICCS, vol. 3045; May 2004; pp. 237-246 [ retrieved from https://giv.cpsc.ucalgary.ca/publication/c5/].
Jiang et al.; "Rate-distortion Optimized Trellis-Coded Quantization"; IEEE ICME 2007; 4 plgs. [retrieved from https://projet.liris.cnrs.fr/imagine/pub/proceedings/ICME-2007/pdfs/0000468.pdf].
G.J.Sullivan: "Adaptive Quantization Encoding Technique Using an Equal Expected-value Rule", Joint Video Team, JVT-N011, Hong Kong (Jan. 2005); https://www.google.com/url?sa=t&rct=j&q=&esrc=s&source=web&cd=&ved=2ahUKEwitIP7t46P2AhXBJkQIHRQhDp8QFnoECAcQAQ&url=https%3A%2F%2Fwww.itu.int%2Fwftp3%2Fav-arch%2Fjvt-site%2F2005_01_HongKong%2FJVT-N011.doc&usg=AOvVaw0BvZVSEpKnTznCpBKWIvBn.
Jerry O. Talton III; "A Short Survey of Mesh Simplification Algorithms"; Course Notes for CS 598 MJG, Oct. 2004, Univity of Illinois at Urbana-Champaign; 8 pgs. [retrieved from http://jerrytalton.net/research/t-ssmsa-04/paper.pdf].
https://graphics.stanford.edu/courses/cs468-10-fall/LectureSlides/08_Simplification.pdf.
Floater et al.: "Surface Parameterization: a Tutorial and Survey"; 30 pgs. [retrieved from https://graphics.stanford.edu/courses/cs468-05-fall/Papers/param-survey.pdf].
Snyder et al.; "Iso-charts: sstretch-driven mesh parameterization using spectral analysis"; Computer Science, Eurographics Symposium on Geometric Processing, Jul. 8, 2004 [retrieved from https://www.semanticscholar.org/paper/Iso-charts%3A-stretch-driven-mesh-parameterization-Zhou-Snyder/27b260713ad9802923aec06963cd5f2a41c4e20a].
Leby et al.; "Least Squares Conformal Maps for Automatic Texture Atlas Generation"; ISA, France; 10 pgs. [retrieved from https://members.loria.fr/Bruno.Levy/papers/LSCM_SIGGRAPH_2002.pdf].
Open Subdiv Introductions; Pixar; [retrieved from https://graphics.pixar.com/opensubdiv/docs/intro.html].
How to compute mesh normals; New York University courses Fall 2002 [retrieved from https://cs.nyu.edu/~perlin/courses/fall2002/meshnormals.html].
Changkun Ou; "Geometry Processing—3 Smoothing"; Ludwig-Maximilians-Universitat—Munich; 63 pgs. [retrieved from https://www.medien.ifi.lmu.de/lehre/ws2122/gp/slides/gp-ws2122-3-smooth.pdf].
Li et al.; "Global Correspondence Optimization for Non-Rigid Registration of Depth Scans"; Applied Geometry Group, ETCH Zurich; The Eurographics Association and Blackwell Publishing Ltd.; 2008 [ retrieved from https://lgg.epfl.ch/publications/2008/sgp2008GCO.pdf].
Yao et al.; "Quasi-Newton Solver for Robust Non-Rigid Registration" Computer Science-Computer Vision and Pattern Recognition, Apr. 9, 2020 [retrieved on https://arxiv.org/abs/2004.04322].
Sumner et al.; "Embedded Deformation for Shape Manipulation"; Applied Geometry Group, ETH Zurich, 7 pgs. [retrieved from https://people.inf.ethz.ch/~sumnerb/research/embdef/Sumner2007EDF.pdf].
Rambo; "The Conjugate Gradient Method for Solving Linear Systems of Equations"; Department of Mathematics, Saint Mary's

(56)           References Cited

OTHER PUBLICATIONS

College of California, May 2016 [retrieved from http://math.stmarys-ca.edu/wp-content/uploads/2017/07/Mike-Rambo.pdf].

Khalid Sayood; "Adaptive Quantization—Differential Encoding"; [retrieved from https://www.sciencedirect.com/topics/computer-science/adaptive-quantization].

Wikipedia—"Context-adaptive binary arithmetic coding"; [retrieved from https://en.wikipedia.org/wiki/Context-adaptive_binary_arithmetic_coding].

Wikipedia—"Huffman coding"; 2 pgs. [retrieved from https://en.wikipedia.org/wiki/Huffman_coding].

Wikipedia—"Asymmetric numeral systems"; 1 pg. [retrieved from https://en.wikipedia.org/wiki/ Asymmetric_numeral_systems].

Wikipedia—"Universal code (data compression"; 1 pg. [retrieved from https://en.wikipedia.org/wiki/Universal_code_(data_compression)].

https://www.researchgate.net/publication/224359352_Two_Optimizations_of_the_MPEG-4_FAMC_standard_for_Enhanced_Compression_of_Animated_3D_         Meshes/link/0912f50b3802603f34000000/download.

Pakdel et al.; "Incremental Adaptive Loop Subdivision"; 11 pgs. [retrived from https://www.researchgate.net/publication/221434740_Incremental_Adaptive _Loop_Subdivision].

Amresh et al.; "Adaptive Subdivisional Schemes for Triangular Meshes"; 10 pgs. [retrieved from https://www.researchgate.net/publication/2554610_Adaptive_Subdivision_Schemes_for_Triangular_Meshes/link/546e58c30cf2b5fc176074c3/download].

Settgast et al.; "Adaptive Tesselation of Subdivision Surfaces in Open SG"; 9 pgs. [retrieved from http://diglib.eg.org/bitstream/handle/10.2312/osg20031418/05settgast.pdf].

Brainerd et al.; "Efficient GPU Rendering of Subdivision Surfaces using Adaptive Quadtrees"; 12 pgs. [retrieved from http://www.graphics.stanford.edu/~niessner/brainerd2016efficient.html].

Fisher et al.; "DiagSplit: Parallel, Crack-free, Adaptive Tessellation for Micropolygon Rendering"; 10 pgs. [retrieved from https://www.cs.cmu.edu/afs/cs/academic/class/15869-f11/www/readings/fisher09_diagsplit.pdf].

Lai et al.; "Near-Optimum Adaptive Tessellation of General Catmull-Clark Subdivision Surfaces"; 9 pgs. [retrieved from https://www.researchgate.net/publication/220954613_Near-Optimum_Adaptive_Tessellation_of_General_Catmull-Clark_Subdivision_Surfaces/link/00b7d53ae32d0c726a000000/download].

Wu et al.; "An Accurate Error Measure for Adaptive Subdivision Surfaces"; 6 pgs. [retrieved from https://www.cise.ufl.edu/research/SurfLab/papers/05adapsub.pdf].

Patney et al.; "Parallel View-Dependent Tessellation of Catmull-clark Subdivision Surfaces"; 10 pgs.[retrieved from https://anjulpatney.com/docs/papers/2009_Patney_PVT.pdf].

Schwarz et al.; "Fast GPU-based Adaptive Tessellation with CUDA"; 10 pgs. [retrieved from http://research.michael-schwarz.com/publ/files/cudatess-eg09.pdf].

L. Ibarria et J. Rossignac. Dynapack : space-time compression of the 3D animations of triangle meshes with fixed connectivity. In Eurographics Symposium on Computer Animation, pp. 126-133, San Diego, E'tats-Unis, 2003. https://faculty.cc.gatech.edu/~jarek/papers/Dynapack.pdf.

N. Stefanoski et J. Ostermann. Connectivity-guided predictive compression of dynamic 3D meshes. In IEEE International Conference on Image Processing, pp. 2973-2976, Atlanta, E'tats-Unis, 2006.

J.-H. Yang, C.-S. Kim, et S.-U. Lee. Compression of 3-D triangle mesh sequences based on vertex-wise motion vector prediction. IEEE Transactions on Circuits and Systems for Video Technology, 12(12) :1178-1184, 2002.

N. Stefanoski, P. Klie, X. Liu, et J. Ostermann. Scalable linear predictive coding of time-consistent 3D mesh sequences. In The True Vision—Capture, Transmission and Display of 3D Video, pp. 1-4, Kos Island, Greece, 2007.

N. Stefanoski, X. Liu, P. Klie, et J. Ostermann. Layered predictive coding of time- consistent dynamic 3D meshes using a non-linear predictor. In IEEE International Conference on Image Processing, pp. 109-112, San Antonio, E'tats-Unis, 2007.

V. Libor et S. Vaclav. Coddyac : Connectivity driven dynamic mesh compression. In 3DTV International Conference : True Vision-Capture, Transmission and Display of 3D Video, Kos Island, Greece, 2007.

Final Office Action for U.S. Appl. No. 17/661,193 dated Jun. 12, 2024; 23 pages.

Graziosi et al.; "[V-PCC ]EE2.6-related] Mesh Patch Data", 132; MPEG Meeting; Oct. 12, 2020-Oct. 16, 2020; Online (Motion Picutre Expert Group or ISO/IEC JTC1/SC29/WG11); Oct. 7, 2020, XP030292889 [retrieved from internet—https://dms.mpeg.expert/doc_end_user/documents/132_OnLine/wg11/m55368-v1-m55368_mesh_patch_data.zip—retrieved on Oct. 7, 2020]; 14 pgs.

Ma et al.; "Meshes Simplification Based on Reverse Subdivision", Nov. 29, 2006, SAT 2015 18th International Conference, Austin, TX, Sep. 24-27, 2015; XP047402200; 12 pgs.

Sadeghi et al.; "Smooth reverse Subdivision"; Computers and Graphics, Elsevier, GB, vol. 33, No. 3, Jun. 1, 2009; pp. 217-225, XP026448476.

Juergen et al.; "Clarification of N18979 EIF Specification Regarding Absolute Waveform Lebelling", 130. MPEG Meeting; Apr. 20, 2020-Apr. 24, 2020; Alpbach (Motion Picture Expert Group or ISO/IEC JTCI/SC29/WG11), No. M53584, XP030287217 [retrieved from the internet—http://phenix.int-every.fr/mpeg/doc_end_user/documents/130_Alpbach/wg11/m5354-v1-m53584-(Clarification_N18979).zip—retrieved on Apr. 10, 2020].

International Search Report and Written Opinion for PCT Application No. PCT/US2023/014617, dated Apr. 24, 2023; 18 pgs.

M. Sattler, R. Sarlette, et R. Klein. Simple and efficient compression of animation sequences. In Eurographics Symposium on Computer Animation, pp. 209-217, Los Angeles, E'tats-Unis, 2005.

I. Guskov et A. Khodakovsky. Wavelet compression of parametrically coherent mesh sequences. In Eurographics Symposium on Computer Animation, pp. 183-192, Grenoble, France, 2004.

J.W. Cho, M.S. Kim, S. Valette, H.Y. Jung, et R. Prost. 3D dynamic mesh compression using wavelet-based multiresolution analysis. In IEEE International Conference on Image Processing, pp. 529-532, Atlanta, E'tats-Unis, 2006.

K. Mamou, T. Zaharia, F. Preteux, A skinning approach for dynamic 3D mesh com-pression, Computer Animation and Virtual Worlds, vol. 17(3-4), Jul. 2006, p. 337-346.

K. Mamou, N. Stefanoski, H. Kirchhoffer, K. Muller, T. Zaharia, F. Preteux, D. Marpe, J. Ostermann, The new MPEG-4/FAMC standard for animated 3D mesh compression, 3DTV Conference (3DTV-CON 2008), Istanbul, Turkey, May 2008.

K. Mamou, T. Zaharia, F. Preteux, A. Kamoun, F. Payan, M. Antonini. Two optimizations of the MPEG-4 FAMC standard for enhanced compression of animated 3D meshes. IEEE International Conference on Image Processing (2008).

ISO/IEC 23090-5 ISO/IEC Information technology—Coded Representation of Immersive Media—Part 5: Visual Volumetric Video-based Coding (V3C) and Video-based Point Cloud Compression (V-PCC).

K. Mammou, J. Kim, A. Tourapis, D. Podborski, K. Kolarov, "[V-CG] Apple's Dynamic Mesh Coding CfP Response," ISO/IEC JTC1/SC29/WG7/m59281, Online, Apr. 2022.

A. Tourapis, J. Kim, D. Podborski, K. Mammou, "Base mesh data substream format for VDMC ," ISO/IEC JTC1/SC29/WG7/m60362, Online, Jul. 2022.

Pakdel, et al.; "Incremental adaptive loop subdivision"; ICCSA 2004, LNCS 3045, pp. 237-246, 2004 [retrieved from https://giv.cpsc.ucalgary.ca/publication/c5/].

Kraus; "The Pull-Push Algorithm Revisited—Improvements, Computation of Point Densities, and GPU Implementation"; Proceedings of the Fourth International Conference on Computer Graphics THeory and Applications, pp. 179-184; [retrieved from https://www.scitepress.org/Papers/2009/17726/17726.pdf ].

Office Action for U.S. Appl. No. 17/661,193 dated Dec. 7, 2023; 14 pg.

Lee et al.; "Displaced subdivision surfaces", Proceedings of the ACM SIGOPS 28th Symposium on Operating Systems Principles, ACMPUS27, Jul. 1, 2000, pp. 85-94 (XP059025634).

(56) References Cited

OTHER PUBLICATIONS

International Search Report and Written Opinion for PCT Application No. PCT/US2023/014516 dated Jul. 24, 2023; 15 pgs.

Doggett et al., "Adaptive View Dependent Tessellation of Displacement Maps", Aug. 2000, Proceedings of the ACM SIGGRAPH/ EUROGRAPHICS Workshop on Graphics Hardware, pp. 59-66 (Year:2000).

Khaled Mamou; "Volumetric Hierarchical Approximate Convex Decomposition"; [retrieved Feb. 1, 2022 from https://code.google.com/p/v-hacd/]; (2016) 19 pgs.

Barrill et al.; "Fast Winding Nos. for Soups and Clouds"; ACM Transaction on Graphics, vol. 37, No. 4, Article 43, Aug. 2018; 12 pgs.

Reinforcement learning, Wikipedia, published Feb. 2, 2022.

Crassin et al.: "Octree-Based Sparse Voxelization Using the GPU Hardware Rasterizer"; OpenGL Insights; CRC Press; Chapter 22, (Jul. 23, 2012), pp. 303-219.

Jyh-Ming Lien et al.: "Approximate convex decomposition of Polyhedra"; Solid and Physical Modeling, Jun. 4, 2007 (XP058273626); pp. 121-131.

Mamou, Khaled; Multi-Resolution 3d Mesh Coding in MPEG; Dec. 2011; 2011 Visual Communications and Image Processing; p. 1-4; https://ieeexplore.ieee.org/stamp/stamp.jsp?tp=&arnumber=6116054 &tag=1 (Year 2011).

Office Action for U.S. Appl. No. 18/166,213 dated May 27, 2025; 26 pgs.

\* cited by examiner

```
# link to material library
mtllib basketball_player_00000001.mtl
# Positions
v 64.062500 1237.739990 51.757801
v 59.570301 1236.819946 54.899700
...
v -104.573997 434.458008 175.684006
v 98.071899 744.414978 178.248001
v 96.240196 781.739990 178.076004
v 95.393799 791.934998 178.188004
# Texture coordinates
vt 0.897381 0.740830
vt 0.899059 0.741542
...
vt 0.548180 0.679136
# link to material
usemtl material0000
# connectivity for geometry and texture
f 1 /1 2 /2 3 /3
f 4 /7 1 /1 3 /9
...
f 4318 /4318 3539 /3539 16453 /16453
```
basketball_player_00000001.obj

```
newmtl material0000
Ka 1.0 1.0 1.0
Kd 1.0 1.0 1.0
Ks 1.0 1.0 1.0
map_Kd
# link to a 2D image
basketball_player_00000001.png
```
basketball_player_00000001.mtl

FIG. 3

```
template <class T1, class T2 >
void computeFowardLinearLifting(std::vector<T1> & signal,
                   const std::vector<vmesh::SubdivisionLevelInfo > & infoLevelOfDetails,
                   const std::vector<Edge> & edges,
                   const T2 predWeight, const T2 updateWeight, const bool skipUpdate) { const auto lodCount = int32_t(infoLevelOfDetails.size());
  const auto rfmtCount = lodCount – 1;
  for(int32_t it = rfmtCount – 1; it >= 0; – –it) {
    const auto vcount0 = infoLevelOfDetails[it].pointCount;
    const auto vcount1 = infoLevelOfDetails[it + 1].pointCount;
    // predict
    for(int32_t v = vcount0; v < vcount1; ++v) {
      const auto edge = edges[v];
      const auto v1 = edges.v1;
      const auto v2 = edges.v2;
      signal[v] –= predWeight * (signal[v1] + signal[v2];
    }
    // update
    for(int32_t v = vcount0; !skipUpdate && v < vcount1; ++v) {
      const auto edge = edges[v];
      const auto v1 = edges.v1;
      const auto v2 = edges.v2;
      const auto d = updateWeight * signal[v];
      signal[v1] += d;
      signal[v2] += d;
    }
  }
}
```

FIG. 12

```
template <class T1, class T2>
void computeInverseLinearLifting(std::vector<T1>& signal,
                                 const std::vector<vmesh::SubdivisionLevelInfo>& infoLevelOfDetails,
                                 const std::vector<Edge> & edges,
                                 const T2 predWeight, const T2 updateWeight, const bool skipUpdate) { const auto lodCount = int32_t(infoLevelOfDetails.size());
  const auto rfmtCount = lodCount - 1;
  for(int32_t it = 0; it < rfmtCount; ++it) {
    const auto vcount0 = infoLevelOfDetails[it].pointCount;
    const auto vcount1 = infoLevelOfDetails[it + 1].pointCount;

// update
    for(int32_t v = vcount0; !skipUpdate && v < vcount1; ++v) {
      const auto edge = edges[v];
      const auto d = updateWeight * signal[v];
      signal[edge.v1] -= d;
      signal[edge.v2] -= d;
    }

// predict
    for(int32_t v = vcount0; v < vcount1; ++v) {
      const auto edge = edges[v];
      signal[v] += predWeight * (signal[edge.v1] + signal[edge.v2];
    }
  }
}
```

FIG. 13

```
template <class T1>
void computeLocalCoordinatesSystem(const Vector3<T>& n, Vector3<T>& t, Vector3<T>& b) {
    const auto one = T(1);
    const auto zero = T(0);
    const Vector3<T> e0(one, zero, zero);
    const Vector3<T> e1(zero, one, zero);
    const Vector3<T> e2(zero, zero, one);
    const auto d0 = n * e0;
    const auto d1 = n * e1;
    const auto d2 = n * e2;
    const auto ad0 = std::abs(d0);
    const auto ad1 = std::abs(d1);
    const auto ad2 = std::abs(d2);
    if (ad0 <= ad1 && ad0 <= ad2) {
        t = e0 - d0 * n;
    } else if (ad1 <= ad2) {
        t = e1 - d1 * n;
    } else {
        t = e2 - d2 * n;
    }
    t.normalize();
    assert(std::abs(t * n) < 0.00001);
    b = n ^ t;
}
```

FIG. 14A

```
int32_t VMCEncoder::quantizeDisplacements(VMCFrame& frame, const VMCEncoderParameters& params) const {
  const auto& infoLevelOfDetails = frame.subdivInfoLevelOfDetails;
  const auto lodCount = int32_t(infoLevelOfDetails.size());
  assert(lodCount > 0);
  double scale[3], lodScale[3];
  for(int32_t k = 0; k < 3; ++k) {
    const auto qp = params.liftingQuantizationParameters[k];
    scale[k] = qp >= 0 ? pow(2.0, 16 - params.bitDepthPosition + (4 - qp) / 6.0) : 0.0;
    lodScale[k] = 1.0 / params.liftingLevelOfDetailInverseScale[k];
  }
  auto& disp = frame.disp;
  for(int32_t it = 0, vcount0 = 0; it < lodCount; ++it) {
    const auto vcount1 = infoLevelOfDetails[it].pointCount;
    for(int32_t vcount0; v < vcount1; ++v) {
      auto& d = disp[v];
      for(int32_t k = 0; k < 3; ++k) {
        d[k] = d[k] >= 0.0? std::floor(d[k] * scale[k] + params.liftingQuantizationBias[k] :
                           -std::floor(-d[k] * scale[k] + params.liftingQuantizationBias[k];
      }
    }
    vcount0 = vcount1;
    for(int32_t k = 0 k< 3; ++k) {
      scale[k] *= lodScale[k];
    }
  }
  return 0;
}
```

FIG. 14B

```
int32_t packDisplacement(const VMCFrame& frame,
    Frame<uint16_t, ColorSpace::YUV444p>& dispVideoFrame, const VMCEncoderParameters& params) {
  const auto pixelsPerBlock = params.geometryVideoBlockSize * params.geometryVideoBlockSize;
  const auto shift = uint16_t((1 << params.geometryVideoBitDepth) >> 1);
  const auto& disp = frame.disp;
  auto & Y = dispVideoFrame.plane(0);
  auto & U = dispVideoFrame.plane(1);
  auto & V = dispVideoFrame.plane(2);
  for(int32_t v = 0, vcounter = 0, vcount = int32_t(disp.size()); v < vcount; ++v) {
    const auto & d = disp[v]
    const auto blockIndex = vcounter / pixelsPerBlock; //to do optimize power of 2
    const auto indexWithinBlock = vcounter % pixelsPerBlock; //to do optimize power of 2
    const auto x0 = (blockIndex % params.geoVideoWidthInBlocks) *
                    params.geometryVideoBlockSize; //to do optimize power of 2
    const auto y0 = (blockIndex % params.geoVideoWidthInBlocks) *
                    params.geometryVideoBlockSize; //to do optimize power of 2
    int32_t x, y;
    computeMorton2D(indexWithinBlock, x, t);
    const auto x1 = x0 + x;
    const auto y1 = y0 + y;
    const auto d0 = int32_t(shift + d[0]);
    const auto d1 = int32_t(shift + d[1]);
    const auto d2 = int32_t(shift + d[2]);
    Y.set(y1, x1, uint16_t(d0));
    Y.set(y1, x1, uint16_t(d1));
    Y.set(y1, x1, uint16_t(d2));
    ++vcounter
  }
  return 0;
}
```

FIG. 15

```
inline uint32_t extracOddBits(uint32_t x) {
  x =  x & 0x55555555;
  x =  (x | (x >>  1)) & 0x33333333;
  x =  (x | (x >>  2)) & 0x0F0F0F0F;
  x =  (x | (x >>  4)) & 0x00FF00FF;
  x =  (x | (x >>  8)) & 0x0000FFFF;
  return x;
} inline void computeMorton2D(const uint32_t i, int32_t& x, int32_t& y) {
  x =  int32_t(extracOddBits(i >>  1));
  y =  int32_t(extracOddBits(i));
}
```

| FOR EACH EMPTY PIXEL A(i, j) ADJACENT TO A FILLED PIXEL A(k, l) (AS MARKED BY THE PROCESS OF FIG.24) DETERMINE THE TRIANGLE T USED TO FILL A(k, l) | 2701 |

| APPLY THE PROCESS OF FIG.24, WHILE CONSIDERING THE BARYCENTRIC COORDINATES COMPUTED TO A(i, j) w.r.t. THE TRIANGLE T | 2702 |

| THE PIXEL A(i, j) IS MARKED AS FILLED AND THE INDEX OF THE TRIANGLE T IS STORED | 2703 |

Figure 30:
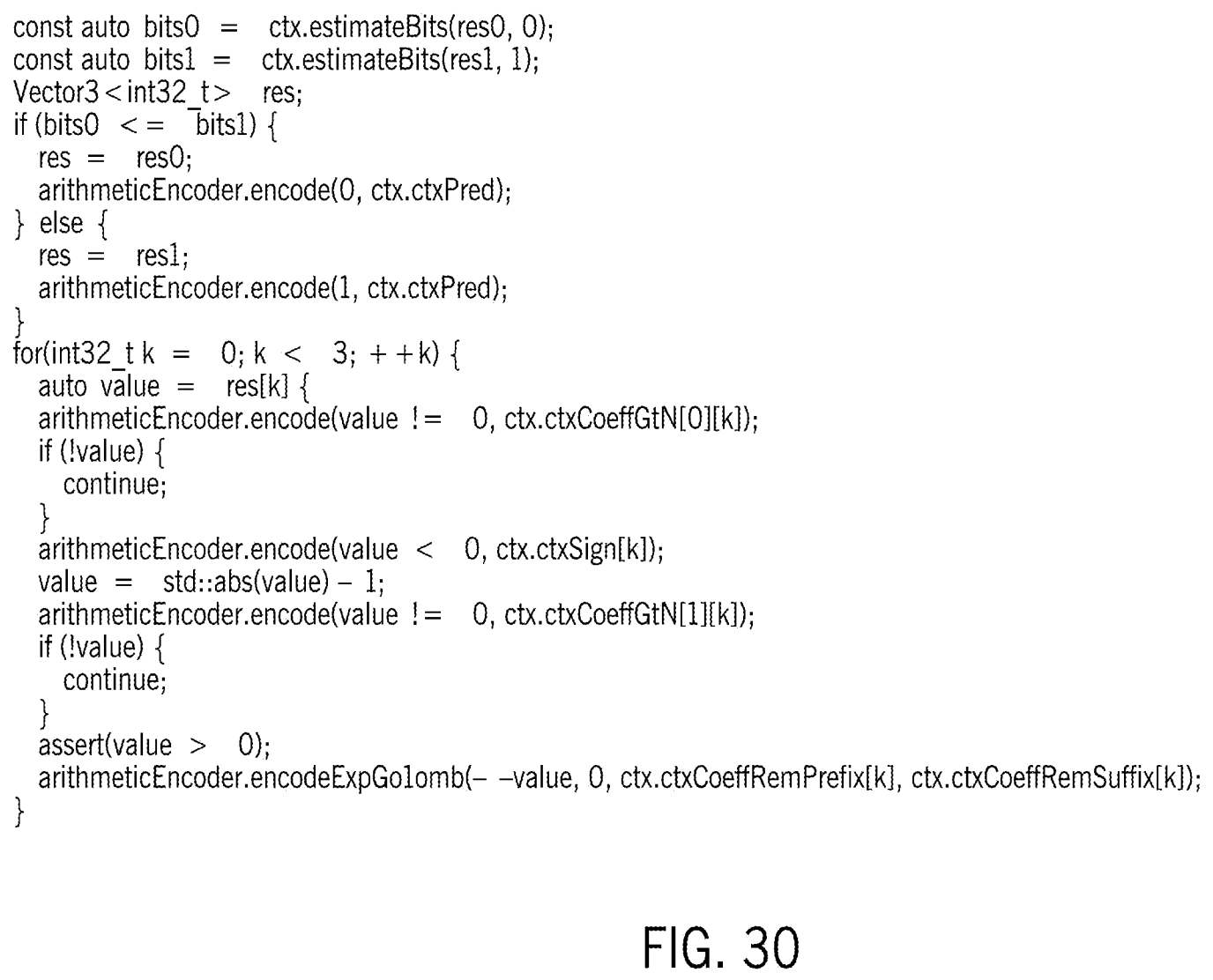

```
const auto bits0  =   ctx.estimateBits(res0, 0);
const auto bits1  =   ctx.estimateBits(res1, 1);
Vector3 <int32_t>   res;
if (bits0  <=  bits1) {
    res  =  res0;
    arithmeticEncoder.encode(0, ctx.ctxPred);
} else {
    res  =  res1;
    arithmeticEncoder.encode(1, ctx.ctxPred);
}
for(int32_t k  =  0; k <  3; ++k) {
    auto value  =  res[k] {
    arithmeticEncoder.encode(value !=  0, ctx.ctxCoeffGtN[0][k]);
    if (!value) {
        continue;
    }
    arithmeticEncoder.encode(value <  0, ctx.ctxSign[k]);
    value  =  std::abs(value) − 1;
    arithmeticEncoder.encode(value !=  0, ctx.ctxCoeffGtN[1][k]);
    if (!value) {
        continue;
    }
    assert(value >  0);
    arithmeticEncoder.encodeExpGolomb(− −value, 0, ctx.ctxCoeffRemPrefix[k], ctx.ctxCoeffRemSuffix[k]);
}
```

```
SEGMENT v x0, y0, z0
v x1, y1, z1
v x2, y,2, z2
v x3, y,3, z3
v x4, y4, z4
v x5, y5, z5
f 1 / 2 / 4
f 2 / 4 / 5
f 2 / 5 / 3
f 0 / 1 / 2
fi 0
fi 0
fi 1
fi 0
```

Mesh_intra_patch_data_unit[0]
 mdu_num_subparts 1
 mdu_subpart_id = 0

Mesh_intra_patch_data_unit[1]
 mdu_num_subparts 1
 mdu_subpart_id = 1

FIG. 40

MOTION COMPRESSION FOR EFFICIENT DYNAMIC MESH CODING

CROSS-REFERENCE TO RELATED APPLICATIONS

This application claims priority to the following U.S. Provisional Patent Applications, which are hereby incorporated by reference in their entirety: U.S. Provisional Application No. 63/269,211 filed on Mar. 11, 2022 and entitled "Image/Video Based Mesh Compression"; U.S. Provisional Application No. 63/269,213 filed Mar. 11, 2022 and entitled "Remeshing for Efficient Compression"; U.S. Provisional Application No. 63/269,214 filed on Mar. 11, 2022 and entitled "Attribute Transfer for Efficient Dynamic Mesh Coding"; U.S. Provisional Application No. 63/269,217 filed Mar. 11, 2022 and entitled "Motion Compression for Efficient Dynamic Mesh Coding"; U.S. Provisional Application No. 63/269,218 filed Mar. 11, 2022 and entitled "Attribute Transfer for Efficient Dynamic Mesh Coding"; U.S. Provisional Application No. 63/269,219 filed Mar. 11, 2022 and entitled "Adaptive Tessellation for Efficient Dynamic Mesh Encoding, Decoding, Processing, and Rendering"; and U.S. Provisional Application No. 63/368,793 filed on Jul. 19, 2022 and entitled "VDMC support in the V3C framework".

BACKGROUND

Video-based solutions, such as V3C were successfully developed to efficiently compress 3D volumetric data such as point clouds (i.e., V3C/V-PCC) or 3DoF+ content (V3C/MIV). The V3C standard makes it possible to compress 3D data such as static and dynamic point clouds by combining existing video coding technologies and metadata through well-defined syntax structures and processing steps. The video coding technologies are used to compress 3D projected data on 2D planes such as geometry and attributes, while the metadata includes information of how to extract and reconstruct the 3D representations from those 2D projections. FIG. 1 shows a block diagram of the V-PCC TMC2 encoder.

SUMMARY

Disclosed herein are methods and apparatuses for image/video-based compression static and dynamic meshes. A method of encoding motion data associated with an input data corresponding to set of 3D meshes M(i), the motion data including at least one of geometry and vertex attribute changes from one frame to another, can include: dividing input mesh M(i) into a set of patches P(i, j), each patch P(i, j) corresponding to a corresponding patch P(k, l) in a previously encoded reference frame; quantizing at least one of vertices and attributes of each patch P(i, j); predicting residuals based on a difference between quantized vertices or attributes of each patch P(i, j) with respect to corresponding patch P(k, l) in the previously encoded reference frame; and entropy encoding the predicted residuals.

The input data can be time consistent so that P(i, j) and P(k, l) have the same connectivity. If the input data is not time consistent, the method can further include preprocessing the input data by applying a time consistent remeshing process so that P(i, j) and P(k, l) have the same connectivity.

Quantizing at least one of vertices and attributes of each patch P(i, j) can further include applying uniform quantization to all vertices or attributes. Quantizing at least one of vertices and attributes of each patch P(i, j) can further include applying adaptive quantization that change a quantization level based on at least one of user input or analysis of mesh M(i).

Predicting residuals based on a difference between quantized vertices or attributes of each patch P(i, j) with respect to corresponding patch P(k, l) in the previously encoded reference frame can include making spatial predictions. Predicting residuals based on a difference between quantized vertices or attributes of each patch P(i, j) with respect to corresponding patch P(k, l) in the previously encoded reference frame can include making temporal predictions. Predicting residuals based on a difference between quantized vertices or attributes of each patch P(i, j) with respect to corresponding patch P(k, l) in the previously encoded reference frame can include making spatial and temporal predictions. Predicting residuals based on a difference between quantized vertices or attributes of each patch P(i, j) with respect to corresponding patch P(k, l) in the previously encoded reference frame can include using a delta temporal predictor. Predicting residuals based on a difference between quantized vertices or attributes of each patch P(i, j) with respect to corresponding patch P(k, l) in the previously encoded reference frame can include using an average spatial predictor. Predicting residuals based on a difference between quantized vertices or attributes of each patch P(i, j) with respect to corresponding patch P(k, l) in the previously encoded reference frame can include using an average predictor using temporal and spatial information. Predicting residuals based on a difference between quantized vertices or attributes of each patch P(i, j) with respect to corresponding patch P(k, l) in the previously encoded reference frame can include using a spatial-temporal parallelogram predictor. Predicting residuals based on a difference between quantized vertices or attributes of each patch P(i, j) with respect to corresponding patch P(k, l) in the previously encoded reference frame can include using a spatial parallelogram predictor. Predicting residuals based on a difference between quantized vertices or attributes of each patch P(i, j) with respect to corresponding patch P(k, l) in the previously encoded reference frame can include using geometry-guided predictors.

Predicting residuals based on a difference between quantized vertices or attributes of each patch P(i, j) with respect to corresponding patch P(k, l) in the previously encoded reference frame can include using two or more predictors selected from the group consisting of: a delta temporal predictor; a average spatial predictor; an average predictor using temporal and spatial information; a spatial parallelogram predictor; a spatial-temporal parallelogram predictor; or geometry-guided predictors. Predicting residuals based on a difference between quantized vertices or attributes of each patch P(i, j) with respect to corresponding patch P(k, l) in the previously encoded reference frame comprises comparing residuals using two or more predictors and selecting residuals based on rate distortion performance of the two or more predictors.

Entropy encoding the predicted residuals can include using an entropy coder selected from the group consisting of: context adaptive binary arithmetic coders (CABAC); Huffman encoders; and universal codes. The method can further include employing a CABAC encoder together with Exponential Golomb codes to compress both predictor index and prediction residuals.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 3 illustrates an example of a textured mesh stored in OBJ format.

FIG. 12 illustrates a forward lifting transform.

FIG. 13 illustrates an inverse lifting transform.

FIG. 14A illustrates an algorithm for computing a local coordinate system.

FIG. 14B illustrates an algorithm for quantizing wavelet coefficients.

FIG. 15 illustrates an algorithm for packing wavelet coefficients into a 2D image.

FIG. 16 illustrates an algorithm for computing Morton order.

FIG. 30 illustrates one example of CABAC-based encoding of prediction index and prediction attributes.

FIG. 40 illustrates an example of vertex indices in the subpart associated with a patch.

DETAILED DESCRIPTION

Figure 1:
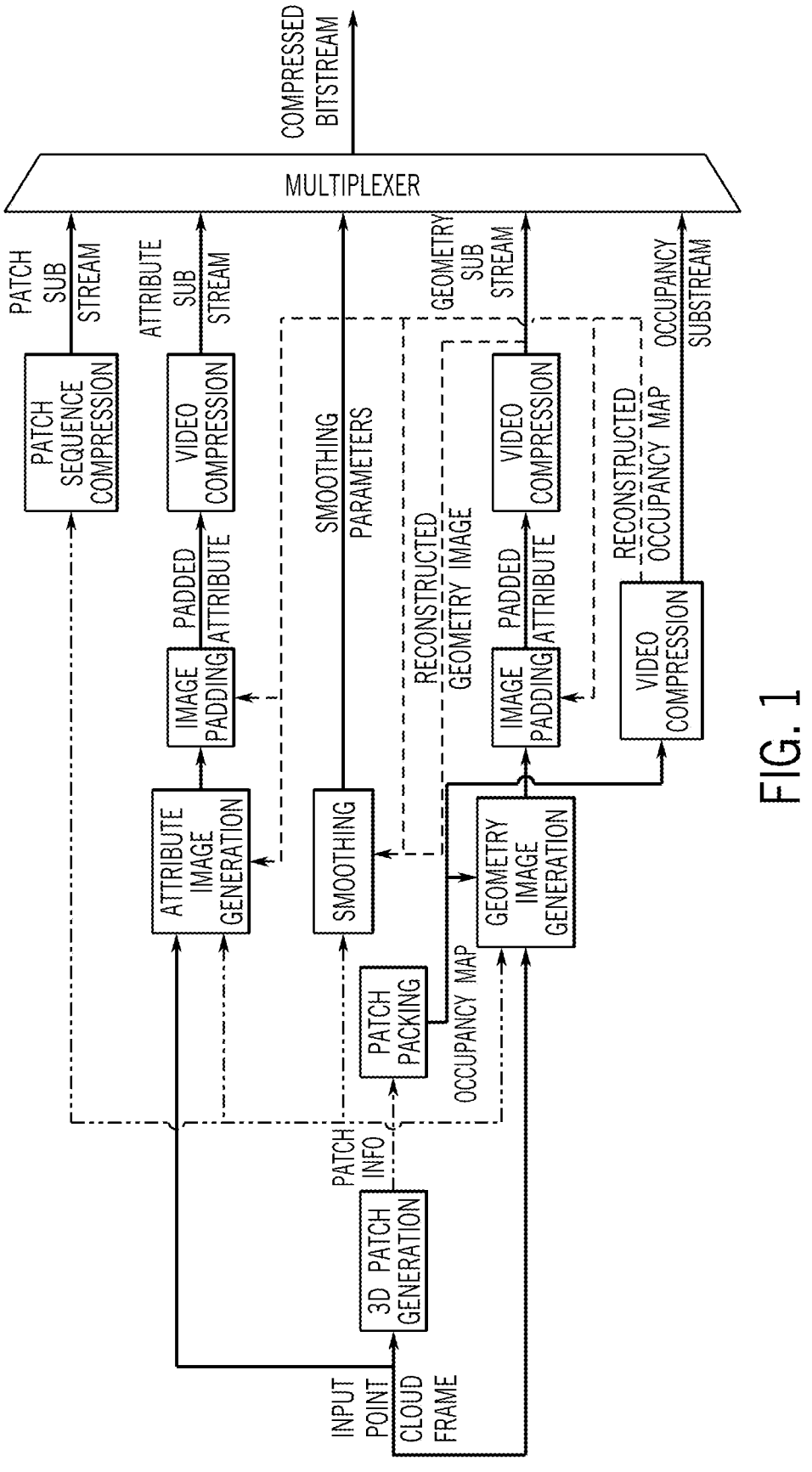
FIG. 1 illustrates an example V-PCC encoder block diagram.

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth in order to provide a thorough understanding of the implementations described herein. In other instances, methods, procedures and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a given drawing, refers to the same element throughout the several drawings, though it may not be repeated in every drawing. The drawings are not to scale unless otherwise indicated, and the proportions of certain parts may be exaggerated to better illustrate details and features of the present disclosure.

Section 1: Image/Video-Based Mesh Compression

Figure 2:
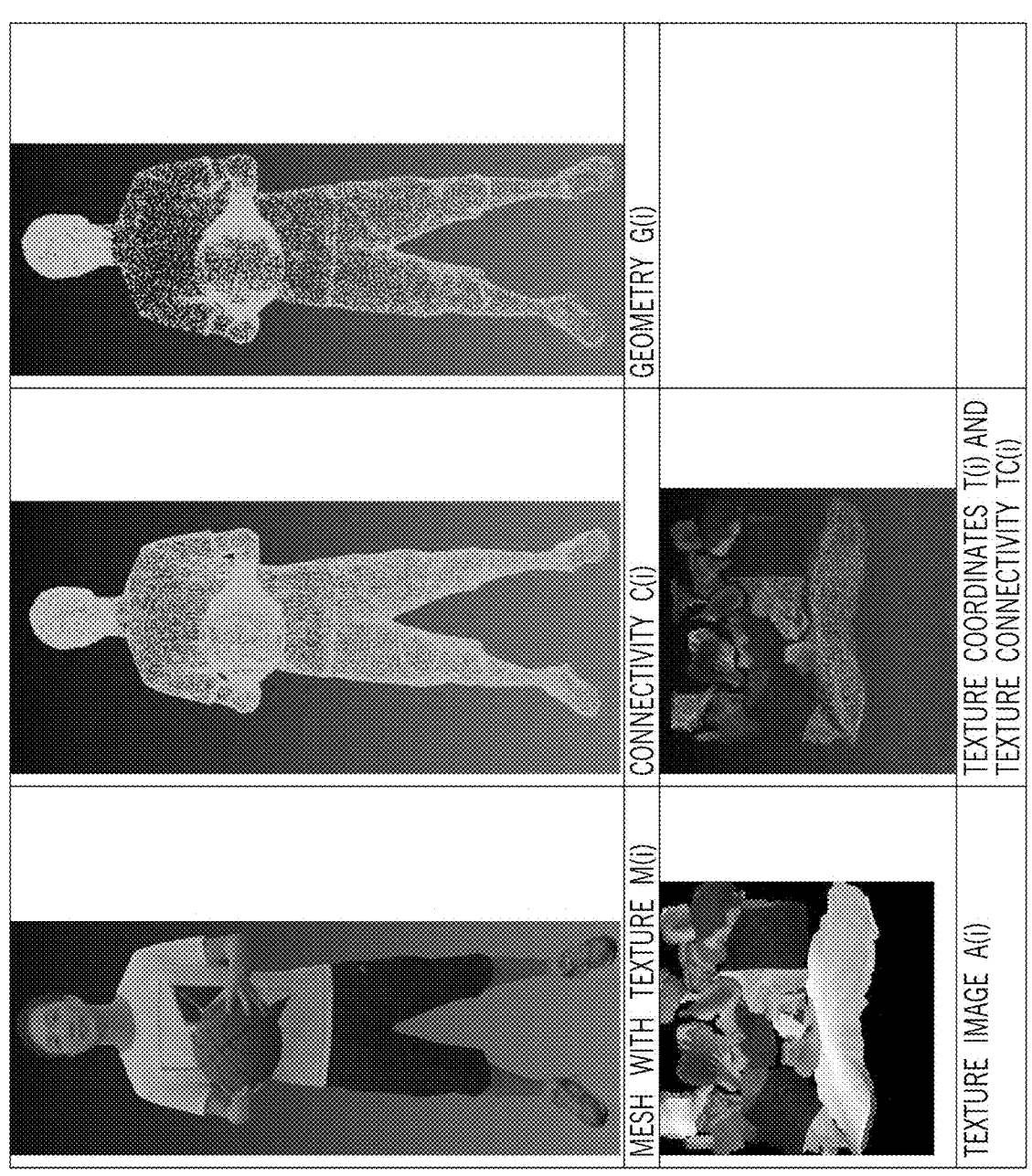
FIG. 2 illustrates an example of a textured mesh.

A static/dynamic mesh can be represented as a set of 3D Meshes M(0), M(1), M(2), . . . , M(n). Each mesh M(i) can be defined by be a connectivity C(i), a geometry G(i), texture coordinates T(i), and a texture connectivity CT(i). Each mesh M(i) can be associated with one or more 2D images A(i, 0), A(i, 1) . . . , A(i, D−1), called also attribute maps, describing a set of attributes associated with the mesh surface. An example of attribute would be texture information (see FIGS. 2-3). A set of vertex attributes could also be associated with the vertices of the mesh such as colors, normal, transparency, etc.

While geometry and attribute information could again be mapped to 2D images and efficiently compressed by using video encoding technologies, connectivity information cannot be encoded efficiently by using a similar scheme. Dedicated coding solutions optimized for such information are needed. In the next sections we present an efficient framework for static/dynamic mesh compression.

Figure 4:
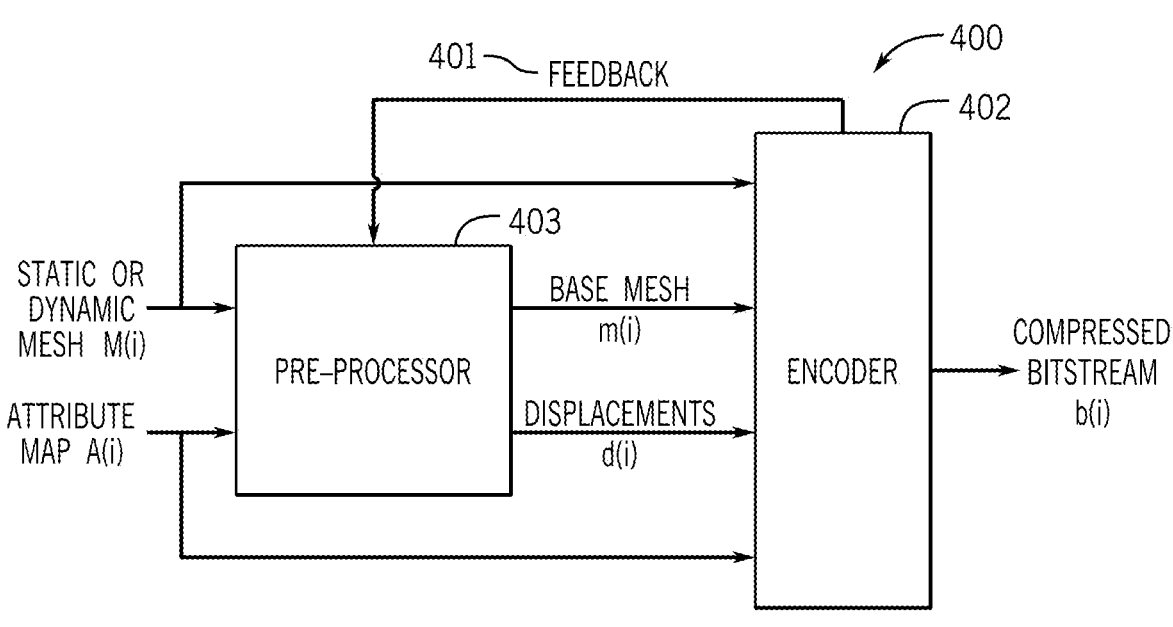
FIG. 4 illustrates a high level block diagram of a mesh encoding process.
Figure 5:
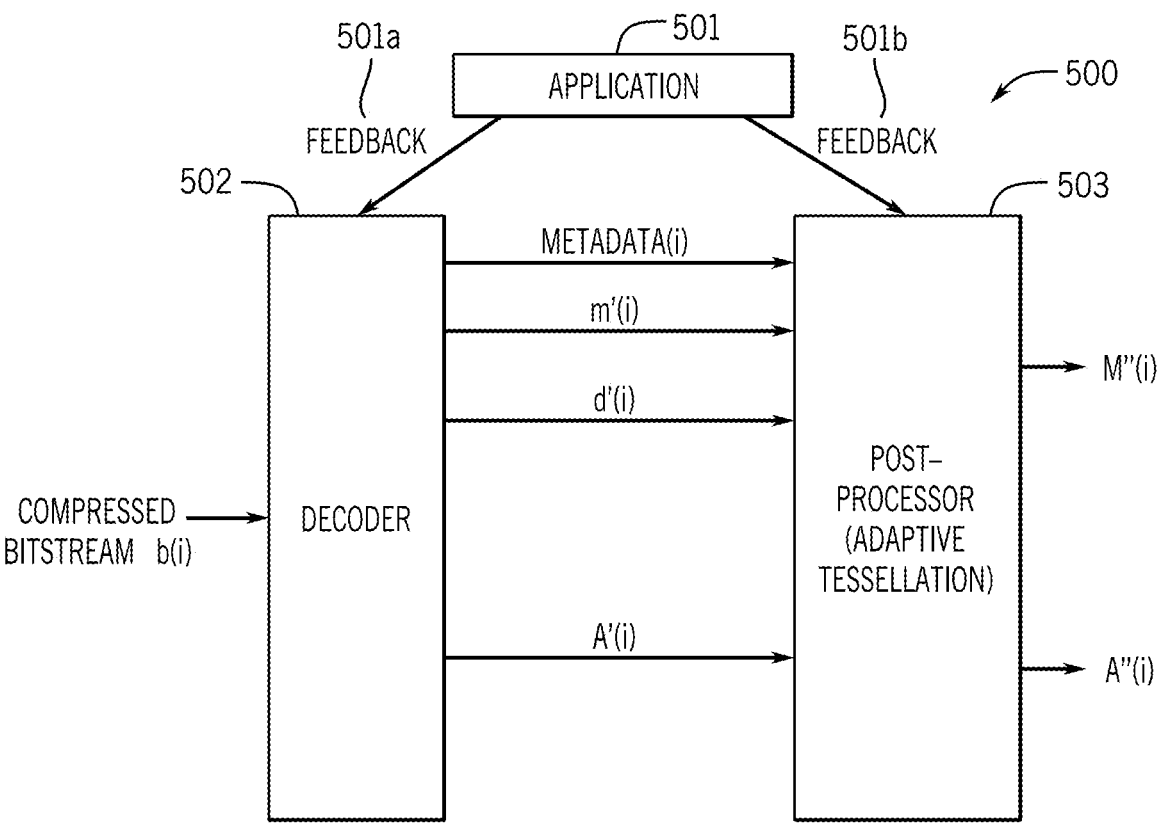
FIG. 5 illustrates a high level block diagram of a mesh decoding process.

FIGS. 4 and 5 show a high-level block diagram of the proposed encoding process 400 and decoding process 500, respectively. The encoding process includes a pre-processor 403 that receives a static or dynamic mesh M(i) and an attribute map A(i). The pre-processor produces a base mesh m(i) and displacements d(i) that can be provided to encoder 402, which produces a compressed bitstream b(i) therefrom. Encoder 402 may also directly receive the attribute map A(i). Feedback loop 401 makes it possible for the encoder 402 to guide the pre-processor 403 and can change its parameters to achieve the best possible compromise for encoding bitstream b(i) according to various criteria, including but not limited to:

Rate-distortion,

Encode/decode complexity,

Random access,

Reconstruction complexity,

Terminal capabilities,

Encode/decode power consumption, and/or

Network bandwidth and latency.

On the decoder side (FIG. 5), the compressed bitstream b(i) is received by a decoder 502 that decodes the bitstream to produce METADATA(i) relating to the bitstream and the decoded mesh, a decoded mesh m'(i), decoded displacements d'(i), and a decoded attribute map A'(i). Each of these outputs of decoder 502 can be provided to a post-processor 503 that can perform various post-processing steps, such as adaptive tessellation. Post processor 503 can produce a post processed mesh M"(i) and a post processed attribute map A"(i), which correspond to the input mesn M(i) and input attribute map A(i) provided to the encoder. (As will be understood the outputs are not identical to the inputs because of the lossy nature of the compression due to quantization and other encoding effects.) An application 501 consuming the content could provide feedback 501a to decoder 502 to guide the decoding process and feedback 501b to postprocessor 503. As but one example, based on the position of the dynamic mesh with respect to a camera frustum, the decoder 502 and the post processor 503 may adaptively adjust the resolution/accuracy of the produced mesh M"(i) and/or its associated attribute maps A"(i).

Pre-Processing

Figure 6:
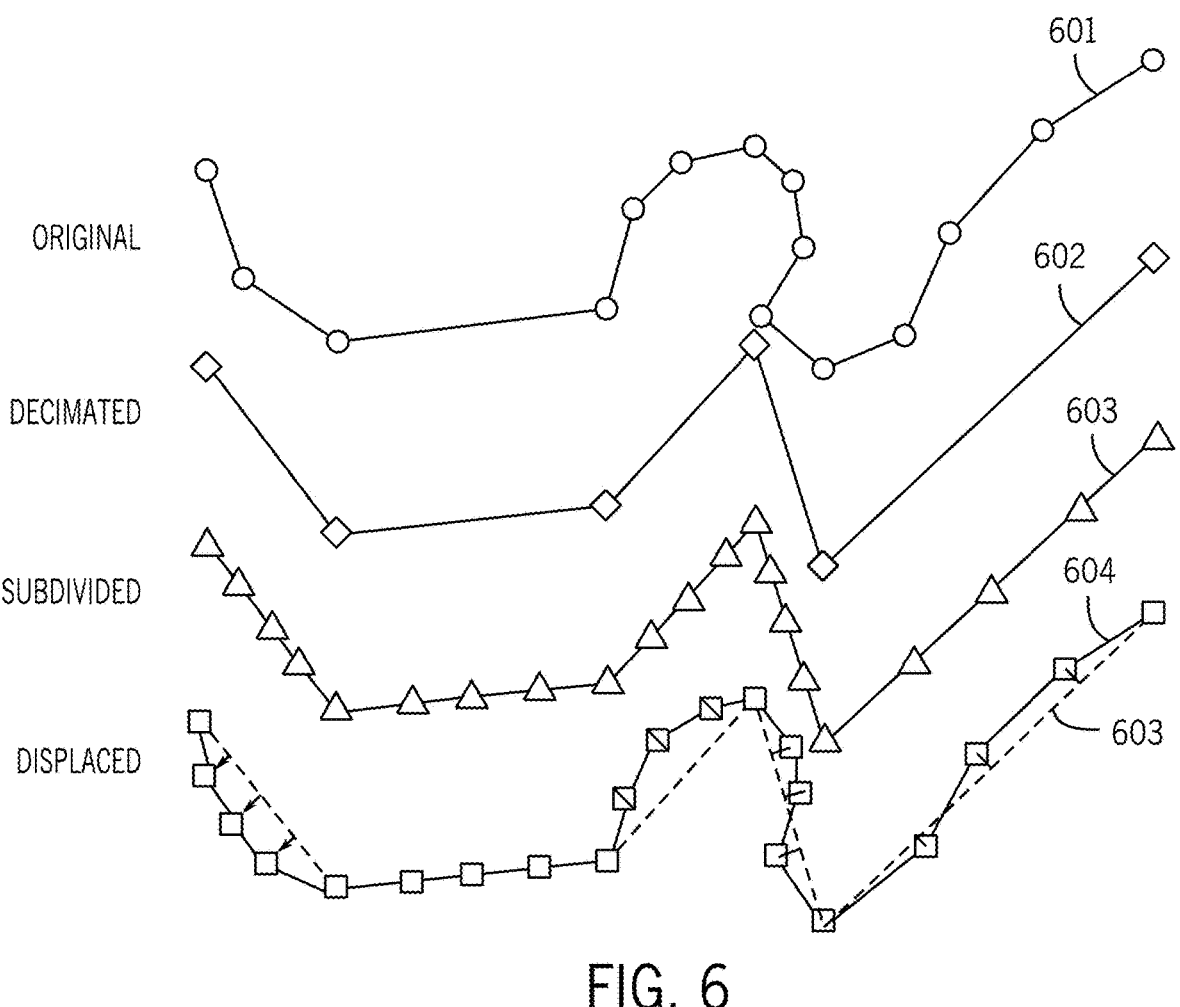
FIG. 6 illustrates a resampling process for a 2D curve.

FIG. 6 illustrates an exemplary pre-processing scheme that can be applied by pre-processor 403. The illustrated example uses the case of a 2D curve for simplicity of illustration, but the same concepts can be applied to the input static or dynamic 3D mesh M(i)=(C(i), G(i), T(i), TC(i)) to produce a base mesh m(i) and a displacement field d(i) discussed above with respect to FIG. 4. In FIG. 6, the input 2D curve 601 (represented by a 2D polyline), referred to as the "original" curve, is first down-sampled to generate a base curve/polyline 602, referred to as the "decimated" curve. A subdivision scheme, such as those described in Reference [A1](identified below), can be applied to the decimated polyline 602 to generate a "subdivided" curve 603. As one example, in FIG. 6, a subdivision scheme using an iterative interpolation scheme can be applied. This can include inserting at each iteration a new point in the middle of each edge of the polyline. In the example illustrated in FIG. 6, two subdivision iterations were applied.

Figure 7:
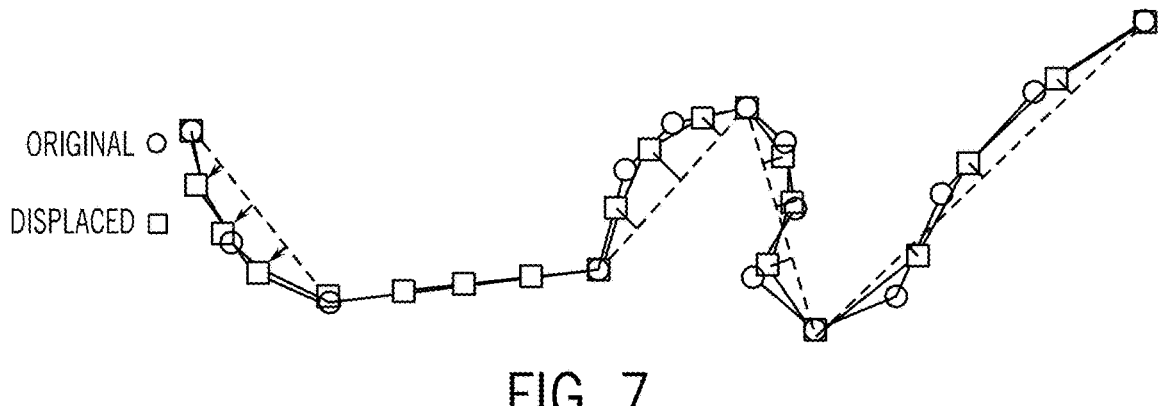
FIG. 7 illustrates subdivision and displacement of a 2D curve.

The proposed scheme can be independent of the chosen subdivision scheme and could be combined with any subdivision scheme such as the ones described in Reference [A1]. The subdivided polyline can then be deformed to get a better approximation of the original curve. More precisely, a displacement vector can be computed for each vertex of the subdivided mesh 603 (illustrated by the arrows in the displaced polyline 604 of FIG. 6), so that the shape of the displaced curve is sufficiently close to the shape of the original curve. (See FIG. 7.) One advantage of the subdivided curve (mesh) 603 can be that it can have a subdivision structure that allows more efficient compression, while still offering a faithful approximation of the original curve (mesh). Increased compression efficiency may be obtained because of various properties, including, but not necessarily limited to the following:

The decimated/base curve can have a low number of vertices may require fewer bits to be encoded/transmitted.

The subdivided curve can be automatically generated by the decoder once the base/decimated curve is decoded (i.e., there may be no need for any information other than the subdivision scheme type and subdivision iteration count to be encoded/transmitted).

The displaced curve can be generated by decoding the displacement vectors associated with the subdivided curve vertices. Besides allowing for spatial/quality scalability, the subdivision structure can also enable efficient wavelet decomposition (Reference [A2]), which can offer high compression performance (i.e., Rate-Distortion performance).

Figure 8:
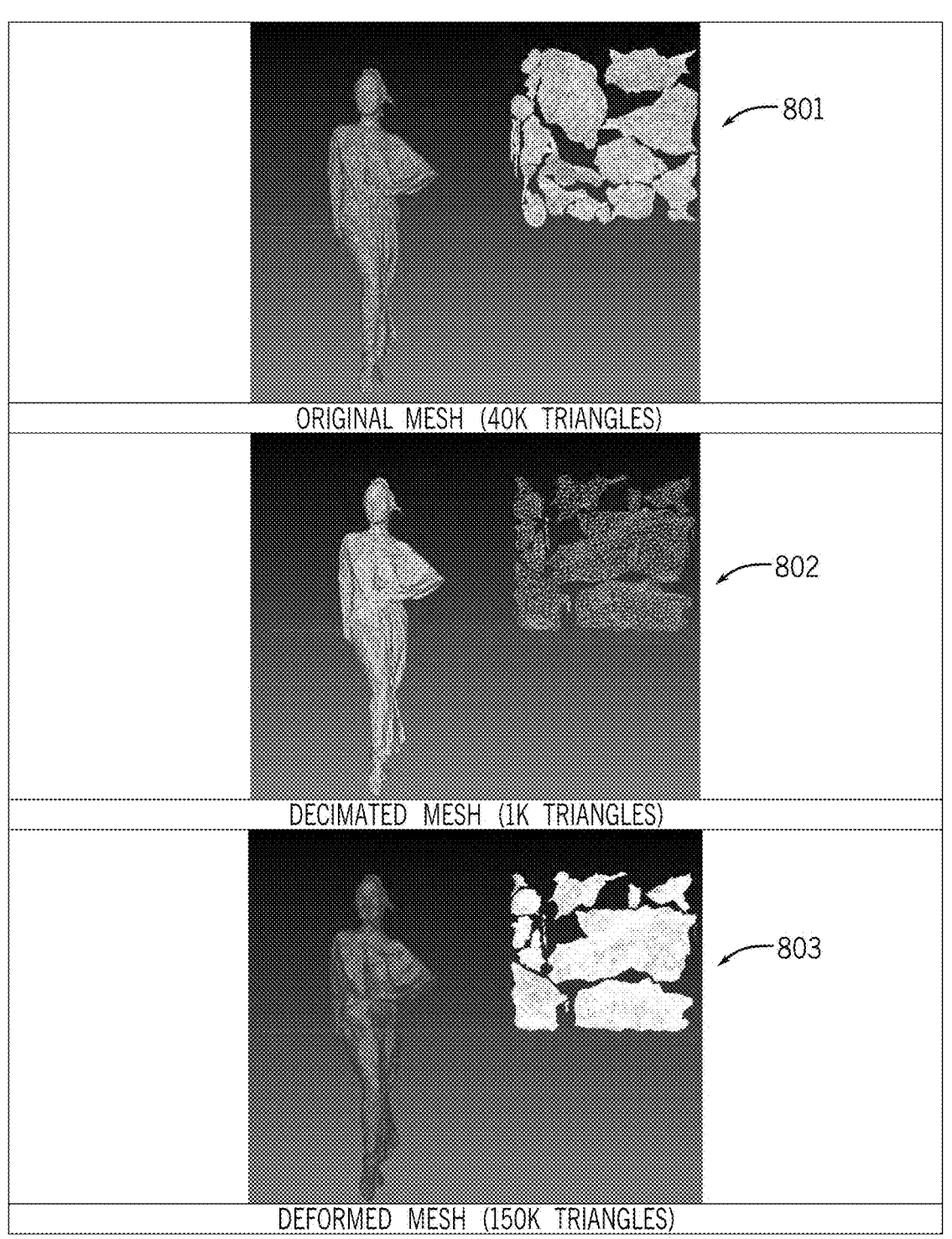
FIG. 8 illustrates original vs. decimated vs. deformed meshes.
Figure 9:
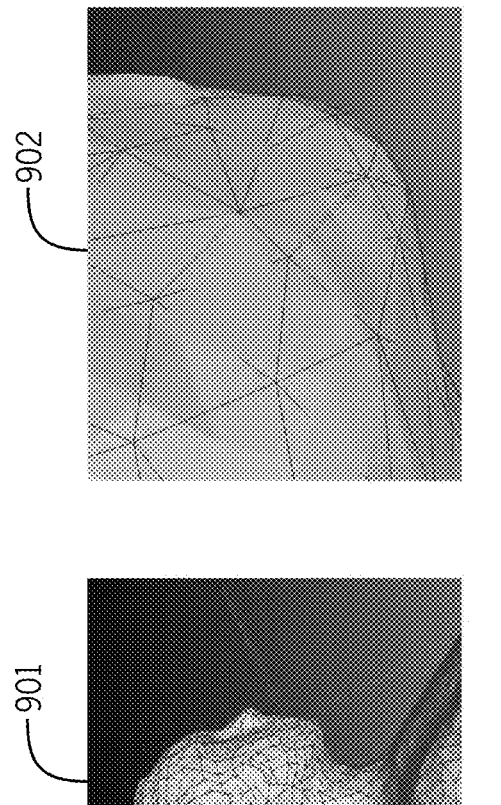
FIG. 9 illustrates an original (wireframe) mesh vs. a deformed (flat shaded) mesh.

When applying the same concepts to the input mesh M(i), a mesh decimation technique, such as the one described in Reference [A3], could be used to generate the decimated/base mesh. Subdivision schemes, such as those described in Reference [A4], could be applied to generate the subdivided mesh. The displacement field d(i) could be computed by any method. One example is described below in Section 2. FIG. 8 shows an example of re-sampling applied to an original mesh 801 with 40K triangles, which produces a 1K triangle decimated/base mesh 802, and a 150K deformed mesh 803. FIG. 9 compares the original mesh 901 (in wireframe) to the deformed mesh 902 (flat-shaded).

The re-sampling process may compute a new parameterization atlas, which may be better suited for compression. In the case of dynamic meshes, this may be achieved through use of a temporally consistent re-meshing process, which may produce that the same subdivision structure that is shared by the current mesh M'(i) and a reference mesh M'(j). One example of such a re-meshing process is described in Section 2, below. Such a coherent temporal re-meshing process makes it possible to skip the encoding of the base mesh m(i) and re-use the base mesh m(j) associated with the reference frame M'(i). This could also enable better temporal prediction for both the attribute and geometry information. More precisely, a motion field f(i) describing how to move the vertices of m(j) to match the positions of m(i) can computed and encoded as described in greater detail below.

Encoding—Intra Encoding

Figure 10:
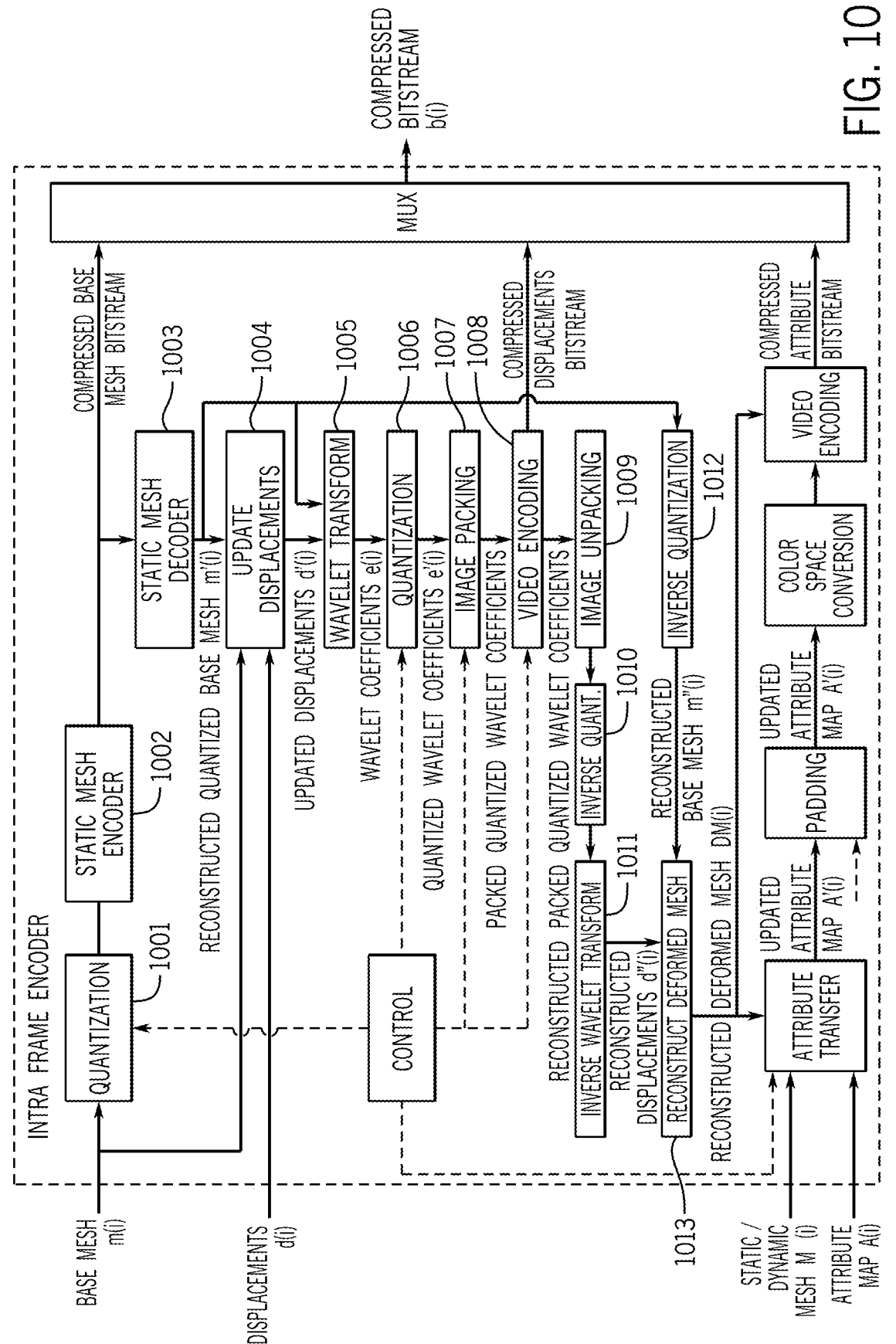
FIG. 10 illustrates an intra frame encoder/encoding process.

FIG. 10 shows a block diagram of an intra encoding process.

Base Mesh Encoding

A base mesh m(i) associated with the current frame can be first quantized 1001 (e.g., using uniform quantization) and then encoded by using a static mesh encoder 1002. (Inter encoding using a motion mesh encoder is described below with reference to FIG. 17.) The methods and apparatus herein are agnostic to which mesh codec is used, i.e., any of a wide variety of mesh codecs could be used in conjunction with the techniques described herein. For example, mesh codecs such as those described in References [A5], [A6],

[A7], or [A8] could also be used. The mesh codec used could be specified explicitly in the bitstream by encoding a mesh codec ID or could be implicitly defined/fixed by either specification and/or application. Because the quantization step or/and the mesh compression module may be lossy, a reconstructed quantized version of m(i), denoted as m'(i), can be computed by a mesh decoder 1003 within the intra frame encoder. If the mesh information is losslessly encoded and the quantization step is skipped (either or both of which may be true in some embodiments), m(i) would exactly match m'(i).

Displacement Encoding

Depending on the application and the targeted bitrate/ visual quality, the encoder could optionally encode a set of displacement vectors associated with the subdivided mesh vertices, referred to as displacement field d(i). One technique for computing a displacement field d(i) is described in Section 2, below. The reconstructed quantized base mesh m'(i) can then be used by displacement updater 1004 to update the displacement field d(i) to generate an updated displacement field d'(i) that takes into account the differences between the reconstructed base mesh m'(i) and the original base mesh m(i). By exploiting the subdivision surface mesh structure (as described below), a wavelet transform 1005 (as described below) can then applied to d'(i), generating a set of wavelet coefficients e(i). The wavelet coefficients e(i) can then be quantized 1006 (producing quantized wavelet coefficients e'(i)), packed into a 2D image/video by image packer 1007, and compressed by using an image/video encoder 1008. The encoding of the wavelet coefficients may be lossless or lossy. The reconstructed version of the wavelet coefficients can be obtained by applying image unpacking 1009 and inverse quantization 1010 to the reconstructed wavelet coefficients video generated during the video encoding process. Reconstructed displacements d"(i) can then be computed by applying the inverse wavelet transform 1011 to the reconstructed wavelet coefficients. A reconstructed base mesh m"(i) can be obtained by applying inverse quantization 1012 to the reconstructed quantized base mesh m'(i). The reconstructed deformed mesh DM(i) can be obtained by subdividing m"(i) and applying the reconstructed displacements d"(i) to its vertices by reconstruction block 1013.

Subdivision Scheme

Figure 11:
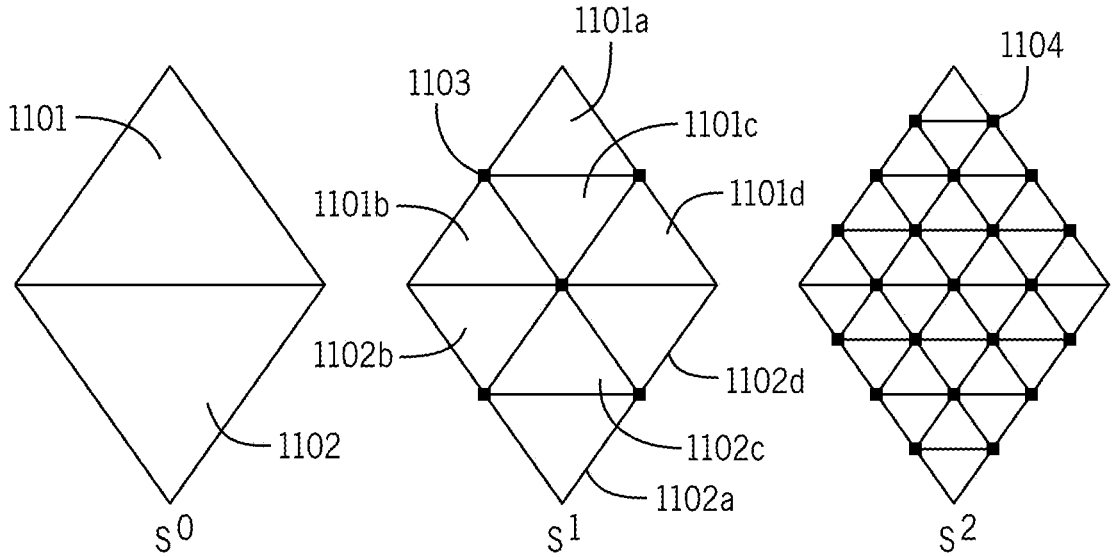
FIG. 11 illustrates a mid-point subdivision scheme.

Various subdivision schemes could be used in conjunction with the techniques herein. Suitable subdivision schemes may include, but are not limited to, those described in Reference [A4]. One possible solution is a mid-point subdivision scheme, which at each subdivision iteration subdivides each triangle into four sub-triangles by bisecting each side of the triangle illustrated in FIG. 11. For example, beginning with the two triangles of initial condition s0 having two triangles 1101 and 1102, a first iteration s1 produces four sub-triangles 1101*a*-1101*d* for triangles 1101 and four sub-triangles 1102*a*-1102*d* for triangle 1102. Each sub-triangle can be further divided in a subsequent iteration s2. New vertices 1103 can be introduced in the middle of each edge in iteration s1, with new vertices 1104 introduced in the middle of each edge in iteration s2, and so on. The subdivision process can be applied independently to the geometry and to the texture coordinates, because the connectivity for the geometry and for the texture coordinates can be different. The sub-division scheme computes the position Pos(v) of a newly introduced vertex at the center of an edge (v1, v2), as follows:

$$Pos(v)=0.5*(Pos(v1)+Pos(v2)),$$

where Pos(v1) and Pos(v2) are the positions of the vertices v1 and v2. The same process can be used to compute the texture coordinates of the newly created vertex. For normal vectors, an extra normalization step can be applied as follows:

$$N(v)=(N(v1)+N(v2))/\|N(v1)+N(v2)\|$$

where: N(v), N(v1), and N(v2) are the normal vectors associated with the vertices v, v1, and v2, respectively, ∥x∥ is the norm2 of the vector x.

The subdivision scheme behavior could be adaptively changed (e.g., to preserve sharp edges) based on implicit and explicit criteria such as:

Per face/edge/vertex attribute information associated with the base mesh and explicitly encoded as mesh attributes by the mesh codec.

Analyzing the base mesh or the mesh at the previous iteration to decide how to update the subdivision behavior.

Wavelet Transform

Various wavelet transforms could be applied, including without limitation those described in Reference [A2]. One example a low complexity wavelet transform could be implemented by using the pseudo-code of the lifting scheme illustrated in FIGS. 12 and 13. These figures illustrate but one example implementation of a low complexity wavelet transform using a lifting scheme. Other implementations are possible and contemplated. The scheme has two parameters:

Prediction weight, which controls the prediction step, and
An update weight, which controls the update step.

One possible choice for the prediction weight is ½. The update weight could be chosen as ⅛. Note that the scheme allows skipping the update process by setting skip update to true.

Local Vs. Canonical Coordinate Systems for Displacements

Displacement field d(i) can be defined in the same cartesian coordinate system as the input mesh. In some cases, a possible optimization may be to transform d(i) from this canonical coordinate system to a local coordinate system, which can be defined by the normal to the subdivided mesh at each vertex. The pseudo-code in FIG. 14A shows one exemplary way to compute such a local coordinate system. Other implementations and algorithms are possible and contemplated. The normal vectors associated with the subdivided mesh can be computed as follows:

The normal vectors associated with the base mesh can be either directly decoded or computed based on the quantized geometry.

The normal vectors associated with the vertices introduced during the subdivision process are computed as described above.

One potential advantage of a local coordinate system for the displacements is the possibility to more heavily quantize the tangential components of the displacements as compared to the normal component. In many cases, the normal component of the displacement can have a more significant impact on the reconstructed mesh quality than the two tangential components.

The decision to use the canonical coordinate system vs. local could be made at the sequence, frame, patch group, or patch level. The decision could be:

explicitly specified by encoding an extra attribute associated with the base mesh vertices, edges or faces, or
implicitly derived by analyzing the base mesh connectivity/geometry/attribute information (e.g., use canonical coordinate system on the mesh boundaries).

Wavelet Coefficients Quantization

Various strategies can be used quantize the displacement wavelet coefficients. One example solution is illustrated in FIG. 14B. Other techniques are possible and contemplated. The idea includes using a uniform quantizer with a dead zone and to adjust the quantization step such that high frequency coefficients are quantized more heavily. Instead of directly defining a quantization step, one can use a discrete quantization parameter. More sophisticated adaptive quantization schemes could be applied such as:

Trellis quantization (as described in Reference [A16]).

Optimizing the quantization parameters for the three components at once to minimize the distance of the reconstructed mesh to the original.

The quantization adaptive rounding scheme described in Reference [A17].

Packing Wavelet Coefficients

Various strategies could be employed for packing the wavelet coefficients into a 2D image. FIG. 15 illustrates one such strategy, which can proceed as follows:

First, it traverses the coefficients from low to high frequency.

Then, for each coefficient, it then determines the index of the N×M pixel block (e.g., N=M=16) in which it should be stored following a raster order for blocks.

Finally, the position within the N×M pixel block can be computed by using a Morton order (see Reference [A9]) to maximize locality (see FIG. 16 for details).

The example of FIG. 15 is but one example implementation, and other packing schemes/strategies are possible and contemplated. In a particular embodiment, the values of N and M could be chosen as a power of 2, which makes it possible to avoid division in the scheme described in FIGS. 15 and 16. FIG. 16 is but one example implementation of a Morton order computation, and other implementations are possible and contemplated.

Attribute Transfer

The attribute transfer module can compute a new attribute map based on the input mesh M(i) and the input texture map A(i). This new attribute map can be better suited for the reconstructed deformed mesh MD(i). A more detailed description is provided in Section 3 below.

Displacement Video Encoding

The techniques described herein are agnostic of which video encoder or standard is used, meaning that a wide variety of video codecs are applicable. When coding the displacement wavelet coefficients, a lossless approach may be used because the quantization can be applied in a separate module. Another approach could be to rely on the video encoder to compress the coefficients in a lossy manner and apply a quantization either in the original or transform domain.

Color Space Conversion And Chroma Sub-Sampling

As is the case with traditional 2D image/video encoding, applying color space conversion and chroma subsampling could be optionally applied to achieve better rate distortion performance (e.g., converting RGB 4:4:4 to YUV4:2:0). When applying such a color space conversion and chroma sub-sampling process, it may be beneficial to take into account the surface discontinuities in the texture domain (e.g., consider only samples belonging to the same patch and potentially exclude empty areas).

Inter Encoding

Figure 17:
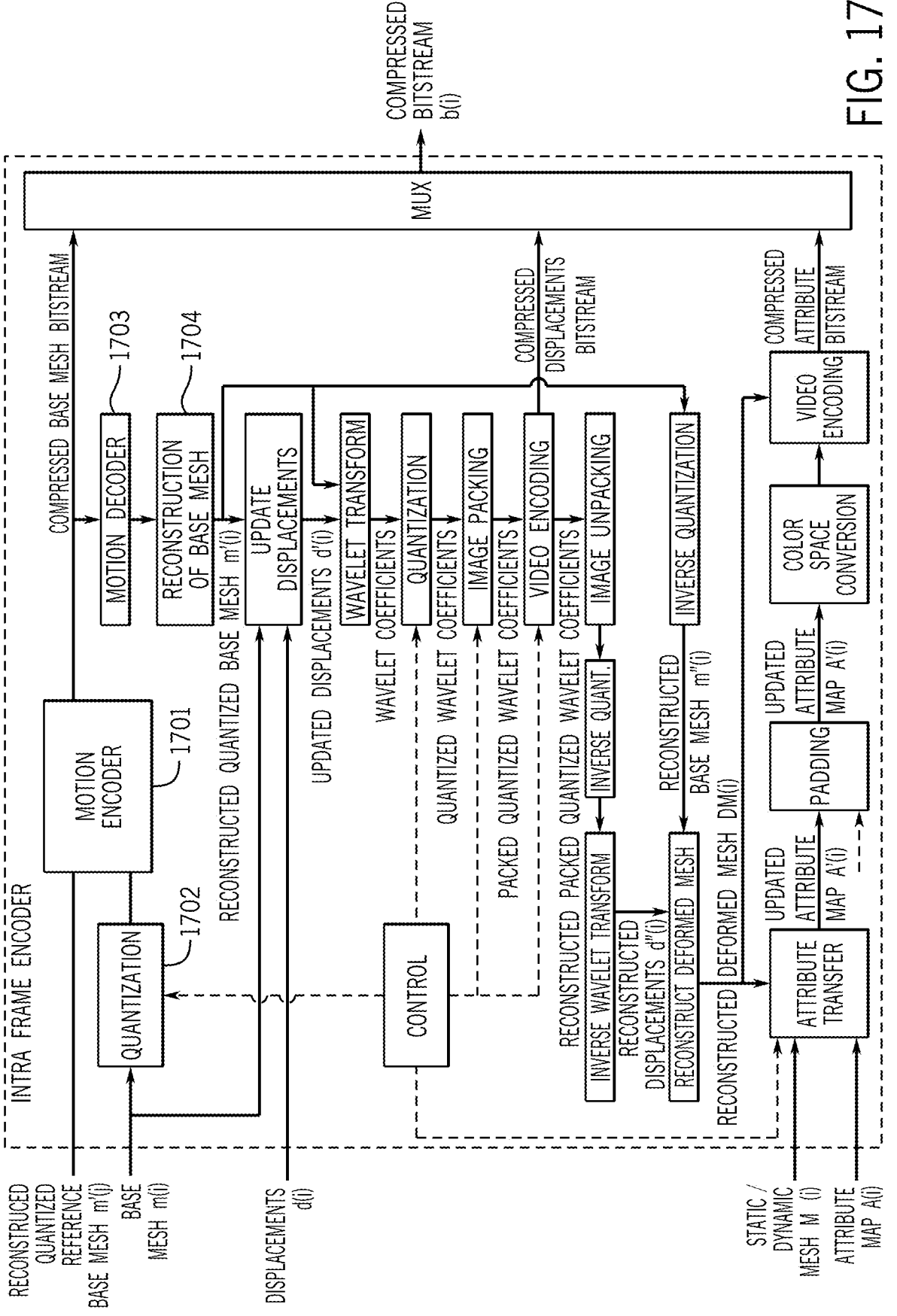
FIG. 17 illustrates an inter frame encoder/encoding process.

FIG. 17 shows a block diagram of the inter encoding process, i.e., an encoding process in which the encoding depends on temporally separate (e.g., prior) version of the mesh. In one non-limiting example, a reconstructed quantized reference base mesh m'(j) can be used to predict the current frame base mesh m(i). The pre-processing module described above could be configured such that m(i) and m(j) share the same number of vertices, connectivity, texture coordinates, and texture connectivity. Thus, only the positions of the vertices differ between m(i) and m(j).

The motion field f(i) (which corresponds to the displacement of the vertices as between m(i) and m(j) can be computed by motion encoder 1701 considering the quantized 1702 version of m(i) and the reconstructed quantized base mesh m'(j). Because m'(j) may have a different number of vertices than m(j) (e.g., vertices may get merged/removed), the mesh encoder can keep track of the transformation applied to get from m(j) to m'(j). The mesh encoder may then apply the same transformation to m(i) to guarantee a 1-to-1 correspondence between m'(j) and the transformed and quantized version of m(i), denoted m*(i). The motion field f(i) can then be computed by motion encoder 1701 by subtracting the quantized positions p(i, v) of the vertex v of m*(i) from the positions p(j, v) of the vertex v of m'(j):

$$f(i,v)=p(i,v)-p(j,v)$$

The motion field can then be further predicted using the connectivity information of m'(j), with the result then being entropy encoded (e.g., using context adaptive binary arithmetic encoding). More details about the motion field compression are provided section 4, below.

Because the motion field compression process can be lossy, a reconstructed motion field denoted as f'(i) can be computed by applying the motion decoder module 1703. A reconstructed quantized base mesh m'(i) can then computed 1704 by adding the motion field to the positions of m'(j). The remaining of the encoding process is similar to the Intra frame encoding process described above with reference to FIG. 10, which includes corresponding elements.

Decoding

Intra Decoding

Figure 18:
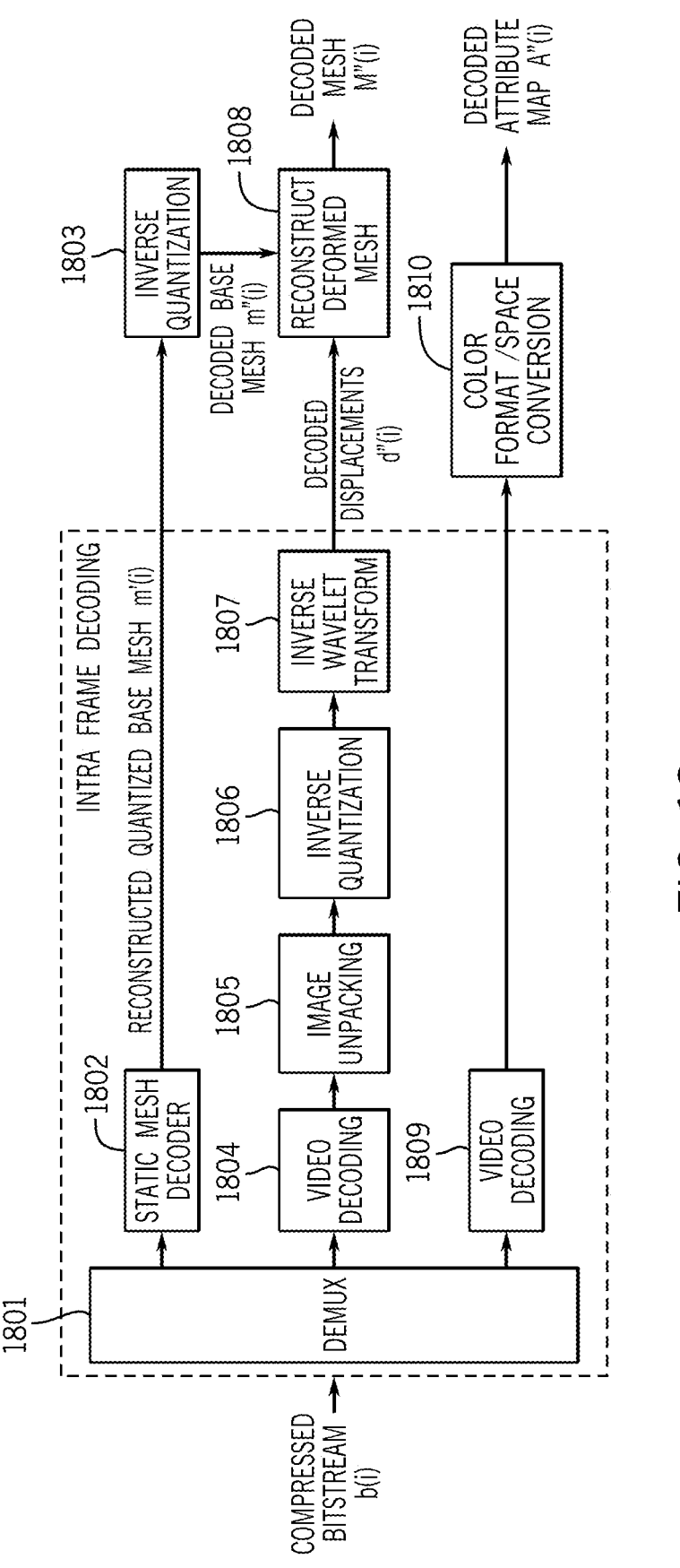
FIG. 18 illustrates an intra frame decoder/decoding process.

FIG. 18 shows a block diagram of the intra decoding process. First, the bitstream b(i) is de-multiplexed 1801 into three or more separate sub-streams: (1) a mesh sub-stream, (2) a displacement sub-stream for positions and potentially additional sub-streams for each vertex attribute, and (3) an attribute map sub-stream for each attribute map. In an alternative embodiment, an atlas sub-stream containing patch information could also be included in the same manner as in V3C/V-PCC.

The mesh sub-stream can be fed to a static mesh decoder 1802 corresponding to the mesh encoder used to encode the sub-stream to generate the reconstructed quantized base mesh m'(i). The decoded base mesh m"(i) can then obtained by applying inverse quantization 1803 to m'(i). Any suitable mesh codec can be used in conjunction with the techniques described herein. Mesh codecs such as those described in References [A5], [A6], [A7], or [A8] could be used, for example. The mesh codec used can be specified explicitly in the bitstream or can be implicitly defined/fixed by the specification and/or the application.

The displacement sub-stream can be decoded by a video/image decoder 1804 corresponding to the video/image encoder used to encode the sub-stream. The generated image/video can then un-packed 1805 and inverse quantization 1806 can be applied to the wavelet coefficients that result from the unpacking. Any video codec/standard could be used with the techniques described herein. For example, image/video codecs such as HEVC/H.265 AVC/H.264, AV1, AV2, JPEG, JPEG2000, etc. could be leveraged. Use of such video codecs can allow the mesh encoding and decoding techniques described herein to take advantage of well-developed encoding and decoding algorithms that are implemented in hardware on a wide variety of platforms, thus providing high performance and high power efficiency.

In an alternative embodiment, the displacements could be decoded by dedicated displacement data decoder. The motion decoder used for decoding mesh motion information or a dictionary-based decoder such as ZIP could be for example be used as a dedicated displacement data decoder. The decoded displacement d"(i) can then generated by applying the inverse wavelet transform 1807 to the unquantized wavelet coefficients. The final decoded mesh M"(i) can be generated by applying the reconstruction process 1808 to the decoded base mesh m"(i) and adding the decoded displacement field d"(i).

The attribute sub-stream can be directly decoded by a video/image decoder 1809 corresponding to the video/image encoder used to encode the sub-stream. The decoded attribute map A"(i) can be generated as the output of this decoder directly and/or with appropriate color format/color space conversion 1810. As with the displacement sub-stream, any video codec/standard could be used with the techniques described herein, including (without limitation) image/video codecs such as HEVC/H.265 AVC/H.264, AV1, AV2, JPEG, JPEG2000. Alternatively, an attribute sub-stream could be decoded by using non-image/video decoders (e.g., using a dictionary-based decoder such as ZIP). Multiple sub-streams, each associated with a different attribute map, could be decoded. In some embodiments, each sub-stream could use a different codec.

Inter Decoding

Figure 19:
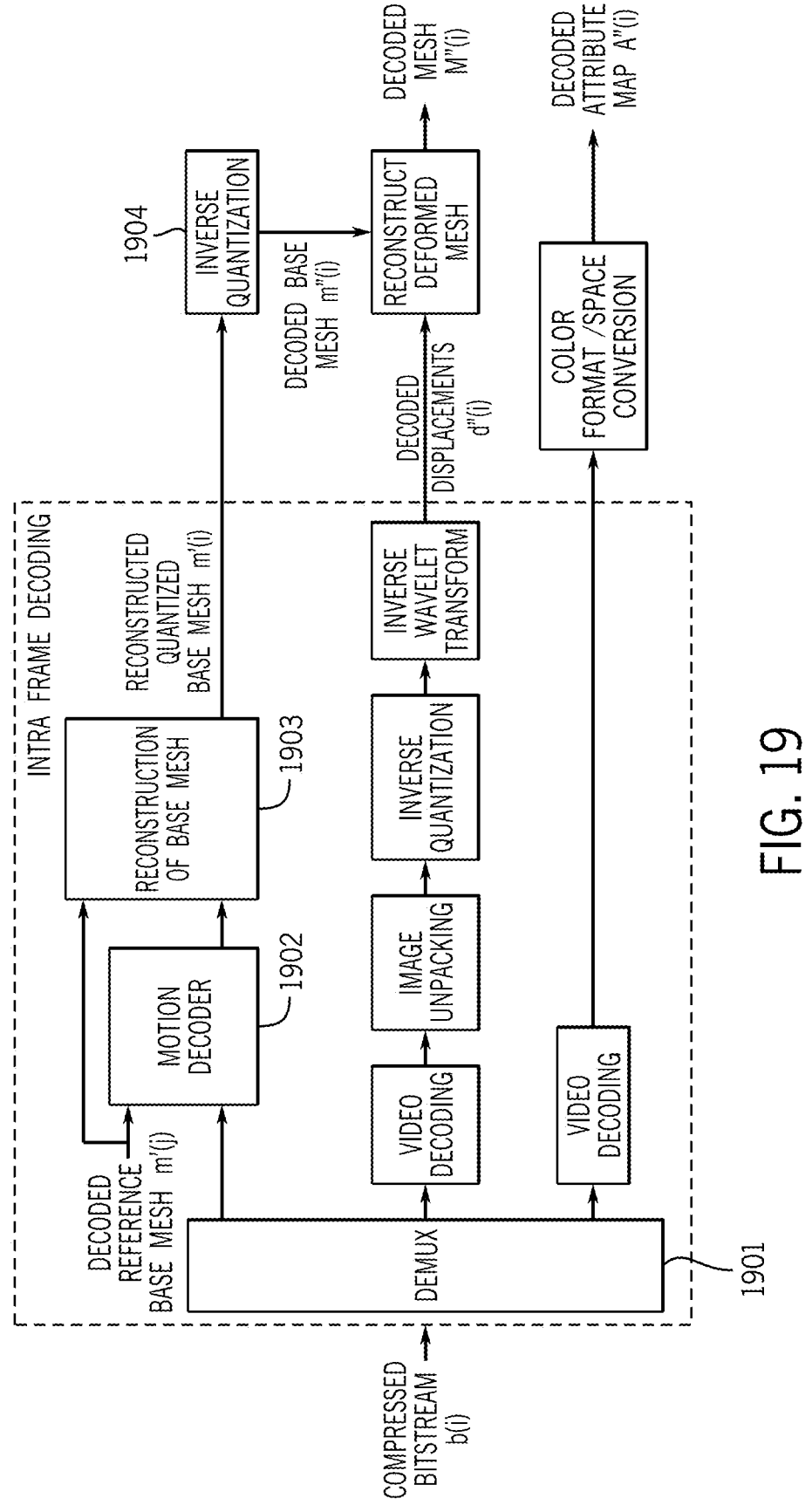
FIG. 19 illustrates an inter frame decoder/decoding process.

FIG. 19 shows a block diagram of the inter decoding process. First, the bitstream can be de-multiplexed 1901 into three separate sub-streams: (1) a motion sub-stream, (2) a displacement sub-stream, and (3) an attribute sub-stream. In some embodiments, an atlas sub-stream containing patch information could also be included in the same manner as in V3C/V-PCC.

The motion sub-stream can be decoded by applying a motion decoder 1902 corresponding to the motion encoder used to encode the sub-stream. A variety of motion codecs/standards can used to decode the motion information as described herein. For instance, any motion decoding scheme described in Section 4, below, could be used. The decoded motion information can then optionally added to the decoded reference quantized base mesh m'(j) (in reconstruction block 1903) to generate the reconstructed quantized base mesh m'(i). In other words, the already decoded mesh at instance j can be used (in conjunction with the motion information) to predict the mesh at instance i. Afterwards, the decoded base mesh m"(i) can be generated by applying inverse quantization 1904 to m'(i).

The displacement and attribute sub-streams can be decoded in the same manner as described above with respect to the intra frame decoding process. The decoded mesh M"(i) is also reconstructed in the same manner. The inverse quantization and reconstruction processes are not normative and could be implemented in various ways and/or combined with the rendering process.

Post-Processing

Additional post-processing modules could also be applied to improve the visual/objective quality of the decoded meshes and attribute maps and/or adapt the resolution/quality of the decoded meshes and attribute maps to the viewing point or terminal capabilities. Some examples of post-processing are provided below:

Color format/space conversion;

Using patch information and occupancy map to guide chroma up-sampling;

Geometry smoothing (See Reference [A10]);

Attributes smoothing (See References [A11], [A12]);

Image/video smoothing/filtering algorithms;

Adaptive tessellation (See References [A13], [A14], [A15], [A16]).

Other Extensions

In some embodiments and/or applications, it may be advantageous to subdivide the mesh into a set of patches (i.e., sub-parts) and selectively group patches as a set of patch groups/tiles. In some cases, different parameters (such as subdivision, quantization, wavelet transforms, coordinate systems, etc.) could be used to compress each patch or patch group. In such cases, it may be desirable to encode the patch information as a separate sub-stream (similar to V3C/V-PCC). Such techniques may be advantageous for handling cracks at patch boundaries, providing for:

Lossless coding for boundary vertices

Ensuring that positions/vertex attributes match after displacement;

Using local coordinate systems; and

Selectively disabling quantization of wavelets coefficients.

Encoder/decoder arrangements as described herein could also support scalability at different levels. For example, temporal scalability, which could be achieved through temporal subsampling and frame re-ordering. Likewise, quality and spatial scalability could be achieved by using different mechanisms for the geometry/vertex attribute data and the attribute map data. As one example, geometry scalability can be obtained by leveraging the subdivision structure, making it possible to change the mesh resolution by going from one level of detail to the next. The displacement information could then be stored as two or more image/video sub-streams e.g.:

Base layer/Level of detail 0: A separate video sub-stream for low frequency coefficients;

Refinement Layer 0: A separate video sub-stream for the next band of coefficients;

. . .

Refinement Layer N−1: A separate video sub-stream for the highest band of coefficients.

In this example, a level of detail m can be generated by combining level of detail m−1 and refinement level m−1. Also, attribute maps could be encoded in a scalable manner by leveraging scalable video coding techniques such as those used in HEVC/H.265, AVC/H.264, VVC, AV1, or any other approach that supports quality/spatial scalability for 2D images or videos.

Region of interest (ROI) encoding can be provided by configuring the encoding process described above to encode an ROI with higher resolution and/or higher quality for geometry, vertex attribute, and/or attribute map data. Such configurations may be useful in providing higher visual quality content under tight bandwidth and complexity constraints. As one example, when encoding a mesh representing a person, higher quality could be used for the face as opposed to the rest of the body. Priority/importance/spatial/bounding box information could be associated with patches, patch groups, tiles, NAL units, and/or sub-bitstreams in a manner that allows the decoder to adaptively decode a subset of the mesh based on the viewing frustum, the power budget, or the terminal capabilities. Note that any combination of such coding units could be used together to achieve such functionality. For instance, NAL units and sub-bit-streams could be used together.

Temporal and spatial random access may also be provided. Temporal random access could be achieved by introducing IRAPs (Intra Random Access Points) in the different sub-streams (e.g., atlas, video, mesh, motion, and displacement sub-streams). Spatial random access could be supported through the definition and usage of tiles, sub-pictures, patch groups, and/or patches or any combination of these coding units. Metadata describing the layout and relationships between the different units could also need to be generated and included in the bitstream to assist the decoder in determining the units that need to be decoded.

Lossless geometry/vertex attribute coding could be supported by disabling one or more of the following blocks: re-meshing; subdivision (e.g., set subdivision levels to 0, making the base mesh is the same as input mesh); base mesh quantization; displacement sub-stream computation. Alternatively, a simplified version (e.g., a quantized, low quality version) of the base mesh could be encoded together with a set of displacements to make it possible for the decoder to retrieve a higher quality version, up to and including exactly the original mesh information.

Lossless attribute map coding could be supported by configuring the video encoder to compress attribute maps in a lossless manner (e.g., using lossless transforms, PCM mode)

To keep high quality texture coordinates, one option could be to send a separate displacement sub-stream for texture coordinates. A motion sub-stream for texture coordinates could also be employed.

Per vertex attributes could also be compressed in the same manner as the geometry information. For example, the mesh codec could be used to encode vertex attributes associated with the base mesh vertices. Wavelet-based encoding could be used for the attributes associated in the high-resolution mesh, which could then be stored/transmitted as a separate vertex attribute sub-stream. Equivalent processes applied on the decoder side could then recover/decompress vertex attribute information.

Support for polygonal/quad meshes could be achieved by using mesh codecs capable of encoding polygonal/quad meshes and/or by choosing a subdivision scheme, e.g., Catmull-Clark or Doo-Sabin (see Reference [A4]), adapted for non-triangular meshes.

In the arrangement described above, the texture coordinates for the base mesh are explicitly specified and encoded in the bitstream by the mesh encoder. An alternative approach could be to use implicit texture coordinates derived from positions by means of projection (in the same manner as in V-PCC or MIV) or by considering any other model (e.g., B-spline surfaces, polynomial functions, etc.). In such cases a texture coordinate Tex cood could be defined by:

$$\text{Tex coord} = f(\text{position}),$$

where function f could be a projection on a predefined set of planes as in V-PCC (or any other suitable function).

References for the preceding section relating to Image/Video Based Mesh Compression, each of which is incorporated by reference in its entrety:

[A1] https://www.cs.utexas.edu/users/fussell/courses/cs384g-fall2011/lectures/lecture17-Subdivision_curves.pdf
[A2] http://www.mat.unimi.it/users/naldi/lifting.pdf
[A3] https://www.cs.cmu.edu/~garland/Papers/quadrics.pdf
[A4] https://en.wikipedia.org/wiki/Subdivision_surface
[A5] https://github.com/rbsheth/Open3DGC
[A6] https://google.github.io/draco/
[A7] http://mcl.usc.edu/wp-content/uploads/2014/01/200503-Technologies-for-3D-triangular-mesh-compression-a-survey.pdf
[A8] https://perso.liris.cnrs.fr/glavoue/travaux/revue/CSUR2015.pdf
[A9] https://en.wikipedia.org/wiki/Z-order_curve
[A10] https://graphics.stanford.edu/courses/cs468-12-spring/LectureSlides/06_smoothing.pdf
[A11] https://cragl.cs.gmu.edu/seamless/
[A12] https://www.sebastiansylvan.com/post/LeastSquaresTextureSeams/
[A13] https://developer.nvidia.com/gpugems/gpugems2/part-i-geometric-complexity/chapter-7-adaptive-tessellation-subdivision-surfaces
[A14] https://niessnerlab.org/papers/2015/0dynamic/schaefer2015dynamic.pdf
[A15] https://giv.cpsc.ucalgary.ca/publication/c5/
[A16] https://projet.liris.cnrs.fr/imagine/pub/proceedings/ICME-2007/pdfs/0000468.pdf
[A17] G. J. Sullivan: "Adaptive Quantization Encoding Technique Using an Equal Expected-value Rule", Joint Video Team, JVT-N011, Hong Kong (January 2005); https://www.google.com/url?sa=t&rct=j&q=&esrc=s&source=web&cd=&ved=2ahUKEwitlP7t46P2AhXBJkQIHRQhDp8QFnoECAcQAQ&url=https %3A %2 F %2Fwww.itu.int %2Fwftp3%2Fav-arch %2Fjvt-site %2F2005_01_HongKong %2FJVT-N011.doc&usg=AOvVaw0BvZVSEpKnTznCpBKWlvBn Section 2: Remeshing for Efficient Compression As noted above, a static/dynamic mesh can be represented as a set of 3D Meshes M(0), M(1), M(2), . . . , M(n). Each mesh M(i) can be defined by be a connectivity C(i), a geometry G(i), texture coordinates T(i), and a texture connectivity CT(i). Each mesh M(i) can be associated with one or more 2D images A(i, 0), A(i, 1) . . . , A(i, D−1), called also attribute maps, describing a set of attributes associated with the mesh surface. An example of attribute would be texture information (see FIG. 2). A set of vertex attributes could also be associated with the vertices of the mesh such as colors, normal, transparency, etc.

While geometry and attribute information could again be mapped to 2D images and efficiently compressed by using video encoding technologies, connectivity information cannot be encoded efficiently by using a similar scheme. Dedicated coding solutions optimized for such information are needed. In the next sections we present an efficient framework for static/dynamic mesh compression.

FIGS. 4 and 5, discussed in more detail in Section 1, above, show a high-level block diagram of the proposed encoding and decoding processes, respectively. Note that the feedback loop during the encoding process makes it possible for the encoder to guide the pre-processing step and changes its parameters to achieve the best possible compromise according to various criteria, including but not limited to:

Rate-distortion,
Encode/decode complexity,
Random access,
Reconstruction complexity,
Terminal capabilities,
Encode/decode power consumption, and/or
Network bandwidth and latency.

On the decoder side, an application consuming the content could provide feedback to guide both the decoding and the post-processing blocks. As but one example, based on the position of the dynamic mesh with respect to a camera frustum, the decoder and the post processing block may adaptively adjust the resolution/accuracy of the produced mesh and/or its associated attribute maps.

Pre-Processing

FIG. 6, also discussed above, illustrates the proposed pre-processing scheme in the case of a 2D curve. The same concepts can be applied to the input static or dynamic 3D mesh M(i)=(C(i), G(i), T(i), TC(i)) to produce a base mesh m(i) and a displacement field d(i). In FIG. 6, the input 2D curve (represented by a 2D polyline), referred to as the "original" curve, is first down-sampled to generate a base curve/polyline, referred to as the "decimated" curve. A subdivision scheme, such as those described in Reference [B1] (identified below), can be applied to the decimated polyline to generate a "subdivided" curve. As one example, in FIG. 6, a subdivision scheme using an iterative interpolation scheme can be applied. This can include inserting at each iteration a new point in the middle of each edge of the polyline. In the example illustrated in FIG. 6, two subdivision iterations were applied.

The proposed scheme can be independent of the chosen subdivision scheme and could be combined with any subdivision scheme such as the ones described in Reference [B1]. The subdivided polyline can then be deformed to get a better approximation of the original curve. More precisely, a displacement vector can be computed for each vertex of the subdivided mesh, so that the shape of the displaced curve is sufficiently close to the shape of the original curve. (See FIG. 7.) One advantage of the subdivided curve can be that it can have a subdivision structure that allows more efficient compression, while still offering a faithful approximation of the original curve. Increased compression efficiency may be obtained because of various properties, including, but not necessarily limited to the following:

The decimated/base curve can have a low number of vertices may require fewer bits to be encoded/transmitted.

The subdivided curve can be automatically generated by the decoder once the base/decimated curve is decoded (i.e., there may be no need for any information other than the subdivision scheme type and subdivision iteration count to be encoded/transmitted).

The displaced curve can be generated by decoding the displacement vectors associated with the subdivided curve vertices. Besides allowing for spatial/quality scalability, the subdivision structure can also enable efficient wavelet decomposition (Reference [B2]), which can offer high compression performance (i.e., Rate-Distortion performance).

When applying the same concepts to the input mesh M(i), a mesh decimation technique, such as the one described in Reference [B3], could be used to generate the decimated/base mesh. Subdivision schemes, such as those described in Reference [B4], could be applied to generate the subdivided mesh. The displacement field d(i) could be computed by any method. Examples are described in greater detail elsewhere herein. FIG. 8, also discussed above, shows an example of re-sampling applied to an original mesh with 40K triangles, which produces a 1K triangle decimated/base mesh and a 150K deformed mesh. FIG. 9, also discussed above compares the original mesh (in wireframe) to the deformed mesh (flat-shaded).

It should be noted that re-sampling process may compute a new parameterization atlas, which may be better suited for compression. In the case of dynamic meshes, this may be achieved through use of a temporally consistent re-meshing process, which may produce that the same subdivision structure that is shared by the current mesh M'(i) and a reference mesh M'(j). As described in greater detail below. Such a coherent temporal re-meshing process makes it possible to skip the encoding of the base mesh m(i) and re-use the base mesh m(j) associated with the reference frame M(j). This could also enable better temporal prediction for both the attribute and geometry information. More precisely, a motion field f(i) describing how to move the vertices of m(j) to match the positions of m(i) can computed and encoded as described in greater detail below.

3D Re-Meshing

Figure 20:
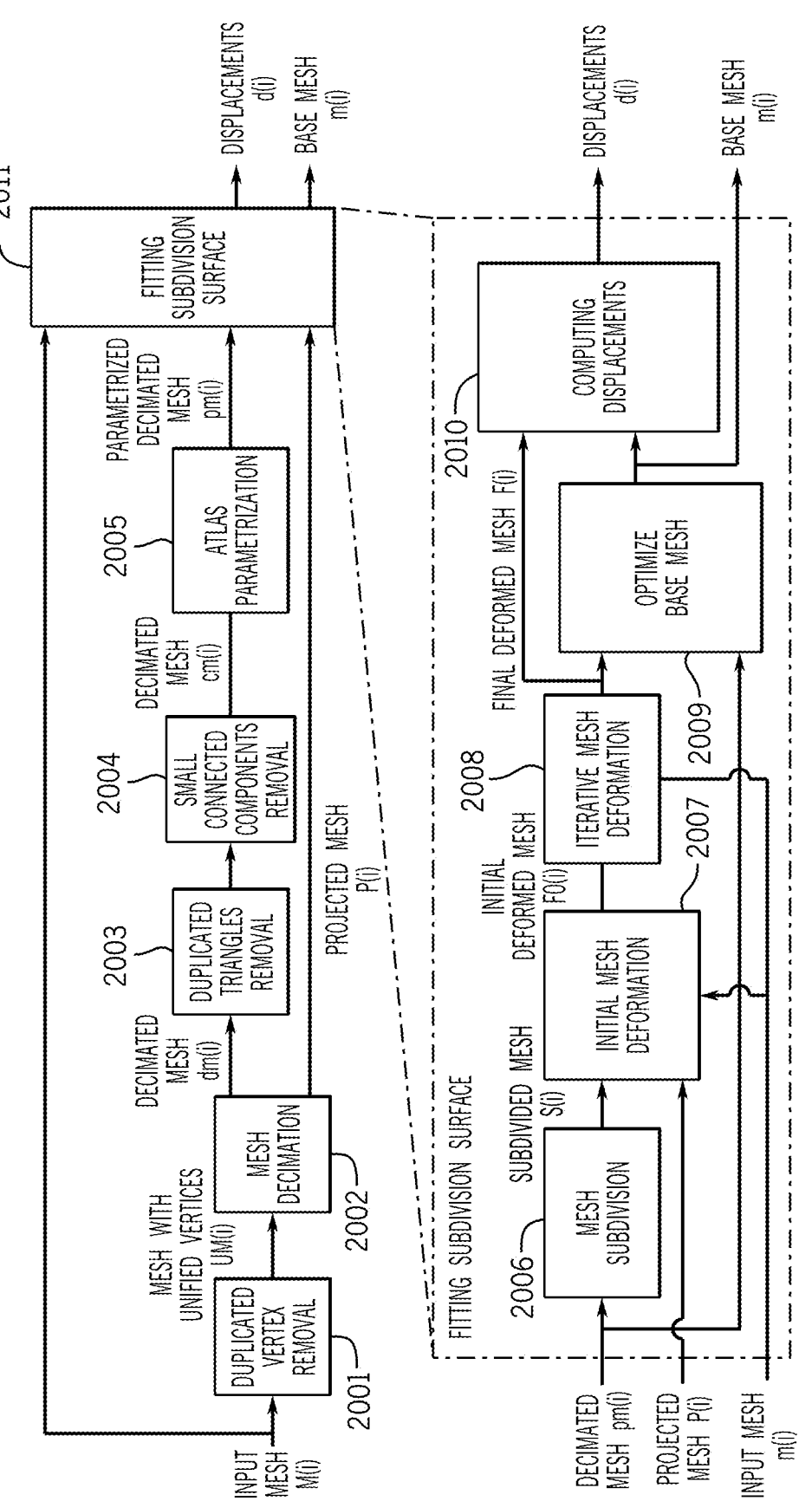
FIG. 20 illustrates a block diagram of a re-meshing system.

FIG. 20 shows a block diagram of the proposed remeshing system. The input mesh M(i) can be an irregular mesh. The output can be a base mesh m(i) with a set of displacements d(i) associated with the subdivided version of m(i). The various blocks of the system are described below. Each of these blocks may be implemented using data processing systems including dedicated hardware or hardware with suitable software and/or firmware, such as CPU hardware, GPU hardware, FPGA hardware, DSP hardware, ASICs, etc.

Duplicated Vertex Removal

The Duplicated Vertex Removal block 2001 aims to merge duplicated vertices (i.e., vertices with the same position) or vertices with close 3D positions (e.g., vertices with a distance between that is less than a user-defined threshold). The duplicated vertex removal process can be accelerated by leveraging data structures such as hash-tables, kd-trees, octrees, etc. By removing duplicated vertices, appearance of cracks during subsequent processing stages (including the mesh decimation stage) may be avoided. Additionally, duplicate vertex removal may also improve coding efficiency and encode/decode complexity by eliminating computations using or based on superfluous data.

Mesh Decimation

Figure 21:
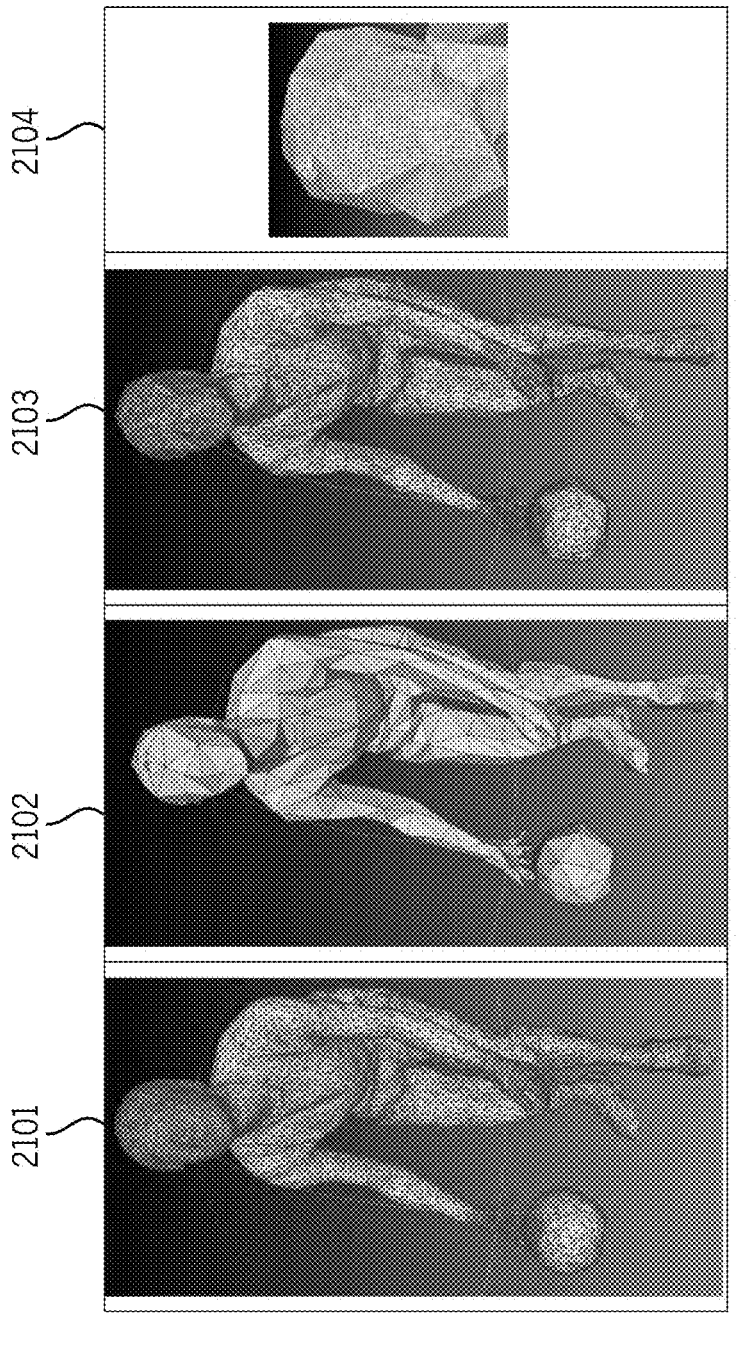
FIG. 21 illustrates examples of mesh decimation with tracking.

Mesh Decimation block 2002 can employ techniques such as those described in References [B3] or [B4] to simplify the mesh, for example by reducing the number of vertices/faces while substantially preserving the shape of the original mesh. FIG. 21 illustrates an original mesh 2101, a decimated mesh 2102, a projected mesh 2103, and a projected mesh overlayed on top of the decimated mesh 2104. Substantially preserving the shape of the original mesh can include preserving the shape of the input mesh sufficiently to achieve a desired encoder and/or decoder performance while simultaneously achieving a desired level of accuracy or fidelity in the resulting mesh representation. This can vary from one application to another depending on the capabilities of the available encoder and decoder equipment, the capabilities of the display or other output equipment, and/or the requirements of a particular application.

The illustrated mesh decimation block may apply a mesh decimation algorithm that expands on those described in References [B3] or [B4] (or any other suitable decimation algorithm) by also keeping track of a mapping between the full resolution input mesh and the decimated mesh. More specifically, at each iteration of the decimation process, the mesh decimation block 2002 can project removed vertices on the decimated version of the mesh. Alternatively, the mesh decimation block can project the removed points to the closest counterpart in the simplified mesh. "Closest" counterpart can mean closest based on shortest L2 distance in 3D space. FIG. 21 shows an example of original (2101), decimated (2102) and projected (2103) meshes. Other criteria to define the projection process could be used. For example, rather than L2 distance in 3D space, other distance measures in the 3D space could be used (e.g., L1, Lp, L_inf, etc.).

Alternatively, distances in a lower dimension space could be used by projection on a 2D local plane. This could employ orthogonal and/or non-orthogonal projections. Other projection processes could also be used as appropriate for a given use case. The simplification algorithm can also be modified to prevent decimation operations that would result in flipped triangles in the decimated and/or the projected meshes. This optional, extra requirement can help produce a better mapping between the decimated and the projected meshes.

Duplicated Triangle Removal

Duplicated Triangle Removal Module 2003 can detect and remove duplicated triangles in the decimated mesh dm(i) (i.e., triangles that reference the same vertices). This can improve compression efficiency and encode/decode complexity. However, duplicated triangle removal may be optional for some embodiments.

Small Connected Components Removal

Small Connected Component Removal Module 2004 can detect and remove connected components. In this sense, connected components means set(s) of vertices connected to each other but not connected to the rest of the mesh. Connected components targeted for removal may include components with a number of triangles or vertices lower than a user-defined threshold (e.g., 8) and/or an area below a user-defined threshold (e.g., 0.1% of the original mesh area). Such small connected components are expensive to encode and have a limited impact on the final visual quality of the model.

The connected components removal criteria could be chosen to be fixed for the entire mesh, or adaptive based on local surface properties or user-provided information describing the importance or saliency subparts of the mesh. For example, for a mesh including a representation of a person, heightened removal criteria (resulting in fewer removed small connected surfaces) could be employed for a region depicting a head, while relaxed removal criteria (resulting in more removed small connected surfaces) could be employed for a region depicting a body. Additionally or alternatively, the small connected component removal thresholds may be tuned based on rate/distortion criteria, complexity criteria, power consumption criteria, resulting bitrate, etc. In at least some embodiments, these thresholds may be provided by or derived from feedback from the encoder module (as illustrated in FIG. 4).

Atlas Parameterization

Figure 22:
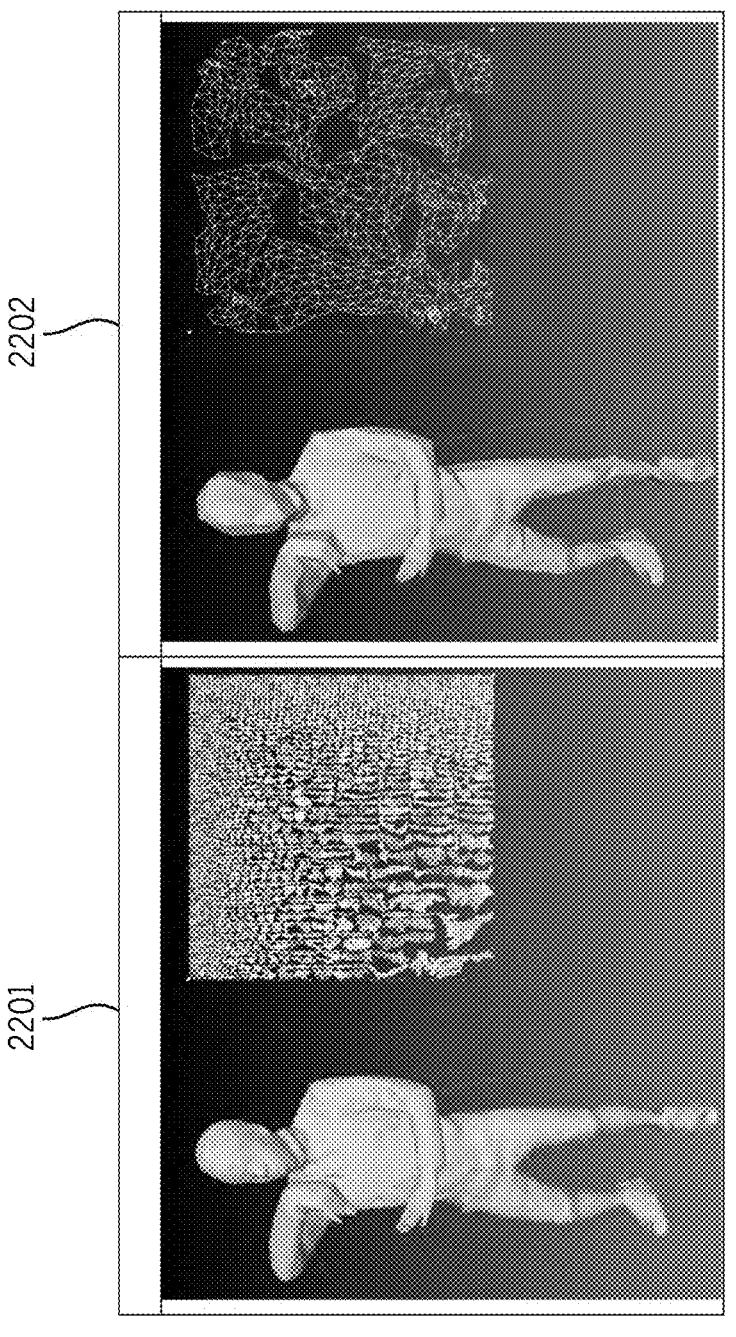
FIG. 22 illustrates mesh parameterization with a reduced number of patches.

The parameterization information associated with the input mesh M(i) could be sub-optimal in it may define a high number of small patches (see FIG. 22) making it hard to decimate, re-mesh, and compress. Instead of trying to preserve the initial parameterization during the simplification process, it can be optionally be recomputed by the Atlas Parameterization Module 2005 using techniques such as those described in References [B6], [B7] applied to the decimated mesh dm(i) or the decimated mesh with duplicated triangles and/or small connected components removed cm(i). As shown in FIG. 22, the parameterized decimated mesh 2202 has only nine patches, compared to the original mesh 2201, which has more than 100 patches.

Mesh Subdivision

The remeshing system described herein can employ a Mesh Subdivision Module 2006 implementing various mesh subdivision techniques, such as those described in References [B9], [B10]. The remeshing techniques described herein can be used with these or any other subdivision technique. For triangular meshes, the mid-edge interpolation, loop, butterfly, and Catmull-Clark subdivision techniques are among the most popular. These methods offer various compromises in terms of computational complexity, generality (e.g., applicability to triangular meshes vs. tri/quad or polygonal meshes), and power of approximation and smoothness of the generated surfaces, which may impact the rate distortion performance of the encoder module.

Initial Mesh Deformation

The Initial Mesh Deformation Module 2007 can move the vertices of subdivided mesh S(i) so that it has a shape close to the input mesh M(i). The quality of this approximation can directly impact the rate distortion performance of the encoder. One proposed algorithm can proceed as follows: (1) For each vertex v of the subdivided mesh S(i), let Pos(v) indicate its initial 3D position and let N(v) indicate its normal vector. (2) For each initial 3D position Pos(v), find the nearest point H(v) on the surface of the projected mesh P(i), such that the angle between the normal N(v) and the normal to H(v) is below a user-defined threshold. Various distances could be used, including without limitation, L1, L2, Lp, Linf. The threshold could be fixed for the entire mesh, or could be adaptive based on local surface properties and/or user-provided information describing the importance or saliency of subparts of the mesh (e.g., face vs. body). Additionally or alternatively, the threshold could be based on rate distortion criteria or other criteria (e.g., complexity, power consumption, bitrate, etc.) provided as feedback from the encoder module (as shown in FIG. 4).

H(v) can be identified by an index of the triangle to which it belongs (tindex(v)) and its barycentric coordinates (a, b, c) relative to that triangle. Because the projected mesh P(i) and mesh UM(i) have a 1-to-1 mapping between their vertices (i.e., they have the same connectivity), we can compute a point H'(v) located on UM(i) by using the barycentric coordinates (a, b, c) relative to the triangle with the index tindex(v) of the mesh UM(i).

Iterative Mesh Deformation

The Iterative Mesh Deformation Module 2008 can have as an input deformed mesh F0(i) and can generate therefrom a final deformed mesh F(i). The Iterative Mesh Deformation Module 2008 can iteratively apply an algorithm including:

Recomputing normal vectors associated with the mesh vertices (see Reference [B11]).

For each vertex v of the deformed mesh with position Pos(v), finding its nearest point H(v) on input mesh M(i), such that the angle between the normal vectors associated with Pos(v) and H(v) is below a user-defined threshold.

As noted above, nearest point can mean the point having the smallest distance, with various distances being used such as L1, L2, Lp, Linf, etc.

Also as noted above, the threshold could be fixed for the entire mesh, adaptive based on local surface properties and/or user-provided information describing the importance or saliency of subparts of the mesh (e.g., face vs. body), and/or based on rate distortion criteria or any other criteria (e.g., complexity, power consumption, bitrate) provided as feedback from the encoder module (see FIG. 3).

Moving the vertex v to the new position determined by:

$$Pos(v) + <H(v) - Pos(v), N(v)> * N(v)$$

where $<H(v)\text{-}Pos(v), N(v)>$ is the dot product of the two 3D vectors H(v)-Pos(v) and N(v) and where N(v) is the normal vector at Pos(v).

Optionally checking that no triangle was flipped (i.e., no normal vector was inverted) by the previous step, otherwise do not move the vertex v and flag the vertex as a missed vertex. This step can help ensure a better remeshing result.

Optionally applying mesh smoothing algorithms, such as those described in References [10], [11] to the missed vertices, while considering the updated positions for the other vertices.

Optionally applying mesh smoothing algorithms, such as those described in References [10], [11] to all vertices and adjusting the parameters to reduce the smoothing intensity depending on the fitting iteration index and other criteria. The smoothing could be applied to the vertex positions and/or to the displacement vectors with respect to the initial mesh.

The number of deformation iterations, i.e., the number of iteration through the algorithm described above, can be a parameter provided by the user or automatically determined based on convergence criteria (e.g., the displacements applied in the last iteration fall below a user-defined threshold).

Base Mesh Optimization

The Base Mesh Optimization Module 2009 can take as inputs the final subdivided deformed mesh F(i) and the decimated mesh pm(i). If iterative mesh deformation is omitted, then the initial deformed mesh F0(i) may be substituted for final deformed mesh F(i). The Base Mesh Optimization Module 2009 can then update the positions of pm(i) to minimize the distance between the subdivided versions of pm(i) and F(i) (or F0(i)). In some embodiments, this could be achieved by solving a sparse linear system. One possible method to efficiently solve such sparse linear systems is the Conjugate Gradient Method (see, e.g., Reference[B15]. Other techniques could also be used.

Computing Displacements

The Displacement Computation Module 2010 can compute displacements d(i) by taking the difference between the positions of F(i) (or F0(i) and the subdivided version of pm(i), to exploit correlations between the two meshes and produce a more compressible representation. The resulting displacement field d(i) can then fed as input to the encoder module (along with base mesh m(i) as described above in Section 1.

Time Consistent Re-Meshing

The remeshing procedure described above handles every frame M(i) independently. While this is optimal for intra coding, time-consistent remeshing may allow better temporal prediction for both mesh and image data. For time-consistent remeshing, one concept is reusing a base mesh pm(j) associated with a reference frame M(j) for a base mesh pm(i) having the same connectivity. By ensuring that a 1-to-1 mapping between pm(i) and pm(j) exists, and that pm(i) and pm(j) have the same number of vertices, number of triangles (or polygons), texture coordinates, and texture coordinate triangles (or polygons), pm(i) and pm(j) will differ only by the positions of their vertices. There are thus two distinct cases: (1) the input meshes M(i) and M(j) themselves are temporally coherent or (2) the input Meshes M(i) and M(j) are not temporally coherent.

In the first case, i.e., if the input meshes M(i) and M(j) are temporally coherent, only the subdivision surface fitting module can be applied. In other words, there need be no simplification or pre-filtering of duplicated vertices and connected components). In that case, the inputs of the Fitting Subdivision Surface module 2011 (made up of components 2006-2010, discussed above) can be input mesh M(i), projected mesh P(j) (from the reference frame), and decimated mesh pm(j) (also from the reference frame) rather than M(i), P(i), pm(i).

In the second case, i.e., if the input meshes M(i) and M(j) are not temporally coherent, a deformed version of M(j) denoted M'(j) that has the same shape as M(i) may be generated. M'(j) may be generated using techniques such as those described in References [B12], [B13], [B14] (or similar techniques). Then, one can proceed as above, applying only the Fitting Subdivision Surface Module 2011, providing as inputs M'(j), P(j), pm(j) instead of M(i), P(i), and pm(i).

References for the preceding section relating to Remeshing for Efficient Compression, each of which is incorporated by reference in its entirety:

[B1] https://github.com/rbsheth/Open3DGC
[B2] https://google.github.io/draco/
[B3] https://www.cs.cmu.edu/~garland/Papers/quadrics.pdf
[B4] http://jerrytalton.net/research/t-ssmsa-04/paper.pdf
[B5] https://graphics.stanford.edu/courses/cs468-10-fall/LectureSlides/08_Simplification.pdf
[B6] https://graphics.stanford.edu/courses/cs468-05-fall/Papers/param-survey.pdf
[B7] https://www.semanticscholar.org/paper/Iso-charts%3A-stretch-driven-mesh-parameterization-Zhou-Snyder/27b260713ad9802923aec06963cd5f2a41c4e20a
[B8] https://members.loria.fr/Bruno.Levy/papers/LSCM_SIGGRAPH_2002.pdf
[B9] https://en.wikipedia.org/wiki/Subdivision_surface
[B10] https://graphics.pixar.com/opensubdiv/docs/intro.html
[B11] https://cs.nyu.edu/~perlin/courses/fall2002/meshnormals.html
[B10] https://graphics.stanford.edu/courses/cs468-12-spring/LectureSlides/06_smoothing.pdf
[B11] https://www.medien.ifi.lmu.de/lehre/ws2122/gp/slides/gp-ws2122-3-smooth.pdf
[B12] https://lgg.epfl.ch/publications/2008/sgp2008GCO.pdf
[B13] https://arxiv.org/abs/2004.04322
[B14] https://people.inf.ethz.ch/~sumnerb/research/embdef/Sumner2007EDF.pdf
[B15] http://math.stmarys-ca.edu/wp-content/uploads/2017/07/Mike-Rambo.pdf Section 3: Attribute Transfer for Efficient Dynamic Mesh Coding As noted above, static/dynamic meshes can be represented as a set of 3D Meshes M(0), M(1), M(2), . . . , M(n). Each mesh M(i) can be defined by a connectivity C(i), a geometry G(i), texture coordinates T(i), and a texture connectivity CT(i). Each mesh M(i) can be associated with one or more 2D images A(i, 0), A(i, 1) . . . , A(i, D–1), also referred to as attribute maps. The attribute maps describe a set of attributes associated with the mesh surface. An example of attribute would be texture information (see FIGS. 2, 3, 23). A set of vertex attributes could also be associated with the vertices of the mesh such as colors, normal, transparency, etc.

Figure 23:
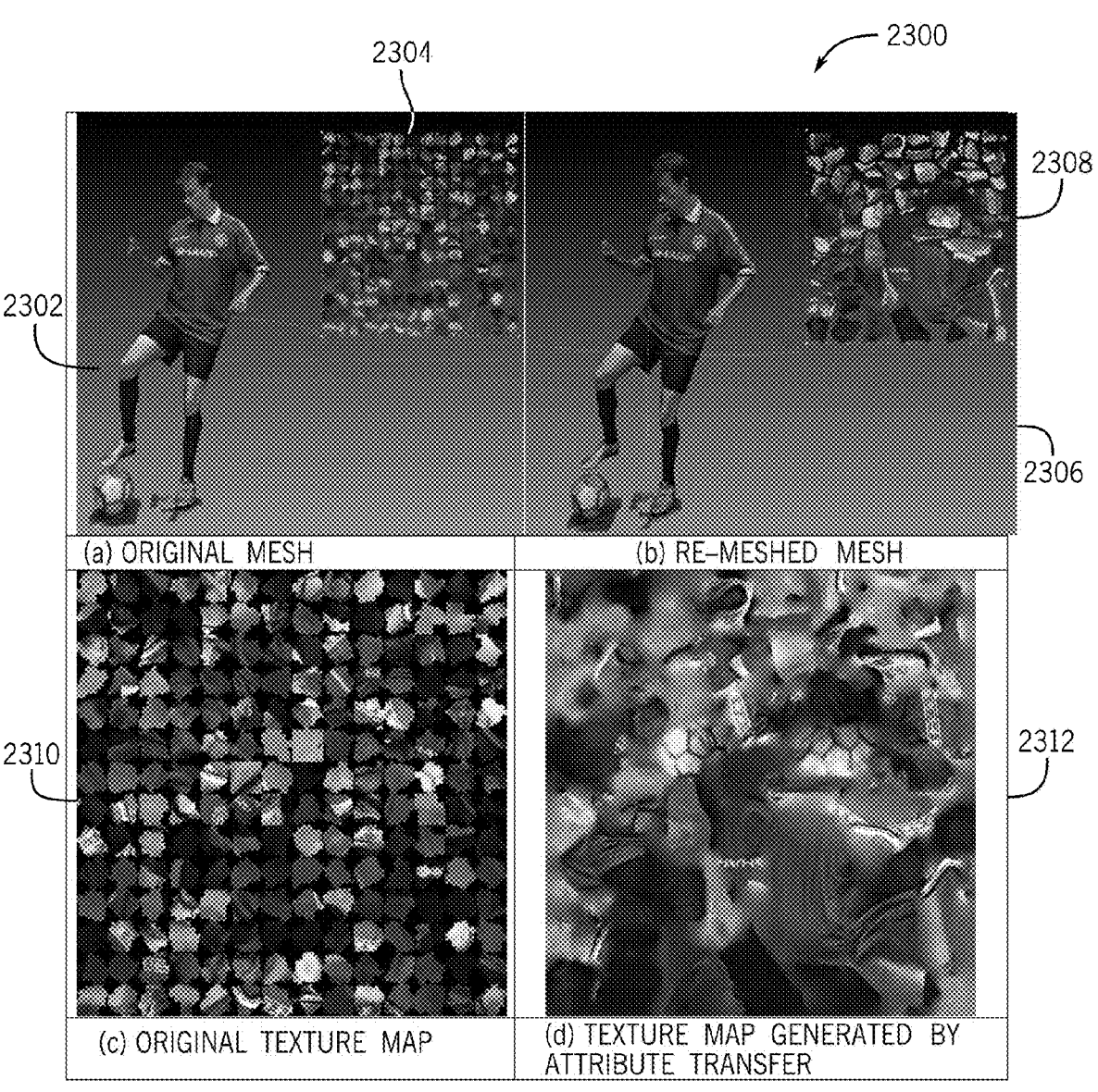
FIG. 23 illustrates an example of attribute transfer after re-meshing.

When coding a dynamic mesh, a pre-processing stage, such as described above, may be applied to produce a more compression-friendly version of the input mesh. Such pre-processing can involve re-meshing (i.e., re-sampling) and re-parameterization (i.e., computing a new atlas of parameterization with a fewer number of patches and low parameterization distortion). Once the mesh is re-sampled, an attribute transfer may be performed. The attribute transfer can include computing new attribute maps coherent with the re-meshed and/or re-parametrized mesh. For example, FIG. 23 illustrates an example 2300 of attribute transfer after re-meshing. First, an original input mesh 2302 and associated patches 2304 are obtained. The original input mesh 2302 may be re-meshed/re-sampled via the pre-processing stage described herein, resulting in a re-meshed mesh 2306. As illustrated by the updated patches 2308 associated with the re-meshed mesh 2306, a new atlas associated with the re-meshed mesh 2306 may be computed, which may provide a fewer number of patches and low paramterization distortion. Thus, once the original mesh 2302 is re-meshed/resampled, new attribute maps coherent with the re-meshed mesh 2306 may be computed via an attribute transfer from an original texture map 2310 to an updated texture map 2312 associated with the re-meshed mesh 2306.

Figure 24:
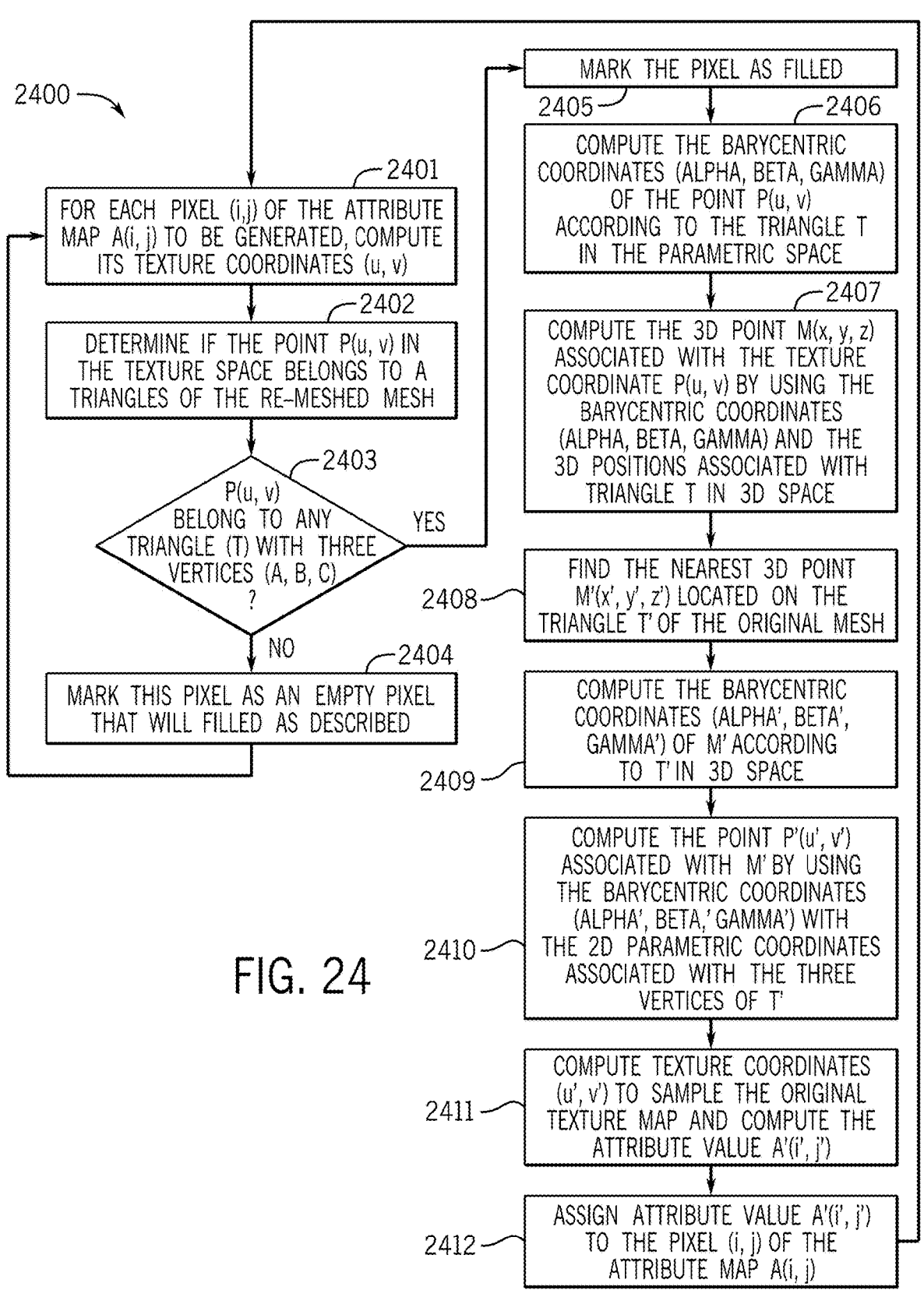
FIG. 24 illustrates the attribute transfer process.
Figure 25:
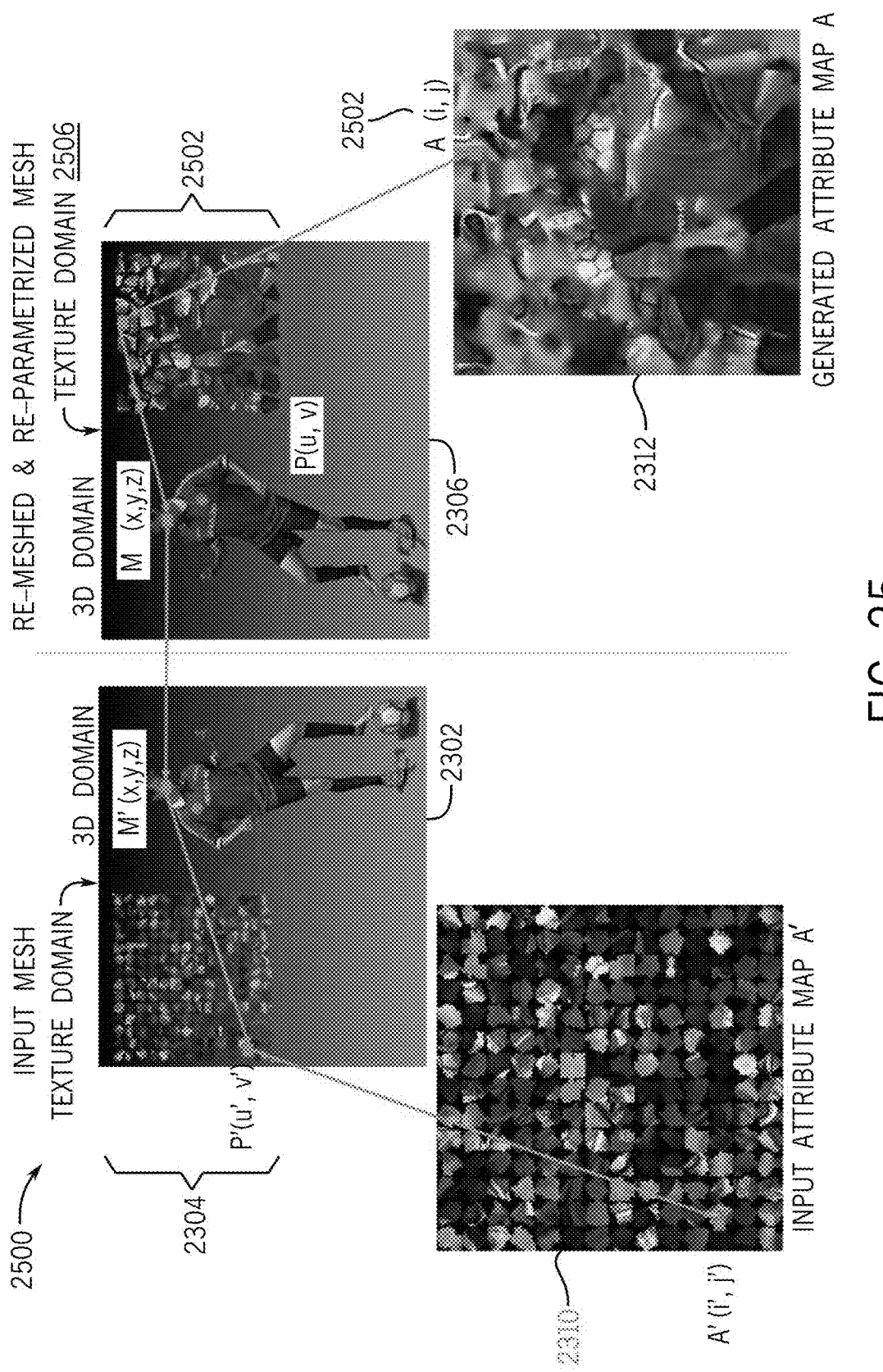
FIG. 25 illustrates an example implementation of the attribute transfer process.

A detailed discussion of the attribute transfer process is described below with respect to FIGS. 24-27. FIG. 24 illustrates the attribute transfer process 2400. FIG. 25 provides an example implementation 2500 of the attribute transfer process. For clarity, these figures will be discussed together.

Turning to FIG. 24, the process 2400 may be run for each pixel A(i, j) of the attribute map to be generated A. First, the texture coordinate (u, v) for each pixel (i, j) of the attribute map to be generated A(i, j) is computed (block 2401). For example, in FIG. 25, the attribute map to be generated A (e.g., the texture map 2312 associated with the re-meshed mesh 2306) pixel A(i,j) 2502 is associated with coordinate (u, v) 2504 in the texture domain 2506 that includes the updated patches 2308 associated with the re-meshed mesh 2306.

Next, a determination is made as to whether the point P(u, v) in the texture space belongs to any triangles of the re-meshed mesh (block 2402). For example, in FIG. 25, a determination is made as to whether the point P(u, v) associated with the coordinate (u, v) 2504 is associated with at least one of the updated patches 2308.

If P(u, v) does not belong to any triangles (block 2403, No), this pixel is marked as an empty pixel (block 2404) that will filled as described by the process 2700 of FIG. 27 and the empty pixel padding process described below.

Otherwise, if P(u, v) belongs to a triangle (T) defined by the three vertices (A, B, C) (block 2403, Yes), the pixel is marked as filled (block 2405). Barycentric coordinates (alpha, beta, gamma) of the point P(u, v) according to the triangle T in the parametric space are computed (block 2406).

The 3D point M(x, y, z) associated the texture coordinate P(u, v) is computed by using the barycentric coordinates (alpha, beta, gamma) and the 3D positions associated with the Triangle T in 3D space (block 2407). For example, in FIG. 25, the 3D point M(x, y, z) of the 3D domain of the re-meshed mesh 2306 is identified.

Next, the nearest 3D point M'(x', y', z') located on the triangle T' of the original mesh is identified (block 2408). The barycentric coordinates (alpha', beta', gamma') of M' are computed according to T' in 3D space (block 2409). For example, as illustrated in FIG. 25, the 3D point M'(x, y, z) is identified in the 3D domain of the original mesh 2302 based upon the point M(x, y, z) of the re-meshed mesh 2306.

The point P'(u', v') associated with M' is computed by using the barycentric coordinates (alpha', beta', gamma') with the 2D parametric coordinates associated with the three vertices of T' (block 2410). For example, as illustrated in FIG. 25, the point P'(u', v') is identified based upon the point M'(x, y, z) and a Triangle (T') of M'.

The texture coordinates (u', v') of the point P'(u', v') are computed to sample the original texture map and compute the attribute value A'(i', j') of the input attribute map (block 2411). Bilinear interpolation, nearest neighbor interpolation, patch-aware bilinear interpolation, patch-aware nearest neighbor interpolation, and/or other interpolation method may be used to compute these coordinates. The attribute value A'(i', j') may then be assigned to the pixel (i, j) of the attribute map A(i, j), resulting in an attribute transfer to the generated attribute map (block 2412). For example, the generated texture map 2312 illustrates pixels filled with values from the original texture map 2310 upon completion of the process 2400 for each pixel of the generated texture map 2312.

Figures 26, 27:
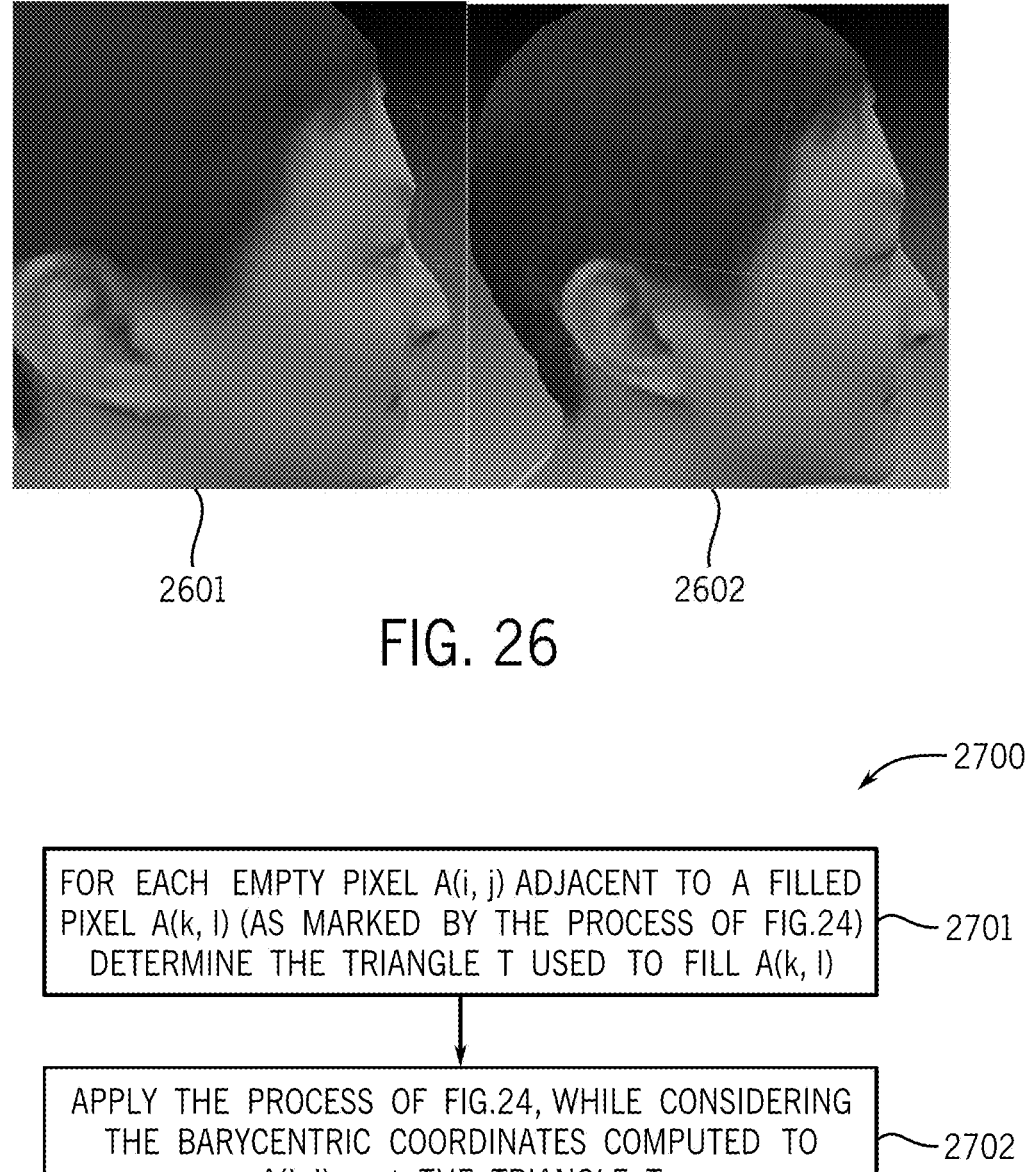
FIG. 26 illustrates discontinuities on boundary edges.
FIG. 27 illustrates a process for seam edge discontinuity mitigation.

When implemented, the process described in FIGS. 24 and 25 may generate discontinuities on the parameterization seams, as illustrated in the left side image 2601 of FIG. 26 as compared to right side image 2602. Indeed, edges located on the parameterization seams may correspond to the patch boundaries. Each seam edge in 3D space is mapped to two edges in the texture space due to the cut operation used to flatten the mesh. Because the algorithm described in the previous section computes the color for each pixel in the texture domain independently without considering the seams, inconsistent colors may be produced on the edges. This can be further exacerbated by the bilinear interpolation used during the rendering process. Potential solutions to address such problems are described in [C1] and [C2].

However, References [C1] and [C2] may be complex solutions that utilize significant processing resources and/or processing time. Accordingly, a relatively lower complexity alternative to [C1] and [C2], which results in the remediation of discontinuities illustrated in the right side of FIG. 26, is provided in FIG. 27. In the seam edge discontinuity process 2700 of FIG. 27, for each empty pixel A(i, j) adjacent to a filled pixel A(k, l) (e.g., as marked by the process of FIG. 24) the triangle T used to fill A(k, l) is determined (block 2701).

Next, the process 2400 described above with respect to FIG. 24 is applied (block 2702), while considering the barycentric coordinates computed for A(i, j) with respect to the triangle T. In other words, when a pixel A(i, j) is empty, the process 2400 may use a triangle T used to fill an adjacent pixel in determining an attribute value to transfer for A(i, j).

This results in an attribute transfer for A(i, j), despite the pixel A(i, j) being empty, resulting in a reduction of seam edge discontinuity. Accordingly, the pixel A(i, j) may be marked as filled and the index of the triangle T may be stored (block 2703).

The process of FIG. 27 may be applied one or multiple times. The number iterations of the process of FIG. 27 may be controlled via a parameter that may be provided by a user and/or computed automatically (e.g., based upon processing resource availability, mesh characteristics, etc.). As may be appreciated, the process of FIG. 27, by focusing on empty pixels, does not change values of pixels computed in the attribute transfer process of FIG. 24. Instead, the process of FIG. 27 fills the pixels adjacent to those filled in process of FIG. 27 to favor consistent colors on seam edges by leveraging the attribute consistency in the 3D space.

Figure 28:
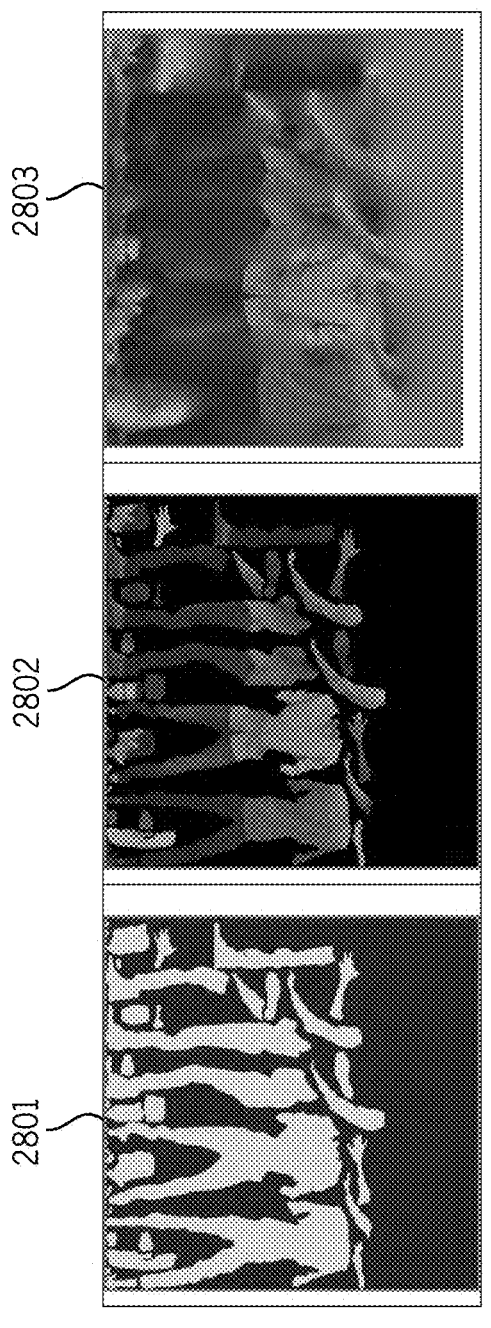
FIG. 28 illustrates an example of attribute padding.

After applying the attribute transfer process 2400 of FIG. 24 and the seam edge mitigation process 2700 of FIG. 27, only a subset of the attribute map pixels may be filled. For example, the occupancy map 2801 of FIG. 28 indicates whether a pixel is empty or full. A padding algorithm may be used to fill the remaining empty pixels with colors, making the attributes smoother and/or easier to compress. In particular, a push-pull algorithm, such as that described in Reference [C3] may be applied to the initial attribute map 2802 to identify an initial padding solution used to fill the empty pixels. The initial solution can be refined by applying the iterative algorithm described in Applicant's co-pending U.S. patent application Ser. No. 16/586,872, entitled "Point Cloud Compression Image Padding", filed on Sep. 27, 2019, which is incorporated by reference herein. This technique includes filling empty spaces in the image frame with a padding, wherein pixel values for the padding are determined based on neighboring pixels values such that the padding is smoothed in the image frame. The resulting padding can be combined with initial attribute map 2802 to produce padded attribute map 2803.

References for the preceding section relating to Attribute Transfer for Efficient Dynamic Mesh Coding, each of which is incorporated by reference in its entirety:

[C1] https://www.sebastiansylvan.com/post/LeastSquaresTextureSeams/

[C2] https://cragl.cs.gmu.edu/seamless/

[C3] https://citeseerx.ist.psu.edu/viewdoc/download? doi=10.1.1.219.7566&rep=rep1& type=pdf Section 4: Motion Compression for Efficient Dynamic Mesh Coding As noted above, a static/dynamic mesh can be represented as a set of 3D Meshes M(0), M(1), M(2), . . . , M(n). Each mesh M(i) can be defined by be a connectivity C(i), a geometry G(i), texture coordinates T(i), and a texture connectivity CT(i). Each mesh M(i) can be associated with one or more 2D images A(i, 0), A(i, 1) . . . , A(i, D−1), called also attribute maps, describing a set of attributes associated with the mesh surface. An example of attribute would be texture information (see FIGS. 2-3). A set of vertex attributes could also be associated with the vertices of the mesh such as colors, normal, transparency, etc.

Dynamic meshes may exhibit high temporal correlation because they can correspond to smooth motion and/or smooth changes in attribute characteristics. When coding a dynamic mesh as described above in Section 1, attribute temporal correlations can be efficiently exploited by video encoders to provide more efficient compression. Disclosed herein are techniques for compressing motion data—i.e., the geometry and vertex attribute changes from one frame to another—associated with such representations. An input mesh (e.g., M(i)) can be subdivided into a set of patches P(i, j), where i is the frame index and j is the patch index. The input data could come with a time consistent structure, which can ensure that at least a subset of patches in a current frame have the same connectivity as corresponding patches in a reference frame. If the input data does not have such a time consistent structure, a pre-processing step that includes applying a time consistent remeshing could be applied as described in Section 2, above.

In either case, once a time consistent mesh sequence is received, P(i, j) can be a patch j of current frame i, and P(k, l) can be a corresponding patch the patch 1 of a reference frame k. Because of the above-described time consistency, P(i, j) and P(k, l) can have the same connectivity (i.e., the same number of vertices and faces). P(i,j) and P(k,l) may thus differ only in terms of the respective positions or vertex attributes. These differing positions and/or vertex attributes can be compressed by applying quantization (FIG. 29, 2901), spatio-temporal prediction (FIG. 29, 2902), and entropy coding (FIG. 29, 2903), as described in greater detail below.

Quantization

In some embodiments, the Quantization module (FIG. 29, 2901) uniform quantization can be applied to vertex positions and/or vertex attributes. Using uniform quantization, the same number of quantization bits (quantitation levels) may be applied to all vertices or attributes. Alternatively, in some embodiments, adaptive quantization schemes may be employed. Adaptive quantization schemes can use coarser quantization (fewer bits/levels) for some regions with finer quantitation (more bits/levels) for other regions. Such adaptive quantization schemes may adaptively change the quantization step size based on used-provided input (e.g., user identification of a region of interest (ROI), such as a face for a mesh depicting a person). Additionally or alternatively, an adaptive quantization scheme can adaptively change the quantization step size based on analysis of the dynamic mesh, as described in Reference [D1], for example. The analysis can take place either online or offline. In any case, care may need to be taken to avoid introducing cracks at patch boundaries, e.g., because of different quantization levels on either side of the boundary.

Spatio-Temporal Prediction

The Prediction Module (FIG. 29, 2902) can leverage either or both of the shared connectivity information (spatial information) and the reference frame P(k,l) (temporal information) to efficiently predict geometry and/or vertex attributes associated with the vertices of the patch P(i,j). A variety of "predictors" may be implemented by the Prediction Module.

These predictors may be used individually or in combination as appropriate for a given embodiment. In this foregoing predictor description, the following notations are used.

Pos(i, j, v) is the vertex position of vertex v in the current patch P(i, j);

$Pos(i,j,v_0)$, . . . , $Pos(i,j, v_{n-1})$ are the positions of the neighboring vertices $v_0 \ldots v_{n-1}$ (neighbors of vertex v) that have already been encoded or decoded and are available to be used for prediction;

Pos(k, l, v) is the position of vertex v in reference patch P(k, l); and $Pos(k, l, v_0)$, . . . , $Pos(k, l, v_{n-1})$ are the positions of the neighboring vertices $v_0 \ldots v_{n-1}$ in the reference patch P(k, l).

With the above-described notation in mind, the Prediction Module 2902 can implement different predictors as described below. As a few non-limiting examples:

A delta temporal predictor can use temporal information (but not spatial information) to generate the residual p(i, j, v) (defining the difference between the current frame and the reference frame) as follows:

$$\rho(i,j,v)=Pos(i,j,v)-Pos(k,l,v)$$

An average spatial predictor can use spatial information (but not temporal information) to generate the residual ρ(i,j,v) as follows:

$$\rho(i, j, v) = Pos(i, j, v) - \frac{1}{n}\sum_{h=0}^{n-1} Pos(i, j, v_h)$$

An average predictor can use temporal and spatial information to generate the residual ρ(i,j, v) as follows:

$$\rho(i, j, v) = Pos(i, j, v) - \left(Pos(k, l, v) + \frac{1}{n}\sum_{h=0}^{n-1} Pos(i, j, v_h) - Pos(k, l, v_h)\right)$$

A spatial parallelogram predictor can use spatial information to predict residuals based on parallelograms as follows:

$$\rho(i,j,v)=\text{Pos}(i,j,v)-\Pi(i,j,v)$$

where:

$$\Pi(i,j,v)=\text{Pos}(i,j,v_a)+\text{Pos}(i,j,v_b)-\text{Pos}(i,j,v_c)$$

A spatial-temporal parallelogram prediction predictor can use both spatial and temporal information to predict residuals based on parallelograms as follows:

$$\rho(i,j,v)=\text{Pos}(i,j,v)-(\Pi(i,j,v)+\text{Pos}(k,l,v)-n(k,l,v))$$

Geometry-guided predictors as described in Applicant's co-pending U.S. Provisional Patent Applications 63/197,288, entitled "Compression of Attribute Values Comprising Unit Vectors," and 63/197,287, entitled "Attribute Value Compression for a Three-Dimensional Mesh Using Geometry Information to Guide Prediction," both filed Jun. 4, 2021.

Other predictors, such as those described in References [D6], [D7], [D8], [D9], [D10], [D11], [D12].

In some embodiments, the encoder could evaluate multiple different predictors and choose the one that produces the rate distortion performance, i.e., the best tradeoff between number of bits used to encode the motion information and the distortion effects of the encoded mesh as compared to the original mesh. For whatever predictor is used, the index of the predictor (i.e., the identification of the predictor used) together with the prediction residuals can be entropy encoded as described below for transmission to a decoder.

Entropy Coding

Figure 29:
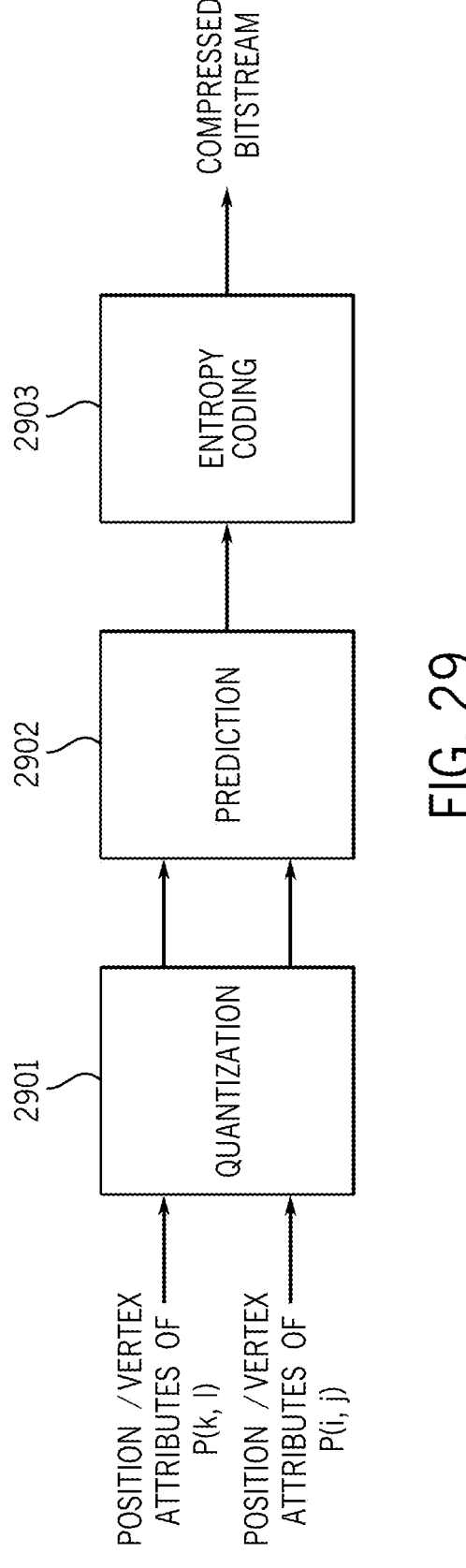
FIG. 29 illustrates a block diagram of a proposed motion compression system.

As noted above, the predictor index and prediction residuals can be efficiently coded by applying an entropy encoder (2903, FIG. 29). Examples of suitable entropy encoders can include, but are not limited to context adaptive binary arithmetic coders (CABAC) (see, e.g., Reference [D2]), Huffman encoders (see, e.g., References [D3] and [D4]) combined with universal codes (see, e.g., Reference [D5]), etc. FIG. 30 shows an example employing a CABAC encoder together with Exponential Golomb codes to compress both predictor index and prediction residuals. The example of FIG. 30 is but one possible implementation of such an algorithm, and other implementations and/or other algorithms are possible and contemplated.

Other Extensions

In at least some embodiments, motion encoding of mesh data may be extended in other ways. As one example, one could use the MPEG FAMC (Frame-based Animated Mesh Compression) standard. See, e.g., References [D15], [D16]. In at least some embodiments, wavelet-based coding schemes, such as the one described in References [D13], [D14] could be used. In at least some embodiments, principal component analysis (PCA) based coding (as described in Reference [D17]) could be used.

References for the preceding section relating to Motion Compression for Efficient Dynamic Mesh Coding, each of which is incorporated by reference in its entirety:

[D1] https://www.sciencedirect.com/topics/computer-science/adaptive-quantization

[D2] https://en.wikipedia.org/wiki/Context-adaptive_binary_arithmetic_coding

[D3] https://en.wikipedia.org/wiki/Huffman_coding

[D4] https://en.wikipedia.org/wiki/Asymmetric_numeral_systems

[D5] https://en.wikipedia.org/wiki/Universal_code_(data_compression)

[D6] L. Ibarria et J. Rossignac. Dynapack: space-time compression of the 3D animations of triangle meshes with fixed connectivity. In Eurographics Symposium on Computer Animation, pages 126-133, San Diego, États-Unis, 2003.

[D7] N. Stefanoski et J. Ostermann. Connectivity-guided predictive compression of dynamic 3D meshes. In IEEE International Conference on Image Processing, pages 2973-2976, Atlanta, États-Unis, 2006.

[D8] J.-H. Yang, C.-S. Kim, et S.-U. Lee. Compression of 3-D triangle mesh sequences based on vertex-wise motion vector prediction. IEEE Transactions on Circuits and Systems for Video Technology, 12(12):1178-1184, 2002.

[D9] N. Stefanoski, P. Klie, X. Liu, et J. Ostermann. Scalable linear predictive coding of time-consistent 3D mesh sequences. In The True Vision-Capture, Transmission and Display of 3D Video, pages 1-4, Kos Island, Greece, 2007.

[D10] N. Stefanoski, X. Liu, P. Klie, et J. Ostermann. Layered predictive coding of time-consistent dynamic 3D meshes using a non-linear predictor. In IEEE International Conference on Image Processing, pages 109-112, San Antonio, États-Unis, 2007.

[D11] V. Libor et S. Vaclav. Coddyac: Connectivity driven dynamic mesh compression. In 3DTV International Conference: True Vision-Capture, Transmission and Display of 3D Video, Kos Island, Greece, 2007.

[D12] M. Sattler, R. Sarlette, et R. Klein. Simple and efficient compression of animation sequences. In Eurographics Symposium on Computer Animation, pages 209-217, Los Angeles, États-Unis, 2005.

[D13] I. Guskov et A. Khodakovsky. Wavelet compression of parametrically coherent mesh sequences. In Eurographics Symposium on Computer Animation, pages 183-192, Grenoble, France, 2004.

[D14] J. W. Cho, M. S. Kim, S. Valette, H. Y. Jung, et R. Prost. 3D dynamic mesh compression using wavelet-based multiresolution analysis. In IEEE International Conference on Image Processing, pages 529-532, Atlanta, États-Unis, 2006.

[D15] K. Mamou, T. Zaharia, F. Preteux, A skinning approach for dynamic 3D mesh compression, Computer Animation and Virtual Worlds, Vol. 17(3-4), July 2006, p. 337-346.

[D16] K. Mamou, N. Stefanoski, H. Kirchhoffer, K. Muller, T. Zaharia, F. Preteux, D. Marpe, J. Ostermann, The new MPEG-4/FAMC standard for animated 3D mesh compression, 3DTV Conference (3DTV-CON 2008), Istanbul, Turkey, May 2008.

[D17] K. Mamou, T. Zaharia, F. Preteux, A. Kamoun, F. Payan, M. Antonini. Two optimizations of the MPEG-4 FAMC standard for enhanced compression of animated 3D meshes. IEEE International Conference on Image Processing (2008)

[D18] https://www.researchgate.net/publication/224359352_Two_Optimizations_of_the_MPEG-4_FAMC_standard_for_Enhanced_Compression_of_Animated_3D_Meshes/link/0912f50b3802603f34000000/download Section 5: V-Mesh Bitstream Structure Including Syntax Elements and Decoding Process with Reconstruction To better support Video Dynamic Mesh Coding (V-DMC) in the context of the V3C specification, new syntax elements may be introduced for handling the mesh information. Unlike V-PCC, V-DMC can be seen a scalable coding solution where an initial representation of the mesh is provided through what is referred to as the base mesh. Additional information is then included through the V3C framework, which enhances that representation. One of the enhancements introduced here is the inclusion of the base mesh information in a new substream, the base mesh data substream. This substream is, similar to the atlas and video coded sub streams, a timed series of coded mesh information. For more information about this substream we will refer the reader to Reference [D5].

Also, In V-DMC, the encoded geometry data are actually transformed and quantized data and their transformations may be inverted before used for the reconstruction process. In particular, after decoding the geometry video, the decoded data may be also processed through what is referred to as a "displacement" decoder. This decoder performs a dequantization process followed by an inverse transform process, as specified through instructions in the atlas data substream includes information about the quantization as well as the transform method used when encoding the geometry information.

Similar to the geometry information, additional processing may be performed to the base mesh information after its decoding. More specifically, after decoding the base mesh data, the resulting meshes may be subdivided through a mesh subdivision process. This process requires information, e.g. the subdivision method to be used among others, which may be indicated/included in the atlas data substream. The subdivided/resampled meshes are then refined by adding the displacements from the geometry displacement decoder. Additional information from the atlas data substream may be used to perform this final process. For example, the subpart id may be used to pair the displacements from the displacement decoder with the vertices in the resampled meshes.

To assist with the understanding of the concepts introduced in V-DMC we first introduce some essential terms and definitions:

Base meshes are the output of the base mesh substream decoder. Each base mesh can have a smaller number of vertices than the expected output of the V-DMC decoder.

Resampled base meshes are the output of the mesh subdivision process. Each base mesh can have the same number of vertices as the expected output of the V-DMC decoder.

A displacement video is the output of the displacement decoder. The inputs to the process is the decoded geometry video as well information from the atlas on how to interpret/process this video. The displacement video contains displacement values to be added to the corresponding vertices.

A facegroupId is one of the attribute types assigned to each triangle face of the resampled base meshes. FacegroupId can be compared with the ids of the subparts in a patch to determine the corresponding facegroups to the patch. If facegrouId is not conveyed through the base mesh substream decoder, it is derived by the information in the atlas data substream.

A submeshId is one of the attribute types assigned to each vertex of the resampled base meshes. SubmeshId can be compared with the ids of a segment to determine the corresponding vertices to the segment. If it is not conveyed through basemesh substream decoder, it is derived by the information in the atlas data substream.

Figure 31:
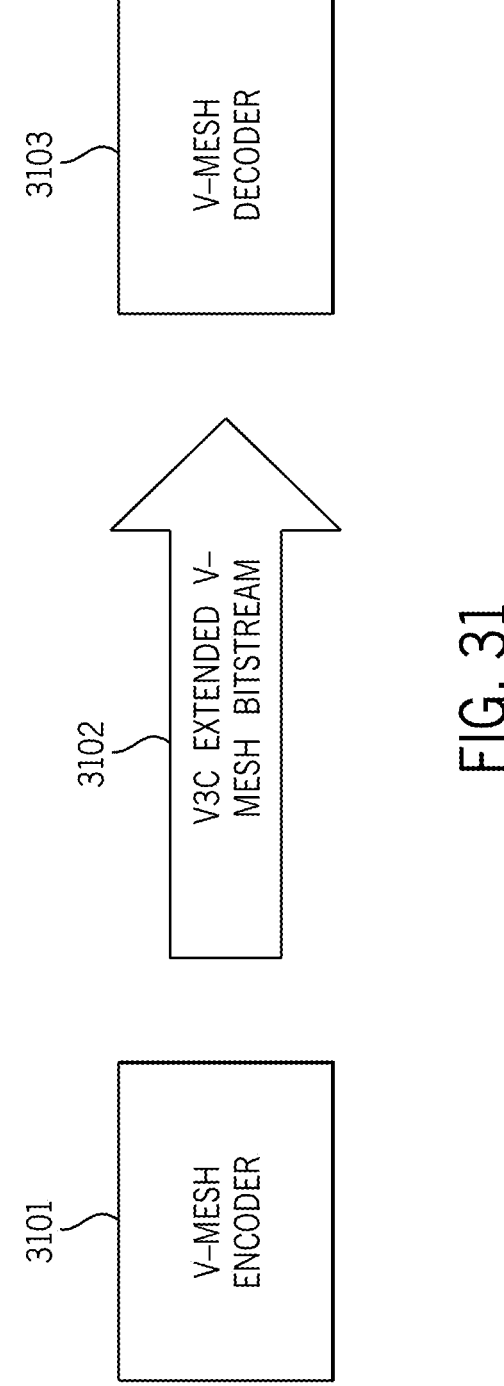
FIG. 31 illustrates an example V3C Extended V-mesh bitstream system block diagram.

As illustrated in FIG. 31, a 3D textured static and/or dynamic mesh may be encoded by V-mesh encoder 3101 into a V-mesh bitstream 3102 for subsequent decoding by a V-mesh decoder 3103. The V-mesh bitstream structure may be an extension of V3C for efficient processing, as discussed in more detail below. Details pertaining to encoding of the 3D textured static and/or dynamic meshes are discussed elsewhere herein, e.g., Section 1.

Figure 32:
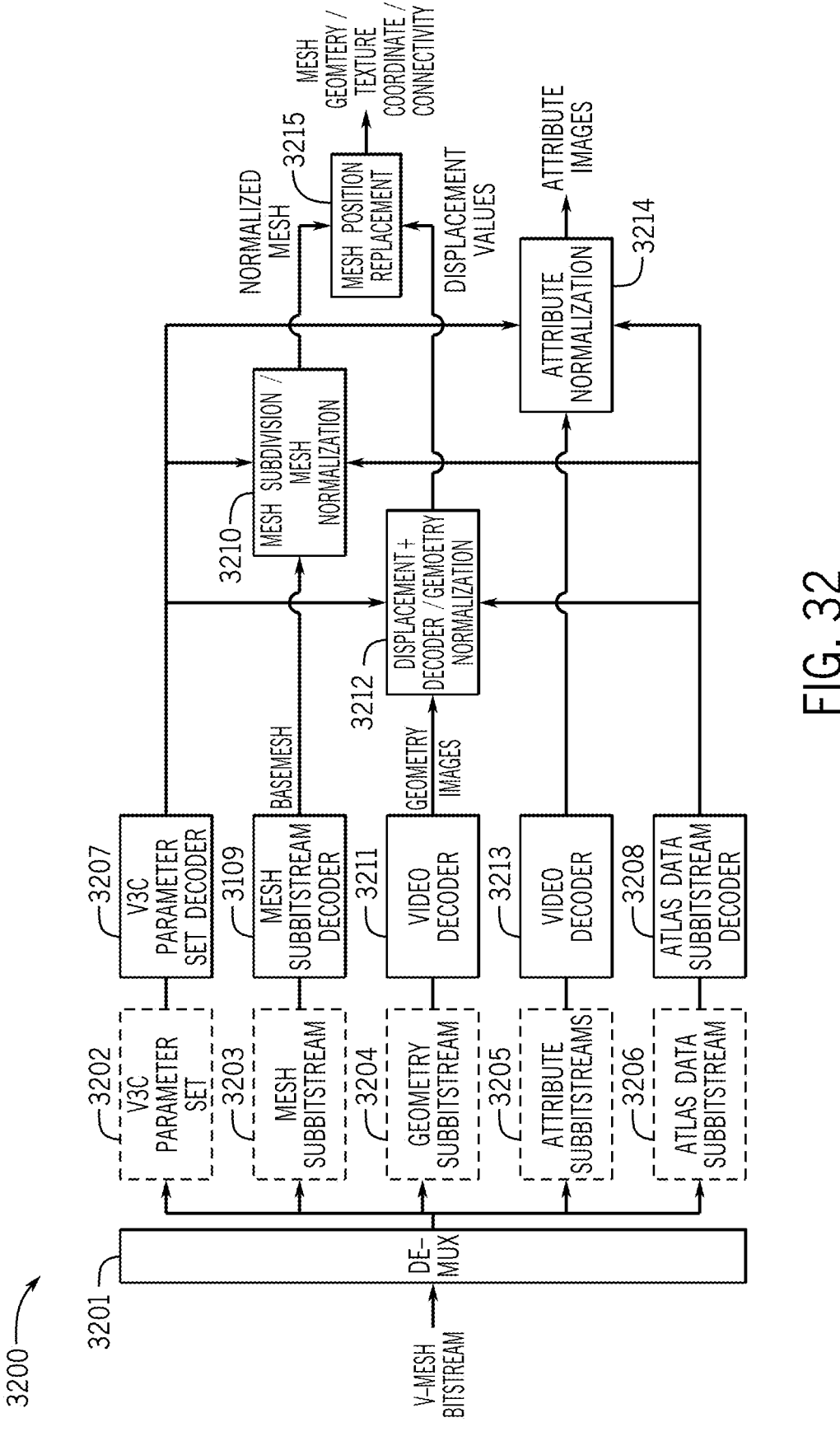
FIG. 32 illustrates a v-mesh decoder framework block diagram.

FIG. 32 illustrates an embodiment of a V-mesh decoder framework 3200. When a v-mesh bitstream is provided to the decoder, the decoder demultiplexes (3201) the bitstream into V3C parameter sets 3202, Mesh subbitstreams 3203, Geometry subbitstreams 3204, Attribute subbitstreams 3205 and Atlas data subbitstreams 3206, which may be incorporated into the V-mesh bitstream via the encoding process described above in Section 1. The parameter sets 3202 may be decoded via a parameter set decoder 3203 and the atlas data subbitstreams 3206 may be decoded via an atlas data subbitstream decoder 3208.

With the information provided through Parameter sets 3202 and Atlas data subbitstreams 3206, the other subbitstreams can be converted to proper forms through the normalization processes. For example, the mesh subbitstream 3203 can be decoded by the mesh subbitstream decoder 3209 into a base mesh, which can be normalized via the mesh subdivision/mesh normalization process 3210. The geometry subbitstream 3204 can be decoded by the video decoder 3211 into geometry images. The geometry images can be normalized via the displacement decoder/geometry normalization process 3212, resulting in displacement values. The attribute subbitstream 3205 can be decoded by the video decoder 3213 and the decoded output can be normalized by the attribute normalization process 3214, resulting in attribute images. (Video decoder 3211 can be the same as video decoder 3209 or a different video decoder as selected for a particular implementation.) The output mesh geometry, texture coordinates and connectivities are calculated by mesh position refinement process (3215) that combines the output of the mesh normalization process 3210 and the outputs of geometry normalization process 3212 to derive the resultant meshes (e.g., described by mesh geometry, texture coordinates, and connectivity). In comparison with FIGS. 18 and 19 above, the geometry normalization process includes inverse quantization and an inverse wavelet transformation. The attribute normalization process can also include color space conversion. The mesh normalization process can include some form of reconstructing the deformed mesh as described above.

As mentioned above, compressed base meshes may be signalled in a new substream, named as the Base Mesh data substream (e.g., with a unit type V3C_MD). As with other v3c units, the unit type, and its associated v3c parameter set id and atlas id are signalled in the v3c_unit_header( ). The suggested format of the mesh data substream is discussed further in Reference [D5]. To facilitate signaling of the compressed base mesh, the encoded bitstreams may be encoded in a manner that extends V3C. Accordingly, described below are enumerated syntax element examples that may be used specifically for 3D textured static and/or dynamic mesh decoding as well as existing syntax elements that may be configured for use with 3D textured static and/or dynamic mesh decoding.

V3C Parameter Set Extension Elements

Starting first with a discussion of modifications to V3C parameter set 3202 to support V-DMC, additional parameters and/or modified use of parameters n the VLC parameter set 3202 may be implemented. Below are examples of such additional parameters and/or modified use of existing parameters in the V3C parameter set 3202 to support V3C Unit type, V3C-MD—Identifier V3C_MD, tentatively vuh_unit_type=5, is assigned to indicate mesh subbitstreams. With this identifier, v3c_unit_header(and v3c_unit_payload( ) include processes for mesh subbitstreams as following:

(vps_extension_8bits>>N)&1 may be 1. Here the "N" is smaller than 8 and may be decided when the $2^{nd}$ edition of 23090-5 (Reference [E2]) is finalized. In the following example, N is set as 4. V3C_vmesh_extension can signaled as following:

```
v3c_parameter_set( numBytesInV3CPayload ) {
    ...
    vps_frame_width[ j ]
    vps_frame_height[ j ]
    ...
    if( vps_extension_8bits ) {
    vps_extension_length_minus1
    if( (vps_extension_8bits>>4) & 1 ){
        vps_vmesh_extension_length_minus1
    vps_v3c_vmesh_extension(vps_vmesh_extension_length_minus1+1)
        }
    }
    ...
}
```

20

| | descriptor |
|---|---|
| v3c_unit_header( ) { | |
| vuh_unit_type | u(5) |
| if( vuh_unit_type == V3C_AVD \|\| vuh_unit_type == V3C_GVD \|\| | |
| vuh_unit_type == V3C_OVD \|\| vuh_unit_type == V3C_AD \|\| | |
| vuh_unit_type==V3C_MD) { | |
| vuh_v3c_parameter_set_id | u(4) |
| vuh_atlas_id | u(6) |
| } | |
| ... | |
| else | |
| vuh_reserved_zero_27bits | u(27) |
| } | |
| v3c_unit_payload( numBytesInV3CPayload ) { | |
| if( vuh_unit_type == V3C_VPS ) | |
| v3c_parameter_set( numBytesInV3CPayload ) | |
| else if( vuh_unit_type == V3C_AD) | |
| atlas_sub_bitstream( numBytesInV3CPayload ) | |
| else if( vuh_unit_type == V3C_MD) | |
| mesh_sub_bitstream( numBytesInV3CPayload) | |
| else if( vuh_unit_type == V3C_OVD \|\| vuh_unit_type == V3C_GVD \|\| | |
| vuh_unit_type == V3C_AVD) | |
| video_sub_bitstream( numBytesInV3CPayload ) | | vuh_mesh_data_sample_stream_flag indicates that the mesh subbitstream has a format of sample stream as defined herein. When the flag is 0, the mesh subbitstream is fully decoded with external methods.

vuh_mesh_data_motion_field_present_flag indicates the mesh subbitstream contains data which can be used for the inter-prediction between mesh data in the mesh subbitstream. In some embodiments, vuh_mesh_data_motion_field_present_flag indicates the mesh subbitstream requires more than one decoder engine to decode the contained data.

In some embodiments, an extension may be introduced in the v3c_parameter_set syntax structure to facilitate handling dynamic mesh coding (V-DMC). The following discussion focuses on several new parameters that may be introduced in this extension to handle V-DMC.

v3c_vmesh_extension in V3C Parameterset 3202 is an extention that provides several new parameters to the V3C Parameterset 3202 to enable V-DMC. To signal basemesh information in V3C parameterset 3202, the extension flag, vps_extension_present_flag may be set 1 and vps_vmesh_extension_length_minus1 indicates the size of vps_v3c_vmesh_extension.

In some embodiments, the following parameters may be added via the V3C Parameterset 3202 extension:

```
vps_v3c_vmesh_extension ( numBytesInV3CPayload ) {
    vps_geometry_frame_width[ j ]
    vps_geometry_frame_height[ j ]
    vps_atlad_data_substream_present_flag[ j ]
    vps_mesh_substream_present_flag[ j ]
    if( vps_mesh_substream_present_flag[ j ] )
        basemesh_information( j )
}
``` vps_geometry_frame_width and vps_geometry_frame_height indicates the nominal width and height of the geometry video bitstream. vps_disp_frame_width and vps_disp_frame_height overwrite the geometry video bitstreams. vps_frame_width and vps_frame_height correspond only to the width and the height of the non-geometry video bitstream.

vps_atlas_data_substream_present_flag indicates the presence of atlas subbitstream 3206 in the bitstream. If the flag is false, the atlas substreams 3206 should not be present in the bitstream. If such bitstreams are present, such bitstreams should be ignored. In some embodiments, this flag is not signaled but set to 1 always for the v-mesh codec.

vps_mesh_substream_present_flag indicates the presence of mesh subbitstream in the bitstream. In some embodiments, this flag is not signaled but set to 1 always for the v-mesh codec.

basemesh_information may be added in V3C Parameterset to signal information for the mesh subbitstream, v3c_parameter_set is extended to add this element. The basemesh_information may include the following:

```
basemesh_information( atlasID ) {
    mi_datatype_count[ atlasID ]
    for( i = 0; i < mi_datatype_count[ atlasID ]; i++ ) {
        mi_type_id[atlasID[ i ]
        mi_codec_id[ atlasID ][ i ]
    }
    mi_basemesh_geometry_3d_bit_depth_minus1[ atlasID ]
    mi_basemesh_geometry_MSB_align_flag[ atlasID ][ i ]
    mi_basemesh_meshattribute_count [ atlasID ]
```

-continued

```
for( i = 0; i < mi_basemesh_meshattribute_count[ atlasID ]; i++ ) {
    mi_basemesh_meshattribute_type_id [ atlasID ][ i ]
    mi_basemesh_meshattribute_bit_depth_minus1 [ atlasID ][ i ]
    mi_basemesh_meshattribute _MSB_align_flag[ atlasID ][ i ]
    }
}
``` mi_datatype_count indicates the number of different data types in the mesh bitstream. It is set as 1 when vuh_mesh_data_motion_field_present_flag is false or when vuh_mesh_data_sample_stream_flag is false.

mi_type_id[atlasID][i] indicates the data type. For example, it can be coded to indicate mesh data or motion fields.

mi_codec_id[atlasID][i] indicates the codec used to decode the associated data type. The current techniques do not limit the format of this element. The value can be a 4cc code or a number explicitly defined in the v-mesh codec. For example, mi_codec_id[atlasID][0]=DRACO indicates the data with data type=0 is decoded by a mesh codec, DRACO. mi_codec_id[atlasID][0]=INTERNAL indicates the data with data type=0 is decoded by a decoder defined in the v-mesh codec.

mi_basemesh_geometry_3d_bit_depth_minus1 indicates the nominal bit depth of positions of the meshes conveyed in the mesh subbstream.

mi_basemesh_geometry_MSB_align_flag indicates how the decoded basemesh positions are converted to samples at the nominal geometry bit depth.

mi_basemesh_meshattribute_count indicates the number of attributes of the meshes conveyed in the mesh subbistream, such as color, normal or reflectance.

mi_basemesh_meshattribute_type_id indicates the attribute type of the meshes conveyed in the mesh subbitstream, such as color, normal, reflectance etc.

mi_basemesh_meshattribute_bit_depth_minus1 indicates bit depth of a basemesh attribute.

mi_basemesh_meshattribute_MSB_align_flag indicates how the decoded basemesh attributes are converted to samples at the nominal bit depth.

In some embodiments, the following parameters may be added via the V3C Parameterset 3202 extension:

present in the bitstream. If such bitstreams are present, such bitstreams should be ignored.

vps_ext_mesh_data_substream_present_flag indicates the presence of a Mesh Data substream in the bitstream. If the flag is false, the base mesh substreams should not be present in the bitstream. If such bitstreams are present, such bitstreams should be ignored.

vps_ext_mesh_data_facegroup_id_attribute_present_flag equals 1 indicates that one of the attribute types present in the base mesh data stream is the facegroup Id.

vps_ext_mesh_data_submesh_id_attribute_present_flag equals 1 indicates that one of the attribute types for the base mesh data stream is the submesh Id.

vps_ext_mesh_data_attribute_count indicates the number of total attributes in the base mesh including the attributes signalled through the base mesh data substream and the attributes signalled in the video sub streams (using ai_attribute_count). When vps_ext_mesh_data_facegroup_id_attribute_present_flag equals 1, it shall be greater or equal to ai_attribute_count+1. When vps_ext_mesh_data_submesh_id_attribute_present_flag equals 1, it shall be greater or equal to ai_attribute_count+1. This can be constrained by profile/levels.

The types of attributes that are signalled through the base mesh substream and not through the video substreams are signalled are signaled as vps_ext_mesh_attribute_type data types.

When vps_ext_mesh_data_facegroup_id_attribute_present_flag equals 1, one of the vps_ext_mesh_attribute_type may be a facegroup_id.

When vps_ext_mesh_data_submesh_id_attribute_present_flag equals 1, one of the vps_ext_mesh_attribute_type may be a submesh_id.

vps_ext_mesh_data_substream_codec_id indicates the identifier of the codec used to compress the base mesh data. This codec may be identified through the profiles a component codec mapping SEI message, or through means outside this document.

vps_ext_attribute_frame_width[i] and vps_ext_attribute_frame_height[i] indicate the corresponding with and height of the video data corresponding to the i-th attribute among the attributes signalled in the video substreams.

Mesh SubBitStream

| | descriptor |
|---|---|
| vps_v3c_vmesh_extension ( numBytesInV3CPayload ) { | |
|   for(j=0; j<atlas_count_minus1+1; j++){ | |
|     vps_ext_atlas_data_substream_present_flag[ j ] | u(1) |
|     vps_ext_mesh_data_substream_present_flag[ j ] | u(1) |
|     vps_ext_mesh_data_submesh_id_attribute_present_flag[ j ] | u(1) |
|     vps_ext_mesh_data_facegroup_id_attribute_present_flag[ j ] | u(1) |
|     vps_ext_mesh_data_attribute_count[ j ] | ue(v) |
|     vps_ext_mesh_data_substream_codec_id[ j ] | ue(v) |
|     NumNonVideoAttribute=vps_ext_mesh_data_attribute_count[ j ]–ai_attribute_count[ j ] | |
|     for( i = 0; i <NumNonVideoAttribute ; i++ ) | |
|       vps_ext_mesh_attribute_type[ j ][ i ] | ue(v) |
|     for( i = 0; i < ai_attribute_count_[ j ]; i++ ) { | |
|       vps_ext_attribute_frame_width[ j ][ i ] | ue(v) |
|       vps_ext_attribute_frame_height[ j ][ i ] | ue(v) |
|     } | |
|   } | |
| } | | vps_ext_atlas_data_substream_present_flag, which indicates the presence of an Atlas Data substream in the bitstream. If the flag is false, the atlas substreams should not be As mentioned above, a Mesh data bitstream may be added to an encoded bitstream to facilitate V-DMC. A discussion of this bitstream is provided below.

Mesh sub-bitstream 3202 contains data to generate base meshes to be fed to the mesh subdivision/mesh normalization process 3210. Mainly, it contains one or more parameter sets and one or more mesh frame layers, which consists of a data unit. Each data unit has a data type and the size in its header. Based on the data type, a corresponding decoding engine indicated in basemesh_information( ) is used.

In some embodiments, the information related to data type id(mi_type_id), data codec id(mi_codec_id) can be signaled in the mesh subbitstream as a part of Mesh sequence parameter set. Further, In some embodiments, the data type and data codec id can be signaled per data unit.

When vuh_mesh_data_sample_stream_flag is true, the subbitstream has sample stream format. sample_stream_nal_header( ) may include two values, ssnh_unit_size_precision_bytes_minus1 and ssnh_reserved_zero_5bits as defined in Annex D.2.1 in Reference [E1] and sample_stream_mesh_nal_unit( ) can be same as defined in Annex D.2.2 in Reference [E1] or as defined in the v-mesh codec. An example of the case is as following:

```
sample_stream_mesh_nal_unit( ) {
    ssnu_mesh_nal_unit_size
    mesh_nal_unit(ssnu_mesh_nal_unit_size )
}
```

```
mesh_sub_bitstream( numBytes ) {
    if(vuh_mesh_data_sample_stream_flag){
        sample_stream_nal_header ( )
        numBytes--
        while( numBytes > 0 ) {
            sample_stream_mesh_nal_unit ( )
            numBytes -= mesh_unit_size + mesh_unit_size_precision_bytes_minus1 + 1
        }
    }
}
``` mesh_nal_unit( ) has a header and rbsp_byte. The header can be same as 8.3.5.1 nal_unit( ) in Reference [E1] or as defined in the v-mesh codec. An example of the case is as following:

```
mesh_nal_unit( NumBytesInMeshNalUnit ) {
    mesh_nal_unit_header( )
    NumBytesInRbsp = 0
    for( i = 2; i < NumBytesInMeshNalUnit ; i++ )
        rbsp_byte[ NumBytesInRbsp++ ]
}
```

```
mesh_nal_unit_header( ) {
    mesh_nal_unit_type
    mesh_unit_data_type
}
``` mesh_nal_unit_type indicates the NAL type of the current mesh_nal_unit. It can be assigned the reserved values of Nal unit type code (e.g., Table 4 in Reference [E1]) or can be defined in v-mesh.

mesh_unit_data_type indicates the data type of the mesh_nal_unit. For example, mesh_unit_data_type=MESH_MSPS when the data unit is a sequence parameter set. When mesh_nal_unit type indicates the nalu type of the current mesh is a sequence parameter set, mesh_unit_data_ type should be MESH_MSPS. In some embodiments, it is not signaled in the case mesh_unit_data_type=MESH_BODY when the data unit is a coded mesh data which can be decoded with a designated mesh codec such as Draco, and mesh_unit_data_type=MESH_MOTION when the data unit contains motion vectors between two meshes which can be decoded by a designated entropy codec. The data type must be associated with one of mi_type_id signaled in basemesh_information. Designated codecs are decided based on mesh_unit_data_type. In some embodiments, mesh_nal_unit_header can signal only mesh_nal_unit type. In some embodiments, mesh_unit_data_type can be signaled in mesh_frame_header( ) instead of mesh_nal_unit_header( ).

Mesh sequence parameter set(MSPS) contains information on the mesh data bitstream. An example of mesh sequence parameter set rbsp is provided in the following.

```
mesh_sequence_parameter_set_rbsp( ) {
    msps_atlas_sequence_parameter_set_id
    msps _geometry_3d_bit_depth_minus1
    msps _coordinate_2d_bit_depth_minus1
    msps _log2_max_mesh_frame_order_cnt_lsb_minus4
    msps _long_term_ref_mesh_frames_flag
    msps _num_ref_mesh_frame_lists_in_msps
```

-continued

```
    for( i = 0; i < msps_num_ref_mesh_frame_lists_in_msps; i++ )
        mesh_ref_list_struct( i )
    rbsp_trailing_bits( )
}
``` mesh_ref_list_struct is equivalent to the ref_list_struct in Reference [E1].

In some embodiments, some of information signaled in basemesh_information( ) such as mi_geometry_MSB_align_flag, mi_meshattribute_count, mi_meshattribute_type_id, mi_meshattribute_bit_depth_minus1, mi_meshattribute_MSB_align_flag can be signaled in mesh_sequence_parameter_set_rbsp( ).

Mesh frame layer unit RSBP is signaled when mesh_unit_data_type does not indicate the data unit is mesh_sequence_parameter_set.

```
mesh_frame layer_rbsp( ) {
    mesh_frame_header()
    mesh_frame_data( )
}
```

Mesh_frame_header is signaled per frame.

mfh_mesh_sequence_parameter_set_id indicates the id of mesh sequence parameter set used for this mesh data unit.

mfh_frame_type indicates if the data may require another mesh data to generate the corresponding mesh. For example, mfh_frame_type can be I_FRAME which indicates it does not require any other meshes to generate a mesh. mfh_frame_type can be P_FRAME or SKIP_FRAME which indicate it requires other meshes to generate a mesh corresponding to the data unit.

In some embodiments, mfh_frame_type is not signaled but derived from mesh_unit_data_type. When mesh_unit_data_type is ESH_BODY, mf_frame_type is set as I_FRAME and when mesh_unit_data_type is MESH_MOTION, mfh_frame_type is set as P_FRAME.

mfh_mesh_frm_order_cnt_lsb indicates the frame index of the mesh data.

mfh_num_of_reference_frame indicates the number of reference frames used for this frame.

In some embodiments mfh_num_of_reference_frame is not signaled but set as 1.

mfh_frm_duff indicates the difference between the current frame index and the reference frame index when mfh_frame_type is not I_FRAME.

```
mesh_frame_header( ) {
    mfh_mesh_sequence_parameter_set_id
    mfh_frame_type
    mfh_mesh_frm_order_cnt_lsb
    if(mfh_frame_type!=I_FRAME){
        mfh_num_of_reference_frame
        for(i=0; i< mfh_num_of_reference_frame ; i++)
            mfh_frm_diff[i]
    }
}
```

In some embodiments, instead of signaling mfh_frm_diff it can be used reference list structure as described below. The implementation is equivalent to the one in the V3C spec Reference [E1].

```
if( msps_num_ref_mesh_frame_lists_in_asps > 0 )
    mfh_ref_mesh_frame_list_msps_flag
if( mfh_ref_mesh_frame_list_msps_flag == 0 )
    ref_list_struct( msps_num_ref_mesh_frame_lists_in_msps )
else if( msps_num_ref_mesh_frame_lists_in_msps > 1 )
    mfh_ref_mesh_frame_list_idx
for( j = 0; j < NumLtrMeshFrmEntries; j++ ) {
    mfh_additional_mfoc_lsb_present_flag[ j ]
    if( ath_additional_afoc_lsb_present_flag[ j ] )
        mfh_additional_mfoc_lsb_val[ j ]
}
``` mesh_frame_data has a chunk of data which can be decoded using a designated codec. For example, when mesh_unit_data_type=MESH_BODY and a codec designated for the data type is Draco, a chunk of data sized ssnu_mesh_nal_unit_size-size of mesh_nal_unit_header-size of mesh_frame_header is fed to the codec and a mesh is generated. When mesh_unit_data_type=MESH_MOTION and a codec designated for the data type is INTERNAL, the chunk sized ssnu_mesh_nal_unit_size-size of mesh_nal_unit_header-size of mesh_frame_header is decoded with the decoding process provided by the v-mesh codec.

```
mesh_frame_data( ) {
    if(mesh_unit_data_type == MESH_BODY)
        mesh_frame_bitstream (ssnu_mesh_nal_unit size – size of
mesh_nal_unit_header – size of mesh_frame_header )
```

-continued

```
    else if(mesh_unit_data_type ==MESH_MOTION)
        motion_field_bitstream (ssnu_mesh_nal_unit_size – size of
mesh_nal_unit_header – size of mesh_frame_header)
}
```

In some embodiments, mesh_subbitstream can be separate into more than two independent subbitstreams. Each subbistream contains only one type of mesh_nuit_data_type. Subsequently, basemesh_information( ) is duplicated as many as the number of subbitstreams with updated information accordingly.

In some embodiments, to signal the attribute indices for submesh_id and facegroup_id, the indices of the elements can be explicitly signalled after the present flags, as illustrated below.

```
...
    vps_ext_mesh_data_submesh_id_attribute_present_flag[ j ]   u(1)
    if(vps_ext_mesh_data_submesh_id_attribute_present_flag[ j ])
        vps_ext_mesh_submesh_id_index[j]                      ue(v)
    vps_ext_mesh_data_facegroup_id_attribute_present_flag[ j ]  u(1)
    if(vps_ext_mesh_data_submesh_id_attribute_present_flag[ j ])
        vps_ext_mesh_submesh_id_index[j]                      ue(v)
...
```

In some embodiments, vps_ext_mesh_attribute_type, FacegroupId can appear only once. vps_ext_mesh_attribute_type, submeshId can appear only once in the vps_ext_mesh_data_attribute_count[j]-attributes.

In some embodiments, vps_ext_mesh_data_submesh_id_attribute_present_flag is not signalled but the outputs of the base mesh substream decoder is a sequence of submesh frames instead of a sequence of mesh frames.

Atlas Parameter Set Sequence Extension

To support V-DMC, an Atlas Data SubBitStream 3206 sequence extension may also be provided. A discussion of some possible parameters of the extension are provided below.

asps_vmesh_extension in atlas sequence parameter set to signal information related to v-mesh in atlas sequence parameter set, the extension flag vps_extension_present_flag should be set 1 and (asps_extension_7bits>>N)&1 should be 1. Here the "N" is smaller than 7 and may be decided when V3C2$^{nd}$ edition (Reference [D2]) is finalized. The N-th bit is tentatively named as asps_vmesh_extension_present_flag in the following example, and N is set as 6. asps_vmesh_extension can signaled as following:

```
atlas_sequence_parameter_set_rbsp( ) {
...
    asps_vui_parameters_present_flag
    if( asps_vui_parameters_present_flag )
        vui_parameters( )
    asps_extension_present_flag
    if( asps_extension_present_flag ) {
        asps_vpcc_extension_present_flag
        asps_vmesh_extension_present_flag
        asps_extension_6bits
    }
    if( asps_vpcc_extension_present_flag )
        asps_vpcc_extension( ) /* Specified in Annex H*/
    if( asps_vmesh_extension_present_flag || asps_extension_6bits){
        If(asps_vmesh_extension_present_flag )
            asps_vmesh_extension( )
```

-continued

```
    if( asps_extension_6bits )
        while( more_rbsp_data( ) )
            asps_extension_data_flag
    }
    rbsp_trailing_bits( )
}
```

In some embodiments, the parameters of the Atlas SubBit Stream 3206 sequence extension may include:

```
asps_vmc_extension( ) {
    asps_vmc_ext_atlas_width_displacement
    asps_vmc_ext_atlas_height_displacement
    asps_vmc_ext_prevent_geometry_video_conversion_flag
    asps_vmc_ext_prevent_attribute_video_conversion_flag
    asps_vmc_ext_geometry_3d_bitdepth
    asps_vmc_ext_coordinate_2d_bitdepth
    asps_vmc_ext_subdivision_method
    asps_vmc_ext_subdivision_iteration_count_minus1
    asps_vmc_ext_displacement_coordinate_system
    asps_vmc_ext_transform_index
    if(asps_vmc_ext_transform_index != NONE) {
        asps_vmc_extension_transform_parameters( 0,
asps_vmc_ext_transform_index)
    }
    asps_vmc_ext_num_attribute
    for(i=0; i< asps_vmc_ext_num_attribute; i++){
        asps_vmc_ext_attribute_type
        asps_vmc_ext_attribute_transform_index
        if(asps_vmc_ext_attribute_transform_index != NONE) {
            asps_vmc_extension_transform_parameters_present_flag
            if(asps_vmc_extension_transform_parameters_present_flag){
                asps_vmc_extension_transform_parameters(i+1,
asps_vmc_ext_attribute_transform_index)
            }
        }
    }
}
``` asps_vmc_ext_atlas_width_displacement and asps_vmc_ext_atlas_height_displacement indicate the width and the height of the atlas.

In some embodiments, asps_vmc_ext_atlas_width_displacement and asps_vmc_ext_atlas_height_displacement are not signaled but set as asps_frame_width and asps_frame_height are used.

asps_vmc_ext_prevent_geometry_video_conversion_ flag prevents the outputs of geometry video stream from being converted. When the flag is true, the outputs are used as they are without any conversion process from Annex B in Reference [E1]. When the flag is true, the size of geometry video shall be same as nominal video sizes indicated in the bitstream.

asps_vmc_ext_prevent_attribute_video_conversion_flag prevents the outputs of attribute video streams from being converted. When the flag is true, the outputs are used as they are without any conversion process from Annex B in Reference [E1]. When the flag is true, the size of attribute video shall be same as nominal video sizes indicated in the bitstream.

In some embodiments, asps_vmc_ext_prevent_geometry_video_conversion_flag and asps_vmc_ext_prevent_attribute_video_conversion_flag can be in V3C Parameter set.

asps_vmc_ext_geometry_3d_bitdepth indicates the bit depth of positions of the output meshes.

asps_vmc_ext_coordinate_2d_bitdepth indicates the bit depth of texture coordinates of the output meshes.

A number of subdivision approaches may be performed. In some embodiments, asps_vmc_ext_subdivision_method and asps_vmc_ext_subdivision_iteration_count_minus1 signal information about the subdivision method.

asps_vmc_ext_subdivision_method is given to the mesh normalization process and indicates the method to increase the number of vertices in the base meshes. In some embodiments, when this parameter is set to 0 (or other predetermined value), a midpoint subdivision method is used. In some embodiments, when this parameter is 0, the base meshes are not modified/normalized through the mesh normalization process. In some embodiments, asps_vmc_ext_subdivision_method can indicate any resampling method to be applied to resample the vertices in the basemesh. In this case asps_vmc_ext_subdivision_iteration_count_minus1 might.

asps_vmc_ext_subdivision_iteration_count_minus1 indicates the number of iteration the subdivision method requires. In some embodiments, when asps_vmc_ext_subdivision_method is 0, it is not signaled but set 0.

asps_vmc_ext_displacement_coordinate_system indicates the coordinate system applied during the conversion process from geometry images to displacements as described above.

asps_vmc_ext_transform_index indicates a method used to convert pixel values from the geometry image to displacement. For example, when set to 0, this may indicate it is NONE, and no transform is applied to the pixel values from the output geometry images but the values are directly added to the output of the mesh normalization process. In some embodiments, when set to 1, the transform is set to linear lifting. In such embodiments, the necessary parameters for this method may be signaled as vmc_lifting_transform_parameters.

In some embodiments, if the method is not wavelet transform described above, related variables can be signaled in a SEI message.

asps_vmc_ext_segment_mapping_method indicates how to map a segment Id to each vertex. When asps_vmc_ext_segment_mapping_method is set to 0, this may indicate that the decoded base mesh includes an attribute of such an id. When asps_vmc_ext_segment_mapping_method is set to 1 this may indicate that the submesh Id is derived by the patch information in a tile. Each tile in the atlas data substream corresponds to one submesh. Otherwise, the base mesh is segmented by a method as defined by the syntax element asps_vmc_ext_segment_mapping_method.

asps_vmc_ext_patch_mapping_method indicates how to map a subpart of a base mesh or a submesh to a patch. When asps_vmc_ext_patch_mapping_method is equal to 0, all the triangles in the segment indicated by mdu_segment_id are associated with the current patch. In this case, there is only one patch associated with the segment. asps_vmc_ext_patch_mapping_method cannot be 0 when asps_vmc_ext_segment_mapping_method is equal to 1.

In some embodiments, all triangles in the segments indicated in the atlas tile header are associated with the current patch. In this case, a tile has only one patch.

When asps_vmc_ext_patch_mapping_method is equal to 1, the indices of the subparts corresponding to patches are explicitly signalled in the mesh patch data unit.

In some embodiments, when asps_vmc_ext_patch_mapping_method is equal to 2, the indices of the triangle faces corresponding to a patch are explicitly signalled in the mesh patch data unit.

In some embodiments, when asps_vmc_ext_patch_mapping_method is equal to 2, the indices of the vertices corresponding to a patch are explicitly signalled in the mesh patch data unit.

In other cases, the vertices (or triangle faces) in the segment indicated by mdu_segment_id are further segmented into subparts by the method indicated by asps_vmc_ext_patch_mapping_method. In this case, the i-th subpart determined by the corresponding method is mapped to the i-th patch. Each mesh patch corresponds to only one subpart of the base mesh.

In some embodiments, when asps_vmc_ext_patch_mapping_method>2, multiple subparts can be mapped to a patch. In this case, from i-th to (i+mdu_num_subparts[patchIndex]−1)th subpart correspond to the patchIndex-th patch. i is accumulated mdu_num_subparts till patchIndex−1.

asps_vmc_ext_tjunction_removing_method indicates the method to remove t-junctions created by different subdivision methods or by a subdivision iteration of two triangles sharing an edge.

asps_vmc_ext_multilocated_vertex_merge_method indicates the method to merge multiple geometry positions for one vertex caused when the vertex is shared by two different patches.

asps_vmc_ext_num_attribute indicates the total number of attributes that the corresponding mesh carries. Its value shall be less or equal to vps_ext_mesh_data_attribute_count.

asps_vmc_ext_attribute_type is the type of the i-th attribute and it shall be one of ai_attribute_type_ids or vps_ext_mesh_attribute_types.

asps_vmc_ext_direct_atrribute_projection_enabled_flag indicates that the 2d locations where attributes are projected are explicitly signalled in the mesh patch data units. Therefore, the projection id and orientation index used in Reference [D4] can be also signalled.

In some embodiments, asps_vmc_ext_transform_index is not signaled but always set as wavelet transform described above.

To perform transforms, in some embodiments, transform parameters may be provided as follows:

```
asps_vmc_extension_transform_parameters( attributeType, transformIndex)
    asps_vmc_ext_transform_lifting_skip_update
    asps_vmc_ext_transform_lifting_quantization_parameters_x
    asps_vmc_ext_transform_lifting_quantization_parameters_y
    asps_vmc_ext_transform_lifting_quantization_parameters_z
    asps_vmc_ext_transform_log2_lifting_lod_inverseScale_x
    asps_vmc_ext_transform_log2_lifting_lod_inverseScale_y
    asps_vmc_ext_transform_log2_lifting_lod_inverseScale_z
    asps_vmc_ext_transform_log2_lifting_update_weight
    asps_vmc_ext_transform_log2_lifting_prediction_weight
}
```

As illustrated, in the current embodiment, asps_vmc_extension_transform_parameters contains the parameters:

asps_vmc_ext_lifting_skip_update, asps_vmc_ext_lifting_quantization_parameters_x, asps_vmc_ext_lifting_quantization_parameters_y, asps_vmc_ext_lifting_quantization_parameters_z, asps_vmc_ext_log 2_lifting_lod_inverseScale_x, asps_vmc_ext_log 2_lifting_lod_inverseScale_y, asps_vmc_ext_log 2_lifting_lod_inverseScale_z, asps_vmc_ext_log 2_lifting_update_weight, asps_vmc_ext_log 2_lifting_prediction_weight, which are conversion related variables.

In some embodiments, asps_vmc_extension_transform_parameters can be signaled persistently. In some embodiments, asps_vmc_extension_transform_parameters can be signaled only when asps_vmc_ext_transform_index indicates the method used to conversion is wavelet transform as described above.

asps_vmc_ext_num_attribute indicates number of attributes which a transform is applied apart from the geometry images.

asps_vmc_ext_attribute_type indicates an attribute type the following transform is applied to.

asps_vmc_ext_attribute_transform_index indicates a transform which is applied to the attribute type asps_vmc_ext_attribute_type.

asps_vmc_extension_transform_parameters_present_flag indicates asps_vmc_extension_transform_parameters ( ) is signaled for the attribute type. If not, the flag is false, the values are copied from the previously signaled attribute type. In some embodiments, the attribute type the asps_vmc_extension_transform_parameters ( ) is copied from can be explicitly signaled.

In some embodiments, all the syntax elements except asps_vmc_ext_geometry_3d_bitdepth and asps_vmc_ext_coordinate_2d_bitdepthcan can be signaled in V3C parameter set or v3c unit header. In some embodiments, all the syntax elements except asps_vmc_ext_geometry_3d_bitdepth and asps_vmc_ext_coordinate_2d_bitdepthcan can be signaled in atlas_frame_parameter_set.

Some syntax elements in the atlas sequence parameter set can be overridden by the same syntax elements in the atlas frame parameter set. afps_vmc_extension( ) is signaled when the first bit of afps_extension_8bits is 1.

In some embodiments, the parameters of the Atlas SubBit Stream 3206 sequence extension may include:

| | descriptor |
|---|---|
| asps_vmc_extension( ) { | |
|     asps_vmc_ext_prevent_geometry_video_conversion_flag | u(1) |
|     asps_vmc_ext_prevent_attribute_video_conversion_flag | u(1) |
|     asps_vmc_ext_subdivision_method | u(3) |
|     asps_vmc_ext_subdivision_iteration_count_minus1 | u(8) |
|     asps_vmc_ext_displacement_coordinate_system | u(1) |
|     asps_vmc_ext_transform_index | u(3) |
|     if(asps_vmc_ext_transform_index == LINEAR_LIFTING) { | |
|         vmc_lifting_transform_parameters( 0, 0 ) | |
|     } | |
|     asps_vmc_ext_segment_mapping_method | ue(v) |
|     asps_vmc_ext_patch_mapping_method | ue(v) |
|     asps_vmc_ext_tjunction_removing_method | ue(v) |
|     asps_vmc_ext_multilocated_vertex_merge_method | ue(v) |
|     asps_vmc_ext_num_attribute | ue(v) |
|     for (i=0;i<asps_vmc_ext_num_attribute;i++({ | |
|         asps_vmc_ext_attribute_type | u(8) |

-continued

| | descriptor |
|---|---|
| asps_vmc_ext_attribute_transform_index | u(3) |
| if(asps_vmc_ext_attribute_transform_index == LINEAR_LIFTING ) { | |
|   asps_vmc_extension_transform_parameters_present_flag | u(1) |
|   if(asps_vmc_extension_transform_parameters_present_flag) | |
|     vmc_lifting_transform_parameters(i+1, 0) | |
|   } | |
|   asps_vmc_ext_direct_atrribute_projection_enabled_flag[i] | u(1) |
|  } | |
| } | |

The lifting transform parameters may include:

| | descriptor |
|---|---|
| vmc_lifting_transform_parameters( attributeIndex, ltpIndex ){ | |
|   vmc_transform_lifting_skip_update[attributeIndex][ ltpIndex ] | u(1) |
|   vmc_transform_lifting_quantization_parameters_x[attributeIndex][ ltpIndex ] | ue(v) |
|   vmc_transform_lifting_quantization_parameters_y[attributeIndex][ ltpIndex ] | ue(v) |
|   vmc_transform_lifting_quantization_parameters_z[attributeIndex][ ltpIndex ] | ue(v) |
|   vmc_transform_log2_lifting_lod_inverseScale_x[attributeIndex][ ltpIndex ] | ue(v) |
|   vmc_transform_log2_lifting_lod_inverseScale_y[attributeIndex][ ltpIndex ] | ue(v) |
|   vmc_transform_log2_lifting_lod_inverseScale_z[attributeIndex][ ltpIndex ] | ue(v) |
|   vmc_transform_log2_lifting_update_weight[attributeIndex][ ltpIndex ] | ue(v) |
|   vmc_transform_log2_lifting_prediction_weight[attributeIndex][ ltpIndex ] | ue(v) |
| } | |

In some embodiments, asps_vmc_ext_attribute_transform_index, asps_vmc_extension_transform_parameters_present_flag, vmc_lifting_transform_parameter and asps_vmc_ext_direct_atrributes_projection_enabled_flag can be signalled only for the attributes signalled through the video streams.

Altas Parameter Set 3206 Frame Extension

To support V-DMC, an Atlas Data SubBitStream 3206 frame extension (afps) may also be provided. A discussion of some possible parameters of the extension are provided below.

```
atlas_frame_parameter_set_rbsp ( ) {
...
  if( afps_extension_present_flag ){
    afps_vmc_extension_flag
    afps_extension_7bits
  }
  if( afps_vmc_extension_flag) {
    afps_vmc_extension( )
  }
  ...
}
```

```
afps_vmc_extension( ) {
  afps_vmc_ext_direct_attribute_projection_enabled
  afps_vmc_ext_overriden_flag
  if(afps_vmc_ext_overriden_flag){
    afps_vmc_ext_subdivision_enable_flag
    afps_vmc_ext_displacement_coordinate_system_enable_flag
    afps_vmc_ext_transform_index_enable_flag
    afps_vmc_ext_transform_parameters_enable_flag
    afps_vmc_ext_num_attribute_enable_flag
  }
  if(afps_vmc_ext_subdivision_enable_flag){
    afps_vmc_ext_subdivision_method
    afps_vmc_ext_subdivision_iteration_count_minus1
  }
```

-continued

```
  if(afps_vmc_ext_displacement_coordinate_system_enable_flag)
    afps_vmc_ext_displacement_coordinate_system
  if(afps_vmc_ext_transform_index_enable_flag)
    afps_vmc_ext_transform_index
  if(afps_vmc_ext_transform_index != NONE &&
afps_vmc_ext_transform_parameters_enable_flag) {
    afps_vmc_extension_transform_parameters(0,
afps_vmc_ext_transform_index )
  }
  if(afps_vmc_ext_num_attribute_enable_flag)
    afps_vmc_ext_num_attribute
  for(i=0; i< afps_vmc_ext_num_attribute; i++){
    afps_vmc_ext_attribute_type
    afps_vmc_ext_attribute_transform_index_enable_flag
    afps_vmc_ext_attribute_transform_parameters_enable_flag
    if(afps_vmc_ext_attribute_transform_index_enable_flag)
      afps_vmc_ext_attribute_transform_index
    if(afps_vmc_ext_attribute_transform_index != NONE &&
afps_vmc_ext_attribute_transform_parameters_enable_flag) {
      afps_vmc_extension_transform_parameters(i+1,
afps_vmc_ext_attribute_transform_index)
    }
  }
}
``` afps_vmc_ext_direct_attribute_projection_enabled indicates direct attribute projection can be used.

afps_vmc_ext_overriden_flag indicates any additional information to be signaled to override the syntax elements in ASPS.

afps_vmc_ext_subdivision_enable_flag indicates afps_vmc_ext_subdivision_method and afps_vmc_ext_subdivision_iteration_count_minus1 are used instead of asps_vmc_ext_subdivision_method and asps_vmc_ext_subdivision_iteration_count_minus1.

afps_vmc_ext_displacement_coordinate_system_enable_flag indicates afps_vmc_ext_displacement_coordinate_system is used instead of asps_vmc_ext_displacement_coordinate_system.

afps_vmc_ext_transform_index_enable_flag indicates afps_vmc_ext_transform_index is used instead of asps_vmc_ext_transform_index.

afps_vmc_ext_transform_parameters_enable_flag indicates afps_vmc_extension_transform_parameters( ) is signaled to be used instead of asps_vmc_extension_transform_parameters( ).

afps_vmc_ext_num_attribute_enable_flag indicates afps_vmc_ext_num_attribute attributes use overridden parameters.

afps_vmc_ext_attribute_type indicates an attribute type.

afps_vmc_ext_attribute_transform_index_enable_flag indicates afps_vmc_ext_attribute_transform_index is used instead of asps_vmc_ext_attribute_transform_index of the corresponding attribute type.

afps_vmc_ext_attributetransform_parameters_enable_flag indicates afps_vmc_extension_transform_parameters( ) is signaled to be used instead of asps_vmc_extension_transform_parameters( ) for the corresponding attribute type.

In some embodiments, all the parameters can be always signaled without enable flags.

tion_parameters_x, asps_vmc_ext_transform_lifting_quantization_parameters_y and asps_vmc_ext_transform_lifting_quantization_parameters_z, respectively.

afps_vmc_ext_transform_log 2_lifting_lod_inverseScale_enable_flag indicates afps_vmc_ext_transform_log 2_lifting_lod_inverseScale_x, afps_vmc_ext_transform_log 2_lifting_lod_inverseScale_y and afps_vmc_ext_transform_log 2_lifting_lod_inverseScale_z are signaled to be used instead of asps_vmc_ext_transform_log 2_lifting_lod_inverseScale_x, asps_vmc_ext_transform_log 2_lifting_lod_inverseScale_y and asps_vmc_ext_transform_log 2_lifting_lod_inverseScale_z.

afps_vmc_ext_transform_log 2_lifting_update_weight_enable_flag indicates afps_vmc_ext_transform_log 2_lifting_update_weight is signaled to be used instead of asps_vmc_ext_transform_log 2_lifting_update_weight.

afps_vmc_ext_transform_log 2_lifting_prediction_weight_enable_flag indicates afps_vmc_ext_transform_log 2_lifting_prediction_weight is signaled to be used instead ofasps_vmc_ext_transform_log 2_lifting_prediction_weight.

```
afps_vmc_extension_transform_parameters( attributeType, transformIndex )
    afps_vmc_ext_transform_lifting_quantization_parameters_enable_flag
    afps_vmc_ext_transform_log2_lifting_lod_inverseScale_enable_flag
    afps_vmc_ext_transform_log2_lifting_update_weight_enable_flag
    afps_vmc_ext_transform_log2_lifting_prediction_weight_enable_flag
    afps_vmc_ext_transform_lifting_skip_update
    if (afps_vmc_ext_transform_lifting_quantization_parameters_enable_flag){
        afps_vmc_ext_transform_lifting_quantization_parameters_x
        afps_vmc_ext_transform_lifting_quantization_parameters_y
        afps_vmc_ext_transform_lifting_quantization_parameters_z
    }
    if(afps_vmc_ext_transform_log2_lifting_lod_inverseScale_enable_flag){
        afps_vmc_ext_transform_log2_lifting_lod_inverseScale_x
        afps_vmc_ext_transform_log2_lifting_lod_inverseScale_y
        afps_vmc_ext_transform_log2_lifting_lod_inverseScale_z
    }
    if(afps_vmc_ext_transform_log2_lifting_update_weight_enable_flag)
        afps_vmc_ext_transform_log2_lifting_update_weight
    if(afps_vmc_ext_transform_log2_lifting_prediction_weight_enable_flag)
        afps_vmc_ext_transform_log2_lifting_prediction_weight
}
``` afps_vmc_ext_transform_lifting_quantization_parameters_enable_flag indicates afps_vmc_ext_transform_lifting_quantization_parameters_x, afps_vmc_ext_transform_lifting_quantization_parameters_y and afps_vmc_ext_transform_lifting_quantization_parameters_z are signaled to be used instead of asps_vmc_ext_transform_lifting_quantizaafps_vmc_ext_transform_lifting_skip_update is used instead of asps_vmc_ext_transform_lifting_skip_update.

In some embodiments, all the parameters can be always signaled without enable flags.

In some embodiments, the Atlas Data SubBit Stream 3206 Frame extension may include:

| | descriptor |
|---|---|
| afps_vmc_extension( ) { | |
|     afps_vmc_ext_single_segment_in_frame_flag | u(1) |
|     afps_vmc_ext_overriden_flag | u(1) |
|     if(afps_vmc_ext_overriden_flag){ | |
|         afps_vmc_ext_subdivision_enable_flag | u(1) |
|         afps_vmc_ext_displacement_coordinate_system_enable_flag | u(1) |
|         afps_vmc_ext_transform_index_enable_flag | u(1) |
|         afps_vmc_ext_transform_parameters_enable_flag | u(1) |
|         afps_vmc_ext_attribute_parameter_overwrite_flag | u(1) |
|     } | |

-continued

| | descriptor |
|---|---|
| if(afps_vmc_ext_subdivision_enable_flag){ | |
|     afps_vmc_ext_subdivision_method | u(3) |
|     afps_vmc_ext_subdivision_iteration_count_minus1 | u(8) |
|     } | |
| if(afps_vmc_ext_displacement_coordinate_system_enable_flag) | |
|     afps_vmc_ext_displacement_coordinate_system | u(1) |
| if(afps_vmc_ext_transform_index_enable_flag) | |
|     afps_vmc_ext_transform_index | u(3) |
| if(afps_vmc_ext_transform_index == LINEAR_LIFTING && | |
| afps_vmc_ext_transform_parameters_enable_flag) | |
|     vmc_lifting_transform_parameters( 0, 1 ) | |
| if(afps_vmc_ext_attribute_parameter_overwrite_flag){ | |
|     for(i=0; i< asps_vmc_ext_num_attribute_video; i++){ | |
|       afps_vmc_ext_attribute_type [ i ] | ue(v) |
|       afps_vmc_ext_direct_attribute_projection_enabled[ i ] | u(1) |
|       afps_vmc_ext_attribute_transform_index_enable_flag[ i ] | u(1) |
|       afps_vmc_ext_attribute_transform_parameters_enable_flag[ i ] | u(1) |
|      if(afps_vmc_ext_attribute_transform_index_enable_flag[ i ]) | |
|       afps_vmc_ext_attribute_transform_index[ i ] | u(3) |
|      if(afps_vmc_ext_attribute_transform_index == LINEAR_LIFTING && | |
| afps_vmc_ext_attribute_transform_parameters_enable_flag) | |
|       vmc_lifting_transform_parameters( i+1, 1 ) | |
|     } | |
|   } | |
|   afps_vmc_ext_single_attribute_tile_in_frame_flag | u(1) |
|   if(!afps_vmc_ext_single_attribute_tile_in_frame_flag) | |
|     afps_ext_vmc_attribute_tile_information( ) | |
| } | | afps_vmc_ext_single_segment_in_frame_flag indicates there is only one segment for the atlas frame.

afps_vmc_ext_single_attribute_tile_in_frame_flag indicates there is only one tile for each attribute signalled in the video streams.

In some embodiments, afps_vmc_ext_single_attribute_tile_in_frame_flag is signalled only when afti_single_tile_in_atlas_frame_flag is not true. afps_vmc_ext_single_attribute_tile_in_frame_flag is inferred as true when afti_single_tile_in_atlas_frame_flag is true.

In some embodiments, patch mapping method can be signalled in this afps_vmc_extension.

In some embodiments, patch mapping method override flag is signalled and only when the flag is true, patch mapping method is signalled. In the case, the patch mapping method is used instead of asps_vmc_ext_patch_mapping_method.

When afps_vmc_ext_overriden_flag in afps_vmc_extension( ) is true, the subdivision method, displacement coordinate system, transform index, transform parameters, and attribute transform parameters can be signalled again and the information may override the one signalled in asps_vmc_extension( ).

In some embodiments, afps_vmc_ext_displacement_coordinate_system_enable_flag is not signalled but afps_vmc_ext_displacement_coordinate_system is always signalled.

Tile information for attributes signaled through the video substreams may be provided in afps_ext_vmc_attribute_tile_information( ) as follows

| | descriptor |
|---|---|
| afps_ext_vmc_attribute_tile_information( ) { | |
|   for(j=0; j< asps_vmc_ext_num_attribute_video; j++){ | |
|     afps_vmc_ext_attribute_ti_uniform_partition_spacing_flag[ j ] | u(1) |
|     if( afps_vmc_ext_attribute_ti_uniform_partition_spacing_flag ) { | |
|       afps_vmc_ext_attribute_ti_partition_cols_width_minus1[ j ] | ue(v) |
|       afps_vmc_ext_attribute_ti_partition_rows_height_minus1[ j ] | ue(v) |
|     } else { | |
|       afps_vmc_ext_attribute_ti_num_partition_columns_minus1[ j ] | ue(v) |
|       afps_vmc_ext_attribute_ti_num_partition_rows_minus1[ j ] | ue(v) |
|       for( i = 0; i < afps_vmc_ext_attribute_ti_num_partition_columns_minus1; i++ ) | |
|         afps_vmc_ext_attribute_ti_partition_column_width_minus1[ j ] [ i ] | ue(v) |

-continued

| | descriptor |
|---|---|
| ```
    for( i = 0; i < afps_vmc_ext_attribute_ti_num_partition_rows_minus1; i++ )
        afps_vmc_ext_attribute_ti_partition_row_height_minus1[ j ] [ i ]
    }
    afps_vmc_ext_attribute_ti_single_partition_per_tile_flag[ j ]
    if( !afps_vmc_ext_attribute_ti_single_partition_per_tile_flag ) {
        afps_vmc_ext_attribute_ti_num_tiles_in_atlas_frame_minus1[ j ]
        for( i = 0; i < afps_vmc_ext_attribute_ti_num_tiles_in_atlas_frame_minus1 + 1; i++ )
    {
        afps_vmc_ext_attribute_ti_top_left_partition_idx[ j ] [ i ]
        afps_vmc_ext_attribute_ti_bottom_right_partition_column_offset[ j ] [ i ]
        afps_vmc_ext_attribute_ti_bottom_right_partition_row_offset[ j ] [ i ]
    }
    } else
    afps_vmc_ext_attribute_ti_num_tiles_in_atlas_frame_minus1[ j ] =
NumPartitionsInAtlasFrame − 1
}
``` | ue(v)<br><br>u(1)<br><br>ue(v)<br><br><br>ue(v)<br>ue(v)<br>ue(v) |

Patch Data Unit

As with the V-PCC Patch data units, Mesh patch data units are signalled in the Atlas Data SubBitStream 3206. Mesh Intra patch data unit, Mesh Inter patch data unit, Mesh Merge patch data unit, and Mesh Skip patch data unit can be used. A discussion of these is provided below.

ath_type=SKIP_PLUS_TILE indicates all the patches are copied from its reference tile except a few patches. In atlas_tile_data_unit, the patch indices which are not copied are explicitly signaled. Also atlas_tile_data_unit specifies if any new patches are added.

In some embodiments, SKIP_PLUS_TILE copies only patches for mesh information but not patches whose patch type is P_SKIP, P_MERGE, P_INTRA, P_INTER, P_RAW, P_EOM, I_INTRA, I_RAW, or I_EOM.

In some embodiments, SKIP_PLUS_TILE copies only patches for mesh information but not patches whose information is related to explicit geometry or attribute positions, tentatively names as RAW_MESH.

```
atlas_tile_data_unit( tileID ) {
    if( ath_type == SKIP_TILE ) {
        for( p = 0; p < RefAtduTotalNumPatches[ tileID ]; p++ )
            skip_patch_data_unit( )
    } else {
            atdu_patch_data_present_flag=true
            atdu_num_deleted_patches = 0
    if( ath_type == SKIP_PLUS_TILE ) {
            atdu_patch_data_present_flag
            atdu_num_deleted_patchgroups
            for( i = 0; i < atdu_num_deleted_patchgroups; i++ ) {
                atdu_deleted_patchgroup_idx[ i ]
            }
            if(atdu_num_deleted_patchgroups == 0){
                atdu_num_deleted_patches
                for( i = 0; i < atdu_num_deleted_patches; i++ ) {
                    atdu_deleted_patch_idx[ i ]
                }
            }
            for( p = 0; p < RefAtduTotalNumPatches[ tileID ]; p++ ) {
                for( i = 0; i < atdu_num_deleted_patches; i++ ) {
                    if( p == atdu_deleted_patch_idx[ i ] ) break
                }
                if(i == atdu_num_deleted_patches)
                    skip_patch_data_unit( )
            }
            if(atdu_num_deleted_patches != 0)
                p = RefAtduTotalNumPatches[ tileID ]-atdu_num_deleted_patches
            else
                p = 0
            if (atdu_patch_data_present_flag ) {
                do {
                    atdu_patchgroup_index[ tileID ]
                    isEnd = (atdu_group_index==PATCHGROUP_END)
                    if(!isEnd) atdu_patchgroup_information[ tileID ]
                }
                do {
                    atdu_patch_mode[ tileID ][ p ]
            isEnd = ( ath_type == P_TILE && atdu_patch_mode[ tileID ][ p ] == P_END) ||
            ( ath_type == I_TILE && atdu_patch_mode[ tileID ][ p ] == I_END )
```

-continued

```
            if( !isEnd ) {
    patch_information_data( tileID , p, atdu_patch_mode[ tileID ][ p ] )
                p++
            }
        } while( !isEnd )
    }
}
    AtduTotalNumPatches[ tileID ] = p
}
``` atdu_patch_data_present_flag indicates there are patch data(patch_information_data( )) signalled in the tile.

atdu_num_deleted_patchgroups indicates the number of patch groups not copied from the reference tile. Each patch has a groupIndex and patches with the same group index are considered as in the same group.

atdu_deleted_patchgroup_idx indicates patch group indices which are not copied. When atdu_num_deleted_patchgroups is not 0, this list is derived from the patch indices in the patchgroup.

atdu_num_deleted_patches indicates the number of patches not copied from the reference tile. When atdu_num_deleted_patchgroups is not 0, atdu_num_deleted_patches need to be derived by counting the number of patches in each patch group.

atdu_deleted_patch_idx indicates patch indices which are not copied.

In some embodiments, these indices can be recalculated by reordering the patches.

For example, when MESH_RAW is in between two non-MESH_RAW mesh patches, the MESH_RAW patch can be removed for the index calculation.

Throughout the patches in the reference tile, if the patch index is one of those in the atdu_deleted_patchgroup_idx the patch is copied by skip_patch_data_unit( ).

If atdu_patch_data_present_flag is true, which indicates there are more patch information in the tile, patch_information_data( ) is signalled and the patch index for the coming patches is started with RefAtduTotalNumPatches[tileID]-atdu_num_deleted_patches when atdu_num_deleted_patches is not 0.

atdu_patchgroup_index indicates the patchgroup index of the following atdu_group_information. PATCH-GROUP_END indicates there is no more atdu_group_information.

In some embodiments atdu_patchgroup_index is not signaled but always set as PATCHGROUP_END.

atdu_patchgroup_information has common information which can be shared by all the patches which have the same patchgroup index.

```
atdu_patchgroup_information( tileID, patchGroupIdx ) {
    atdu_patchgroup_overriden_flag
    if(atdu_patchgroup_overriden_flag){
        atdu_patchgroup_subdivision_enable_flag
        atdu_patchgroup_displacement_coordinate_system_enable_flag
        atdu_patchgroup_transform_index_enable_flag
        atdu_patchgroup_transform_parameters_enable_flag
        atdu_patchgroup_num_attribute_enable_flag
    }
    if(atdu_patchgroup_subdivision_enable_flag){
        atdu_patchgroup_subdivision_method
        atdu_patchgroup_subdivision_iteration_count_minus1
    }
    if(atdu_patchgroup_displacement_coordinate_system_enable_flag)
        atdu_patchgroup_displacement_coordinate_system
    if(atdu_patchgroup_transform_index_enable_flag)
        atdu_patchgroup_transform_index
    if(atdu_patchgroup_transform_index != NONE &&
    atdu_patchgroup_transform_parameters_enable_flag) {
        atdu_patchgroup_transform parameters(0, atdu_patchgroup_transform_index)
    }
    if(atdu_patchgroup_num_attribute_enable_flag)
        atdu_patchgroup_num_attribute
    for(i=0; i< atdu_patchgroup_num_attribute; i++){
        atdu_patchgroup_attribute_type
        atdu_patchgroup_attribute_transform_index_enable_flag
        atdu_patchgroup_attribute_transform_parameters_enable_flag
        if(atdu_patchgroup_attribute_transform_index_enable_flag)
            atdu_patchgroup_attribute_transform_index
        if(atdu_patchgroup_attribute_transform_index != NONE &&
    atdu_patchgroup_attribute_transform_parameters_enable_flag) {
```

-continued

```
atdu_patchgroup_transform_parameters(i+1, atdu_patchgroup_attribute_trans
form_index)
        }
    }
}
``` atdu_patchgroup_overriden_flag indicates any additional information that is to be signaled to override the syntax elements in the corresponding AFPS and/or in the corresponding ASPS.

rameters( ) or afps_vmc_extension_transform_parameters( ) for the corresponding attribute type.

In some embodiments, all the parameters can be always signaled without enable flags.

```
atdu_patchgroup_transform_parameters( attributeType, transformIndex )
    atdu_patchgroup_transform_lifting_quantization_parameters_enable_flag
    atdu_patchgroup_transform_log2_lifting_lod_inverseScale_enable_flag
    atdu_patchgroup_transform_log2_lifting_update_weight_enable_flag
    atdu_patchgroup_transform_log2_lifting_prediction_weight_enable_flag
    atdu_patchgroup_transform_lifting_skip_update
    if (atdu_patchgroup_transform_lifting_quantization_parameters_enable_flag){
        atdu_patchgroup_transform_lifting_quantization_parameters_x
        atdu_patchgroup_transform_lifting_quantization_parameters_y
        atdu_patchgroup_transform_lifting_quantization_parameters_z
    }
    if(atdu_patchgroup_transform_log2_lifting_lod_inverseScale_enable_flag){
        atdu_patchgroup_transform_log2_lifting_lod_inverseScale_x
        atdu_patchgroup_transform_log2_lifting_lod_inverseScale_y
        atdu_patchgroup_transform_log2_lifting_lod_inverseScale_z
    }
    if(atdu_patchgroup_transform_log2_lifting_update_weight_enable_flag)
        atdu_patchgroup_transform_log2_lifting_update_weight
    if(atdu_patchgroup_transform_log2_lifting_prediction_weight_enable_flag)
        atdu_patchgroup_transform_log2_lifting_prediction_weight
}
``` atdu_patchgroup_subdivision_enable_flag indicates atdu_patchgroup_subdivision_method and atdu_patchgroup_subdivision_iteration_count_minus1 are used instead of asps_vmc_ext_subdivision_method and asps_vmc_ext_subdivision_iteration_count_minus1 or afps_vmc_ext_subdivision_method and afps_vmc_ext_subdivision_iteration_count_minus1.

atdu_patchgroup_displacement_coordinate_system_enable_flag indicates atdu_patchgroup_displacement_coordinate_system is used instead of asps_vmc_ext_displacement_ coordinate_system.

atdu_patchgroup_transform_index_enable_flag indicates atdu_patchgroup_transform_index is used instead of asps_vmc_ext_transform_index or afps_vmc_ext_transform_index.

atdu_patchgroup_transform_parameters_enable_flag indicates atdu_patchgroup_transform_parameters( ) is signaled to be used instead of asps_vmc_extension_transform_parameters( ) or afps_vmc_extension_transform_parameters( ).

atdu_patchgroup_num_attribute_enable_flag indicates atdu_patchgroup_num_attribute-attributes use overridden parameters.

atdu_patchgroup_attribute_type indicates an attribute type.

atdu_patchgroup_attribute_transform_index_enable_flag indicates atdu_patchgroup_attribute_transform_index is used instead of asps_vmc_ext_attribute_transform_index or afps_vmc_extattribute_transform_index of the corresponding attribute type.

atdu_patchgroup_attribute_transform_parameters_enable_flag indicates atdu_transform_parameters( ) is signaled to be used instead of asps_vmc_extension_transform_paatdu_patchgroup_transform_lifting_quantization_parameters_enable_flag indicates atdu_patchgroup_transform_lifting_quantization_parameters_x, atdu_patchgroup_transform_lifting_quantization_parameters_y and atdu_patchgroup_transform_lifting_quantization_parameters_z are signaled to be used instead of the corresponding syntax elements signalled in the ASPS and/or in the AFPS.

atdu_patchgroup_transform_log 2_lifting_lod_inverseScale_enable_flag indicates atdu_patchgroup_transform_log 2_lifting_lod_inverseScale_x, atdu_patchgroup_transform_log 2_lifting_lod_inverseScale_y and atdu_patchgroup_transform_log 2_lifting_lod_inverseScale_z are signaled to be used instead of the corresponding syntax elements signalled in the ASPS and/or in the AFPS.

atdu_patchgroup_transform_log 2_lifting_update_weight_enable_flag indicates atdu_patchgroup_transform_log 2_lifting_update_weight is signaled to be used instead of the corresponding syntax element signalled in the ASPS and/or in the AFPS.

atdu_patchgroup_transform_log 2_lifting_prediction_weight_enable_flag indicates atdu_patchgroup_transform_log 2_lifting_prediction_weight is signaled to be used instead of the corresponding syntax element signalled in the ASPS and/or in the AFPS.

atdu_patchgroup_transform_lifting_skip_update is used instead of asps_vmc_ext_transform_lifting_skip_update or afps_vmc_ext_transform_lifting_skip_update. In some embodiments, all the parameters can be always signaled without enable flags.

Patch mode, P_MESH, M_MESH, RAW_MESH, I_MESH indicates the modes of patches contain information for v-mesh.

In one embodiment, an implementation of signalling mesh patch data units may include.

```
patch_information_data( tileID, patchIdx, patchMode ) {
    if( ath_type == P_TILE ) {
        ...
        else if( patchMode == P_MESH )
            mesh_intra_patch_data_unit( tileID, patchIdx )
        else if( patchMode == M_MESH )
            mesh_merge_patch_data_unit( tileID, patchIdx )
        else if( patchMode == RAW_MESH )
            Mesh_raw_patch_data_unit( tileID, patchIdx )
    }
    else if( ath_type == I_TILE ) {
        ...
        else if( patchMode == I_MESH )
            mesh_inter_data_unit( tileID, patchIdx )
        else if( patchMode == RAW_MESH )
            Mesh_raw_patch_data_unit( tileID, patchIdx )
    }
}
```

In some embodiments, an implementation of signalling mesh patch data units may include:

|  | descriptor |
|---|---|
| ```
patch_information_data( tileID, patchIdx, patchMode ) {
    if( ath_type == P_TILE ) {
...
        else if( patchMode == I_MESH )
            mesh_intra_patch_data_unit( tileID, patchIdx )
        else if( patchMode == P_MESH )
            mesh_inter_patch_data_unit( tileID, patchIdx )
        else if( patchMode == M_MESH)
            mesh_merge_patch_data_unit( tileID, patchIdx )
        else if( patchMode == RAW_MESH )
            mesh_raw_patch_data_unit( tileID, patchIdx )
    }
    else if( ath_type == I_TILE ) {
...
        else if( patchMode == I_MESH )
            mesh_intra_patch_data_unit( tileID, patchIdx )
        else if( patchMode == RAW_MESH )
            mesh_raw_patch_data_unit( tileID, patchIdx )
    }
}
``` | |

Mesh Intra Patch Data Unit

Mesh_intra_data_unit has information to connect the geometry video, the texture video and basemeshes. These values are given to the mesh normalization process, the geometry normalization process and the attribute normalization process. In one embodiment, the mesh intra patch data unit may be implemented as follows:

```
mesh_intra_data_unit( tileID, patchIdx ) {
    mdu_patchgroup_index[ tileID ][ patchIdx ]
    mdu_patch_parameters_enable_flag[ tileID ][patchIdx ]
    mdu_geometry_2d_ pos_x[ tileID ][ patchIdx ]
    mdu_geometry_2d_pos_y[ tileID ][ patchIdx ]
    mdu_geometry_2d_size_x_minus1[ tileID ][ patchIdx ]
    mdu_geometry_2d_size_y_minus1[ tileID ][ patchIdx ]
    mdu_attributes_2d_pos_x[ tileID ][ patchIdx ]
    mdu_attributes_2d_pos_y[ tileID ][ patchIdx ]
    mdu_attributes_2d_size_x_minus1[ tileID ][ patchIdx ]
    mdu_attributes_2d_size_y_minus1[ tileID ][ patchIdx]
    mdu_3d_offset_u[ tileID ][ patchIdx ]
    mdu_3d_offset_v[ tileID ][ patchIdx ]
    mdu_3d_offset_d[ tileID ][ patchIdx ]
    if( asps_normal_axis_max_delta_value_enabled_flag )
        mdu_3d_range_d[ tileID ][ patchIdx ]
    mdu_vertex_count_minus1[ tileID ][ patchIdx ]
    mdu_triangle_count_minus1[ tileID ][ patchIdx ]
```

-continued

```
    mdu_head_vertex_index[ tileID ][ patchIdx ]
    mdu_num_sequential_vertex_index[ tileID ][ patchIdx ]
    for(v=0; v<= mdu_vertex_count_minus1- mdu_num_
sequential_vertex_index; v++){
        mdu_vertex_index_diff[ tileID ][ patchIdx ]
    }
    If(vmc_ext_direct_attribute_projection_enabled){
        mdu_projection_id[ tileID ][ patchIdx ]
        mdu_orientation_index[ tileID ][ patchIdx ]
    }
    if( afps_lod_mode_enabled_flag ) {
        mdu_lod_enabled_flag[ tileID ][ patchIdx ]
        if( mdu_lod_enabled_flag[ tileID ][ patchIdx ] > 0 ) {
            mdu_lod_scale_x_minus1[ tileID ][ patchIdx ]
            mdu_lod_scale_y_idc[ tileID ][ patchIdx ]
        }
    }
    if(mdu_patch_parameters_enable_flag){
        mdu_subdivision_enable_flag
        mdu_displacement_coordinate_system_enable_flag
        mdu_transform_index_enable_flag
        mdu_transform_parameters_enable_flag
        mdu_num_attribute_enable_flag
    }
    if(mdu_subdivision_enable_flag){
        mdu_subdivision_method
        mdu_subdivision_iteration_count_minus1
    }
    if(mdu_displacement_coordinate_system_enable_flag)
        mdu_displacement_coordinate_system
    if(mdu_transform_index_enable_flag)
        mdu_transform_index
    if(mdu_transform_index != NONE &&
mdu_transform_parameters_enable_flag) {
        mdu_transform_parameters(0, mdu_transform_index)
    }
    if(mdu_num_attribute_enable_flag)
        mdu_num_attribute
    for(i=0; i< mdu_num_attribute; i++){
        mdu_attribute_type
        mdu_attribute_transform_index_enable_flag
        mdu_attribute_transform_parameters_enable_flag
        if(mdu_attribute_transform_index_enable_flag)
            mdu_attribute_transform_index
        if(mdu_attribute_transform_index != NONE &&
mdu_attribute_transform_parameters_enable_flag) {
        mdu_transform_parameters(i+1, mdu_attribute_transform_index)
        }
    }
}
``` mdu_patchgroup_index indicates the group index of the patch.

mdu_patch_parameters_enable_flag indicates whether certain parameters are copied from atdu_pathgroup_information or not. In some embodiments, mdu_patch_parameters_enable_flag is not signaled but always set as true.

mdu_geometry_2d_pos_x and mdu_geometry_2d_pos_y indicate the left top corner of the corresponding area in the geometry video frame.

mdu_geometry_2d_size_x_minus1 and mdu_geometry_2d_size_y_minus1 indicate the size of the corresponding area in the geometry video frame.

mdu_attributes_2d_pos_x and mdu_attributes_2d_pos_y indicate the left top corner of the corresponding area in the attribute video frame.

mdu_attributes_2d_size_x_minus1 and mdu_attributes_2d_size_y_minus1 indicate the size of the corresponding area in the attribute video frame. In some embodiments, mdu_attributes_2d_pos_x, mdu_attributes_2d_pos_y, mdu_attributes_2d_size_x_minus1 and mdu_attributes_2d_size_y_minus1 can be signaled only when vmc_ext_direct_attribute_projection_enabled is true.

mdu_3d_offset_u, mdu_3d_offset_v and mdu_3d_offset_d indicate the offset of the corresponding 3D space. In some embodiments, these three values can be signaled in a SEI message.

mdu_3d_range_d specifies the nominal maximum value of the shift expected to be present in the reconstructed bit depth patch geometry samples. In some embodiments, mdu_3d_range_d can be signaled in a SEI message.

mdu_vertex_count_minus1 indicates number of vertices corresponding to this patch in the normalized meshes.

mdu_triangle_count_minus1 indicates number of triangles corresponding to this patch in the normalized meshes. In some embodiments, mdu_vertex_count_minus1 and/or mdu_triangle_count_minus1 can be the numbers in the base meshes. In some embodiments, mdu_vertex_count_minus1 and/or mdu_triangle_count_minus1 can be signaled in a SEI message. In some embodiments, mdu_vertex_count_minus1 and mdu_triangle_count_minus1 can be derived from mdu_vertex_index_list with or without mdu_subdivision_iteration_count.

mdu_head_vertex_index indicates the index of the first vertex corresponding to this patch in the normalized mesh. It is the smallest vertex index among the vertices corresponding to this patch.

mdu_num_sequential_vertex_index indicates number of vertices whose indices are sequential from the mdu_head_vertex_index.

mdu_vertex_index_diff indicates the difference between vertex indices in the mdu_vertex_index_list.

mdu_vertex_index_list lists vertex indices corresponding to the patch. It can be derived from mdu_head_vertex_index, mdu_num_sequential_vertex_index and mdu_vertex_index_diff. For example, the list can be set as following:

```
for(v=0; v< mdu_num_sequential_vertex_index; v++){
    mdu_vertex_index_list[v] = mdu_head_vertex_index+v;
}
    for(v= mdu_num_sequential_vertex_index; v<= mdu_vertex_
count_minus1; v++){
        mdu_vertex_index_list[v] = mdu_vertex_index_list[v–1] +
mdu_vertex_index_diff [v– mdu_num_sequential_vertex_index]
}
```

In some embodiments, mdu_head_vertex_index can be the index of the first vertex corresponding to this patch in the base mesh. mdu_vertex_index_list is a list of vertex indices corresponding to the patch in the base mesh. in this case mdu_vertex_index_list can be increased up to the size of (mdu_vertex_count_minus1+1) during the mesh normalization process when mdu_vertex_count_minus1 indicates the number of corresponding vertexes in the normalized mesh. In some embodiments, the total size of mdu_vertex_index_list can be derived during the mesh normalization process.

In some embodiments, a patch whose index is p corresponds with p-th connected component of the base mesh. mdu_vertex_index_list is derived from the connected component without signaling mdu_head_vertex_index, mdu_num_sequential_vertex_index or mdu_vertex_index_diff.

In some embodiments, a patch whose index is p corresponds with mdu_cc_index-th connected component of the base mesh. mdu_cc_index is signaled and mdu_vertex_index_list is derived from the connected component without signaling mdu_head_vertex_index, mdu_num_sequential_vertex_index or mdu_vertex_index_diff.

In some embodiments, the index (p)used to find a corresponding connected component of the base mesh can be derived by not including non-mesh related patches.

In some embodiments, all the parameters used to find connected components of a mesh can be delivered in v-mesh extension in the atlas sequence parameter set.

In some embodiments, a patch whose index is p corresponds with p-th connected component of the normalized mesh. mdu_vertex_index_list is derived from the connected component without signaling mdu_head_vertex_index, mdu_num_sequential_vertex_index or mdu_vertex_index_diff.

mdu_projection_id indicates the values of the projection mode and of the index of the normal to the projection plane for the patch as similar as in Reference [E1].

mdu_orientation_index indicates the patch orientation index as similar as in Reference [E1].

mdu_lod_enabled_flag indicates that the LOD parameters are present for the current patch p.

mdu_lod_scale_x_minus1 and mdu_lod_scale_y_idc indicate scaling factors for x and y coordinate as similar as in Reference [E1].

In some embodiments, mdu_projection_id mdu_orientation_index, mdu_lod_enabled_flag, mdu_lod_scale_x_minus1 and mdu_lod_scale_y_idc can be signalled in atdu_patchgroup_information and overridden in this mesh_intra_data_unit.

mdu_subdivision_enable_flag indicates mdu_subdivision_method and mdu_subdivision_iteration_count_minus1 are used instead of the corresponding syntaxs element signaled in the ASPS, in the AFPS and/or atdu_patchgroup_information.

mdu_displacement_coordinate_system_enable_flag indicates mdu_displacement_coordinate_system is signaled to be used instead of the corresponding syntax elements signaled in the ASPS, in the AFPS and/or atdu_patchgroup_information.

mdu_transform_index_enable_flag indicates mdu_transform_index is signaled to be used instead of the corresponding syntax elements signaled in the ASPS, in the AFPS and/or atdu_patchgroup_information.

mdu_transform_parameters_enable_flag indicates mdu_transform_parameters( ) is signaled to be used instead of the corresponding syntax elements signaled in the ASPS, in the AFPS and/or atdu_patchgroup_information.

mdu_num_attribute_enable_flag indicates mdu_num_attribute attributes use overridden parameters.

mdu_attribute_type indicates an attribute type.

mdu_attribute_transform_index_enable_flag indicates mdu_attribute_transform_index is signaled to be used instead of the corresponding syntax elements signaled in the ASPS, in the AFPS and/or atdu_patchgroup_information.

mdu_attribute_transform_parameters_enable_flag indicates mdu_transform_parameters( ) is signaled to be used instead of the corresponding syntax elements signaled in the ASPS, in the AFPS and/or atdu_patchgroup_information.

In some embodiments, all the parameters can be always signaled without enable flags. Below is an embodiment of an implementation of the mdu_transform_parameters( ).

```
mdu_transform_parameters( attributeType, transformIndex )
    mdu_transform_lifting_quantization_parameters_enable_flag
    mdu_transform_log2_lifting_lod_inverseScale_enable_flag
    mdu_transform_log2_lifting_update_weight_enable_flag
    mdu_transform_log2_lifting_prediction_weight_enable_flag
    mdu_transform_lifting_skip_update
```

-continued

```
if (mdu_transform_lifting_quantization_parameters_enable_flag){
    mdu_transform_lifting_quantization_parameters_x
    mdu_transform_lifting_quantization_parameters_y
    mdu_transform_lifting_quantization_parameters_z
}
if(mdu_transform_log2_lifting_lod_inverseScale_enable_flag){
    mdu_transform_log2_lifting_lod_inverseScale_x
    mdu_transform_log2_lifting_lod_inverseScale_y
    mdu_transform_log2_lifting_lod_inverseScale_z
}
if(mdu_transform_log2_lifting_update_weight_enable_flag)
    mdu_transform_log2_lifting_update_weight
if(mdu_transform_log2_lifting_prediction_weight_enable_flag)
    mdu_transform_log2_lifting_prediction_weight
}
``` mdu_transform_lifting_quantization_parameters_en-able_flag indicates mdu_transform_lifting_quantization_pa-rameters_x, mdu_transform_lifting_quantization_param-eters_y and mdu_transform_lifting_quantization_parameters_z are signaled to be used instead of the corre-sponding syntax elements signaled in the ASPS, in the AFPS and/or atdu_patchgroup_information.

mdu_transform_log 2_lifting_lod_inverseScale_en-able_flag indicates mdu_transform_log 2_lifting_lod_in-verseScale_x, mdu_transform_log 2_lifting_lod_inverseS-cale_y and mdu_transform_log 2_lifting_lod_inverseScale_z are signaled to be used instead of the corre-sponding syntax elements signaled in the ASPS, in the AFPS and/or atdu_patchgroup_information.

mdu_transform_log 2_lifting_update_weight_enable_f-lag indicates mdu_transform_log 2_lifting_update_weight is signaled to be used instead of the corresponding syntax elements signaled in the ASPS, in the AFPS and/or atdu_patchgroup_information.

mdu_transform_log 2_lifting_prediction_weight_en-able_flag indicates mdu_transform_log 2_lifting_predic-tion_weight is signaled to be used instead of the correspond-ing syntax elements signaled in the ASPS, in the AFPS and/or atdu_patchgroup_information.

mdu_transform_lifting_skip_update is used instead of the corresponding syntax elements signaled in the ASPS, in the AFPS and/or atdu_patchgroup_information.

In some embodiments, all the parameters can be always signaled without enable flags.

An embodiment of an implementation of the mesh intra patch data unit is provided below.

| | descriptor |
|---|---|
| mesh_intra_data_unit( tileID, patchIdx ) { | |
|   if(asps_vmc_ext_segment_mapping_method!=1) | |
|     mdu_segment_id[ tileID ][patchIdx ] | ue(v) |
|   mdu_vertex_count_minus1[ tileID ][ patchIdx ] | ue(v) |
|   mdu_triangle_count_minus1[ tileID ][ patchIdx ] | ue(v) |
|   if(asps_vmc_ext_patch_mapping_method !=0){ | |
|     mdu_num_subparts[ tileID ][ patchIdx ] | ue(v) |
|     for(i=0;i< mdu_num_subparts[ tileID ][ patchIdx ]; i++) | |
|       mdu_subpart_id[ tileID ][ patchIdx ] | ue(v) |
|   } | |
|   mdu_geometry_2d_pos_x[ tileID ][ patchIdx ] | ue(v) |
|   mdu_geometry_2d_pos_y[ tileID ][ patchIdx ] | ue(v) |
|   mdu_geometry_2d_size_x_minus1[ tileID ][ patchIdx ] | ue(v) |
|   mdu_geometry_2d_size_y_minus1[ tileID ][ patchIdx ] | ue(v) |
|   mdu_3d_offset_u[ tileID ][ patchIdx ] | ue(v) |
|   mdu_3d_offset_v[ tileID ][ patchIdx ] | ue(v) |
|   mdu_3d_offset_d[ tileID ][ patchIdx ] | ue(v) |
|   if( asps_normal_axis_max_delta_value_enabled_flag ) | |
|     mdu_3d_range_d[ tileID ][ patchIdx ] | ue(v) |
|   if( afps_lod_mode_enabled_flag ) { | |
|     mdu_lod_enabled_flag[ tileID ][ patchIdx ] | u(1) |
|     if( mdu_lod_enabled_flag[ tileID ][ patchIdx ] > 0 ) { | |
|       mdu_lod_scale_x_minus1[ tileID ][ patchIdx ] | ue(v) |
|       mdu_lod_scale_y_idc[ tileID ][ patchIdx ] | ue(v) |
|     } | |
|   } | |
|   mdu_patch_parameters_enable_flag[ tileID ][patchIdx ] | u(1) |
|   if(mdu_patch_parameters_enable_flag){ | |
|     mdu_subdivision_enable_flag[ tileID ][ patchIdx ] | u(1) |
|     mdu_displacement_coordinate_system_enable_flag[ tileID ][ patchIdx ] | u(1) |
|     mdu_transform_index_enable_flag[ tileID ][ patchIdx ] | u(1) |
|     mdu_transform_parameters_enable_flag[ tileID ][ patchIdx ] | u(1) |
|     mdu_attribute_parameter_overwrite_flag[ tileID ][ patchIdx ] | u(1) |
|   } | |
|   if(mdu_subdivision_enable_flag[ tileID ][ patchIdx ]){ | |
|     mdu_subdivision_method[ tileID ][ patchIdx ] | u(3) |
|     mdu_subdivision_iteration_count_minus1[ tileID ][ patchIdx ] | u(8) |
|   } | |
|   if(mdu_displacement_coordinate_system_enable_flag[ tileID ][ patchIdx ]) | |
|     mdu_displacement_coordinate_system[ tileID ][ patchIdx ] | u(1) |
|   if(mdu_transform_index_enable_flag[ tileID ][ patchIdx ]) | |
|     mdu_transform_index[ tileID ][ patchIdx ] | u(3) |
|     if(mdu_transform_index[ tileID ][ patchIdx ] == LINEAR_LIFTING && | |
|   mdu_transform_parameters_enable_flag[ tileID ][ patchIdx ]) | |
|     vmc_lifting_transform_parameters(0, 2) | |
|     for(i=0; i< asps_vmc_ext_num_attribute_video; i++){ | |
|       mdu_vmc_ext_direct_attribute_projection_enabled | u(1) |
|   [ tileID ][ patchIdx ][ i ] | |

-continued

| | descriptor |
|---|---|
| if(afps_vmc_ext_direct_attribute_projection_enabled [ tileID ][ patchIdx ][ i ]){ | |
|     mdu_attributes_2d_pos_x[ tileID ][ patchIdx ][ i ] | ue(v) |
|     mdu_attributes_2d_pos_y[ tileID ][ patchIdx ][ i ] | ue(v) |
|     mdu_attributes_2d_size_x_minus1[ tileID ][ patchIdx ][ i ] | ue(v) |
|     mdu_attributes_2d_size_y_minus1[ tileID ][ patchIdx ][ i ] | ue(v) |
|     mdu_projection_id[ tileID ][ patchIdx ][ i ] | ue(v) |
|     mdu_orientation_index[ tileID ][ patchIdx ][ i ] | ue(v) |
|     } | |
|     if(mdu_attribute_parameter_overwrite_flag[ tileID ][ patchIdx ]){ | |
| mdu_attribute_transform_index_enable_flag[ tileID ][ patchIdx ][ i ] | u(1) |
| mdu_attribute_transform_parameters_enable_flag[ tileID ][ patchIdx ][ i ] | u(1) |
| if(mdu_attribute_transform_index_enable_flag[ tileID ][ patchIdx ][ i ]) | |
|     mdu_attribute_transform_index[ tileID ][ patchIdx ][ i ] | u(3) |
|     if(mdu_attribute_transform_index[ tileID ][ patchIdx ] == LINEAR_LIFTING && mdu_attribute_transform_parameters _enable_flag[ tileID ][ patchIdx ]) | |
|         vmc_lifting_transform_parameters(i+1, 2) | |
|     }//if | |
|   } | |
| } | |

In the current embodiment, mdu_segment_id indicates the segment ID associated with the current patch.

When asps_vmc_ext_segment_mapping_method is equal to 0, the associated segment (a set of connected vertices) is the union of the vertices whose submesh Id is equal to mdu_segment_id and the associated information (connectivities and/or attributes). In this case, vps_ext_mesh_data_ submesh_id_attribute_present_flag shall be true and one of vps_ext_mesh_attribute_type is submeshId.

When asps_vmc_ext_segment_mapping_method is equal to 1, the associated segment is derived from the patch information. The segment is the union of the vertices mapped to the patches in one tile.

Otherwise, the associated segment is the mdu_segmen-t_id-th segment determined by asps_vmc_ext_segment_ mapping_method.

In some embodiments, one output of the base mesh substream decoder is mapped with one mdu_segment_id when the output of the base mesh substream decoder is a sequence of submesh frames.

mdu_vertex_count_minus1 and mdu_triangle_count_mi-nus1 indicate the number of vertices and triangles associated with the current patch.

When asps_vmc_ext_patch_mapping_method is equal to 0, all the triangles in the segment indicated by mdu_seg-ment_id are associated with the current patch. In this case, there is only one patch associated with the segment. asps_vmc_ext_patch_mapping_method cannot be equal to 0 when asps_vmc_ext_segment_mapping_method is equal to 1.

In some embodiments, all the triangles in the more than one segment indicated in the atlas tile header are associated with the current patch. In this case, a tile has only one patch.

When asps_vmc_ext_patch_mapping_method is equal to 1, the syntax elements mdu_num_subparts and mdu_sub-part_id are signalled. the associated triangle faces are the union of the triangle faces whose facegroup id is equal to mdu_subpart_id.

In some cases, the associated triangle faces are the union of the triangle faces in mdu_subpart_id-th subpart deter-mined by asps_vmc_ext_patch_mapping_method.

When mdu_patch_parameters_enable_flag is true, the subdivision method, displacement coordinate system, trans-form index, transform parameters, and attribute transform parameters can be signalled again and the information overrides the corresponding information signalled in asps_vmc_extension( ).

In some embodiments, mdu_displacement_coordinate_ system_enable_flag is not signalled but mdu_displacement_ coordinate_system is always signalled.

In some embodiments, segment id can be signalled in atlas_tile_header and the segment id for all the patches in the atlas tile is same as the one. An example of this implemen-tation is provided below.

| | descriptor |
|---|---|
| atlas_tile_header( ) { | |
|   ... | |
|   ath_segment_id | u(v) |
| } | |

In some embodiments, a tile can be associated with more that one mesh segment. In this case, each patch belongs to this tile has segment_id.

In some embodiments, in the mesh patch data unit, mdu_segment_id can indicate the order of appearance instead of the segment_id itself

| | descriptor |
|---|---|
| atlas_tile_header( ) { | |
|   ... | |
|   ath_num_segments | ? |
|   if(i=0; i<ath_num_segments; i++) | |
|     ath_segment_id | u(v) |
| } | |

In some embodiments, patch data units may not contain 2d_pos_x, 2d_pos_y, 2d_size_x_minus1 or 2d_size_y_mi-nus1. The 2D position and the 2D size is signalled once in the atlas tile header. In this case, all the patches in the atlas tile has the same segment id.

|  | descriptor |
|---|---|
| atlas_tile_header( ) { | |
| ... | |
| ath_geometry_2d_pos_x | ue(v) |
| ath_geometry_2d_pos_y | ue(v) |
| ath_geometry_2d_size_x_minus1 | ue(v) |
| ath_geometry_2d_size_y_minus1 | ue(v) |
| } | |

Inter Patch Data Unit

Turning now to a discussion of the inter patch data unit, an embodiment of an implementation of the Mesh Inter Patch Data Unit is provided below.

```
mesh_inter_patch_data_unit( tileID, patchIdx ) {
    if( NumRefIdxActive > 1 )
        midu_ref_index[ tileID ][ patchIdx ]
    midu_patch_index[ tileID ][ patchIdx ]
    midu_geometry_2d_ pos_x[ tileID ][ patchIdx ]
    midu_geometry_2d_pos_y[ tileID ][ patchIdx ]
    midu_geometry_2d_delta_size_x[ tileID ][ patchIdx ]
    midu_geometry_2d_delta_size_y[ tileID ][ patchIdx ]
    midu_attributes_2d_pos_x[ tileID ][ patchIdx ]
    midu_attributes_2d_pos_y[ tileID ][ patchIdx ]
    midu_attributes_2d_delta_size_x[ tileID ][ patchIdx ]
    midu_attributes_2d_delta_size_y[ tileID ][ patchIdx ]
    midu_3d_offset_u[ tileID ][ patchIdx ]
    midu_3d_offset_v[ tileID ][ patchIdx ]
    midu_3d_offset_d[ tileID ][ patchIdx ]
    if( asps_normal_axis_max_delta_value_enabled_flag )
        midu_3d_range_d[ tileID ][ patchIdx ]
}
```

Patch mode P_MESH indicates a patch is predicted from the reference tile. The syntax elements not signaled are copied from the reference patch.

midu_ref_index indicates the reference index for the reference tile.

midu_patch_index indicates the reference index for the reference patch.

In some embodiments, midu_patch_index indicates a recalculated patch index which derived without non-mesh related patches and/or RAW_MESH patches.

midu_geometry_2d_pos_x and midu_geometry_2d_pos_y indicate the left top corner of the corresponding area in the geometry video frame.

midu_geometry_2d_delta_size_x and midu_geometry_2d_delta_size_y indicate the size difference between the corresponding area and the area corresponding to the reference patch in the geometry video frame.

midu_attributes_2d_pos_x and midu_attributes_2d_pos_y indicate the left top corner of the corresponding area in the attribute video frame.

midu_attributes_2d_size_x_minus1 and midu_attributes_2d_size_y_minus1 indicate the size difference between the corresponding area and the area corresponding to the reference patch in the attribute video frame.

In some embodiments, midu_attributes_2d_pos_x, midu_attributes_2d_pos_y, midu_attributes_2d_delta_size_x and mdu_attributes_2d_delta_size_y can be signaled only when vmc_ext_direct_attribute_projection_enabled is true.

midu_3d_offset_u, midu_3d_offset_v and midu_3d_offset_d indicate the offset of the corresponding 3D space.

In some embodiments, these three values can be signaled in a SE d message.

midu_3d ranged specifies the nominal maximum value of the shift expected to be present in the reconstructed bit depth patch geometry samples.

In some embodiments, mdu_3d_range_d can be signaled in a SE (message.

Provided below is another embodiment of an implementation of the Mesh Inter Data Unit.

|  | descriptor |
|---|---|
| mesh_inter_data_unit( tileID, patchIdx ) { | |
| if( NumRefIdxActive > 1 ) | |
| midu_ref_index[ tileID ][ patchIdx ] | ue(v) |
| midu_ref_patch_index[ tileID ][ patchIdx ] | se(v) |
| midu_vertex_count_delta[ tileID ][ patchIdx ] | se(v) |
| midu_triangle_count_delta[ tileID ][ patchIdx ] | se(v) |
| midu_geometry_2d_pos_x[ tileID ][ patchIdx ] | ue(v) |
| midu_geometry_2d_pos_y[ tileID ][ patchIdx ] | ue(v) |
| midu_geometry_2d_size_x_delta[ tileID ][ patchIdx ] | ue(v) |
| midu_geometry_2d_size_y_delta[ tileID ][ patchIdx ] | ue(v) |
| midu_3d_offset_u[ tileID ][ patchIdx ] | ue(v) |
| midu_3d_offset_v[ tileID ][ patchIdx ] | ue(v) |
| midu_3d_offset_d[ tileID ][ patchIdx ] | ue(v) |
| if( asps_normal_axis_max_delta_value_enabled_flag ) | |
| midu_3d_range_d[ tileID ][ patchIdx ] | ue(v) |
| } | |

Mesh Merge Patch Data Unit

Patch mode M_-MESH indicates a patch is copied from the reference frame but some of the information is overwritten. An example of the Mesh Merge Data Unit is provided below.

|  | descriptor |
|---|---|
| mesh_merge_data_unit( tileID, patchIdx ) { | |
| if( NumRefIdxActive > 1 ) | |
| mmdu_ref_index[ tileID ][ patchIdx ] | ue(v) |
| mmdu_ref_patch_index[ tileID ][ patchIdx ] | se(v) |
| mmdu_vertex_count_delta[ tileID ][ patchIdx ] | se(v) |
| mmdu_triangle_count_delta[ tileID ][ patchIdx ] | se(v) |
| mmdu_override_2d_params_flag[ tileID ][ patchIdx ] | u(1) |
| mmdu_override_3d_params_flag[ tileID ][ patchIdx ] | u(1) |
| if( mpdu_override_2d_params_flag[ tileID ][ patchIdx ] ) { | |
| mmdu_geometry_2d_pos_x[ tileID ][ patchIdx ] | ue(v) |
| mmdu_geometry_2d_pos_y[ tileID ][ patchIdx ] | ue(v) |
| mmdu_geometry_2d_size_x_minus1[ tileID ][ patchIdx ] | ue(v) |
| mmdu_geometry_2d_size_y_minus1[ tileID ][ patchIdx ] | ue(v) |
| } | |
| if(mpdu_override_3d_params_flag[ tileID ][ patchIdx] ) { | |
| mmdu_3d_offset_u[ tileID ][ patchIdx ] | ue(v) |
| mmdu_3d_offset_v[ tileID ][ patchIdx ] | ue(v) |

-continued

| | descriptor |
|---|---|
| mmdu_3d_offset_d[ tileID ][ patchIdx ]<br>    if( asps_normal_axis_max_delta_value_enabled_flag )<br>       mmdu_3d_range_d[ tileID ][ patchIdx ]<br>   }<br>} | ue(v)<br><br>ue(v) |

Mesh Skip

The mesh skip patch mode indicates that the data unit should be skipped. One embodiment f an implementation of this mode is provided below.

| | descriptor |
|---|---|
| mesh_skip_data_unit( tileID, patchIdx ) {<br>   } | |

Raw Mesh Data Unit

The raw mesh patch mode indicates the data unit contains explicit information about the positions and the attributes. An embodiment of the Mesh Skip/Mesh Raw Patch Data Unit implementation is provided below.

```
mesh_raw_patch_data_unit( tileID, patchIdx ) {
    if( AuxTileHeight[ TileIDToIndex[ tileID ] ] > 0)
        rmdu_patch_in_auxiliary_video_flag[ tileID ][ patchIdx ]
    rmdu_geometry_2d_pos_x[ tileID ][ patchIdx ]
    rmdu_geometry_2d_pos_y[ tileID ][ patchIdx ]
    rmdu_ geometry_2d_size_x_minus1[ tileID ][ patchIdx ]
    rmdu_ geometry_2d_size_y_minus1[ tileID ][ patchIdx ]
    rmdu_attribute_2d_pos_x[ tileID ][ patchIdx ]
    rmdu_attribute_2d_pos_y[ tileID ][ patchIdx ]
    rmdu_attribute_2d_size_x_minus1[ tileID ][ patchIdx ]
    rmdu_attribute_2d_size_y_minus1[ tileID ][ patchIdx ]
    rmdu_3d_offset_u[ tileID ][ patchIdx ]
    rmdu_3d_offset_v[ tileID ][ patchIdx ]
    rmdu_3d_offset_d[ tileID ][ patchIdx ]
    rmdu_head_vertex_index [ tileID ][ patchIdx ]
    rmdu_vertex_count_minus1 [ tileID ][ patchIdx ]
    rmdu_triangle_count_minus1 [ tileID ][ patchIdx ]
}
``` rmdu_patch_in_auxiliary_video_flag indicates whether the geometry and attribute data associated with the patch are encoded in an auxiliary video sub-bitstream.

rmdu_geometry_2d_pos_x and rmdu_geometry_2d_pos_y indicate the left top corner of the corresponding area in the geometry video frame.

rmdu_geometry_2d_size_x_minus1 and rmdu_geometry_2d_size_y_minus1 indicate the size of the corresponding area in the geometry video frame.

rmdu_attributes_2d_pos_x and rmdu_attributes_2d_pos_y indicate the left top corner of the corresponding area in the attribute video frame.

rmdu_attributes_2d_size_x_minus1 and rmdu_attributes_2d_size_y_minus1 indicate the size of the corresponding area in the attribute video frame.

In some embodiments, rmdu_attributes_2d_pos_x, rmdu_attributes_2d_pos_y, rmdu_attributes_2d_size_x_minus1 and rmdu_attributes_2d_size_y_minus1 can be signaled only when vmc_ext_direct_attribute_projection_enabled is true.

rmdu_3d_offset_u, rmdu_3d_offset_v and rmdu_3d_offset_d indicate the offset of the corresponding 3D space.

In some embodiments, these three values can be signaled in a SEI message.

rmud_head_vertex_index indicates the index of the first vertex corresponding to this patch. In some embodiments, this value is not signaled but the outputs of this patch are appended to the end of the position list of the corresponding mesh.

rmdu_vertex_count_minus1 indicates number of vertices corresponding to this patch.

rmdu_triangle_count_minus1 indicates number of triangles corresponding to this patch.

In some embodiments, mesh_raw_patch_data_unit can be separated into two patch data unit mesh_raw_geometry_patch_data_unit and mesh_raw_attribute_patch_data_unit.

Another embodiment of an implementation of the raw mesh patch mode using "mrdu" in lieu of "rmdu" is provided below.

| | descriptor |
|---|---|
| mesh raw data_unit( tileID, patchIdx ) {<br>    if( AuxTileHeight[ TileIDToIndex[ tileID ] ] > 0)<br>       mrdu_patch_in_auxiliary_video_flag[ tileID ][ patchIdx ]<br>    mrdu_patch_submesh_id[ tileID ][patchIdx ]<br>    mrdu_vertex_count_delta[ tileID ][ patchIdx ]<br>    mrdu_triangle_count_delta[ tileID ][ patchIdx ]<br>    mrdu_geometry_2d_pos_x[ tileID ][ patchIdx ]<br>    mrdu_geometry_2d_pos_y[ tileID ][ patchIdx ]<br>    mrdu_geometry_2d_size_x_minus1[ tileID ][ patchIdx ]<br>    mrdu_geometry_2d_size_y_minus1[ tileID ][ patchIdx ]<br>    mrdu_3d_offset_u[ tileID ][ patchIdx ]<br>    mrdu_3d_offset_v[ tileID ][ patchIdx ]<br>    mrdu_3d_offset_d[ tileID ][ patchIdx ]<br>    for(i=0; i< asps_vmc_ext_num_attribute_video; i++){<br>       if(afps_vmc_ext_direct_attribute_projection_enabled<br>[ tileID ][ patchIdx ][ i ]){<br>          mrdu_attributes_2d_pos_x[ tileID ][ patchIdx ][ i]<br>          mrdu_attributes_2d_pos_y[ tileID ][ patchIdx ][ i ]<br>          mrdu_attributes_2d_size_x_minus1[ tileID ][ patchIdx ][ i ] | <br><br><br>u(1)<br><br>se(v)<br>se(v)<br>ue(v)<br>ue(v)<br>ue(v)<br>ue(v)<br>ue(v)<br>ue(v)<br>ue(v)<br><br><br><br>ue(v)<br>ue(v)<br>ue(v) |

-continued

| | descriptor |
|---|---|
| mrdu_attributes_2d_size_y_minus1[ tileID ][ patchIdx ][ i ] | ue(v) |
| mrdu_projection_id[ tileID ][ patchIdx ][ i ] | ue(v) |
| mrdu_orientation_index[ tileID ][ patchIdx ][ i ] | ue(v) |
|    } | |
|   } | |
| } | |

Normalization

Having discussed the de-multiplexed subbitstreams and bitstream syntax elements of the encoded bitstreams representative of 3D textured static and/or dynamic meshes, the discussion now turns to the decoder normalization processes. As mentioned above, decoder normalization processes include a mesh normalization, a geometry normalization, and an attribute normalization.

Starting first with the mesh normalization, as mentioned above, the base mesh decoded from the Mesh subbitstream 3203 de-multiplexed from the encoded bitstream may be normalized via a mesh normalization process 3210. In the mesh normalization process 3210, the outputs of the mesh subbitstreams 3203 are processed to be added to the outputs of the geometry normalization process 3212. The inputs of this process are the output meshes of the mesh subbitstreams 3203, vmc_ext_subdivision_method and vmc_ext_subdivision_iteration_count from vmesh extension in the atlas sequence parameters and patch information. The outputs are meshes and the total number of vertices in these meshes are same as the total number of displacements generated from the geometry normalization process 3212 unless the v-mesh codec specifies otherwise.

When vmc_ext_subdivision_method is 0 or (mdu_patch_subdivisionmethod_enable_flag is true and mdu_subdivision_method_index is 0), no additional process is applied to the corresponding area of the base mesh. The corresponding area of the normalized mesh is same as the area of the base mesh.

When vmc_ext_subdivision_method is not 0 or (mdu_patch_subdivisionmethod_enable_flag is true and mdu_subdivision_method_index is not 0), the corresponding area of the mesh is populated with vertices by the method indicated by vmc_ext_subdivision_method or mdu_subdivision_method_index, in a manner as described above.

Figure 33:
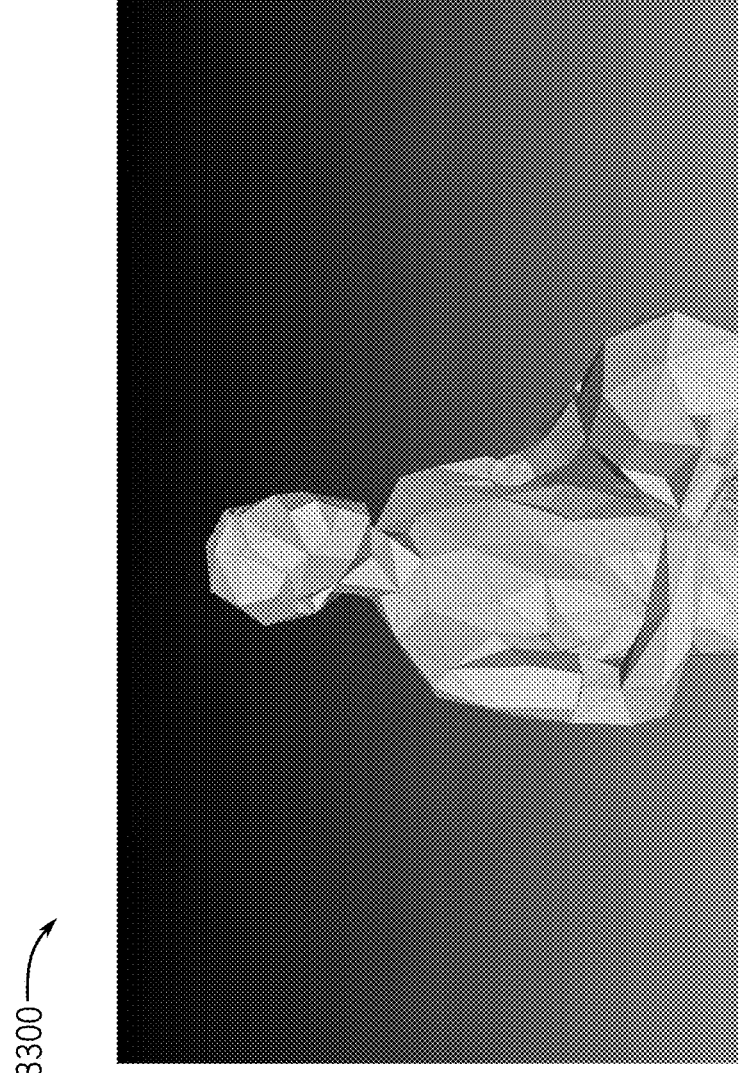
FIG. 33 illustrates an example input mesh to the mesh normalization process.
Figure 34:
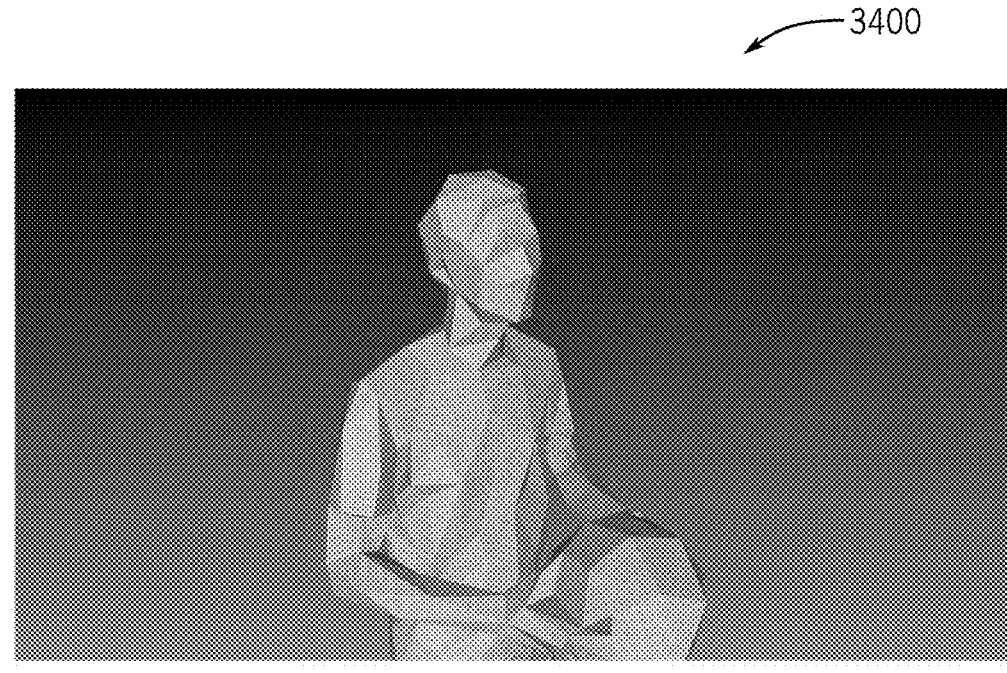
FIG. 34 illustrates an example output of the mesh normalization process.

FIGS. 33 and 34 show examples of an input and its output of this normalization process. FIG. 33 illustrates an input mesh 3300 that is provided as input to the mesh normalization process 3210.

FIG. 34 illustrates an output 3400 of the mesh normalization process 3210. As depicted in FIG. 34, the number of vertices are increased via the mesh normalization process. This results in a more refined 3D mesh, as illustrated in output 3400.

Figure 35:
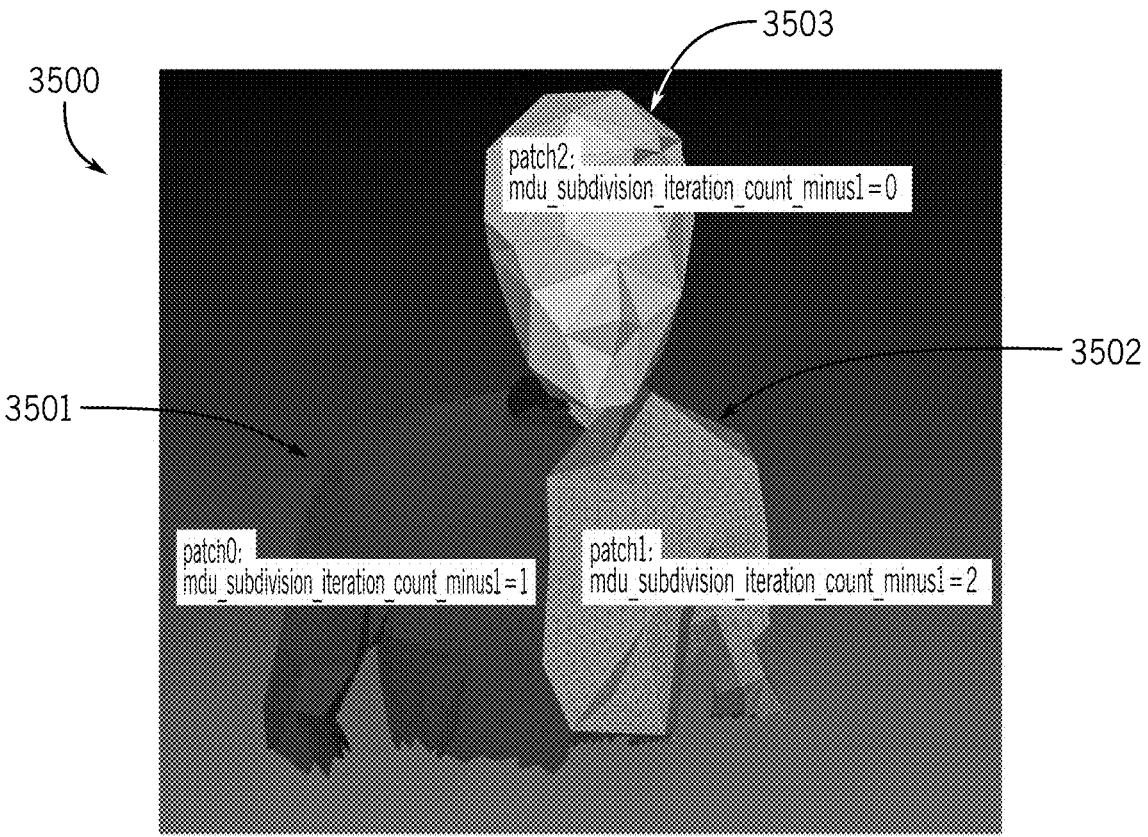
FIG. 35 illustrates an example subdivision of areas in the mesh based upon information from their corresponding patch.

Based on patch information associated with areas in the mesh, different subdivision methods may be applied. For example, FIG. 35 illustrates an example 3500 where the left part 3501, right part 3502, and head part 3503 each correspond to different patches (e.g., patch 0, patch 1, and patch 2, respectively). Each part can be subdivided differently (e.g., as the corresponding patch information indicates), resulting in a different number of vertices and, thus, refinement. For example, in example 3500, which only changes subdivision iteration counts for each of the three parts (e.g., left part 3501, right part 3502, and head part 3503), different number of vertices and refinement for different portions of the 3D mes are provided. As illustrated, patch 2 may dictate that fewer subdivision iterations are desired than with patch 0 and/or patch 1, resulting in a less-refined head part 3503 with fewer vertices. Further, patch 1 may indicate that more detailed refinement is warranted, resulting in a relatively higher number of subdivision iterations. This results in more vertices in the right part 3502, resulting in relatively more refinement in this portion of the 3D mesh.

Figure 36:
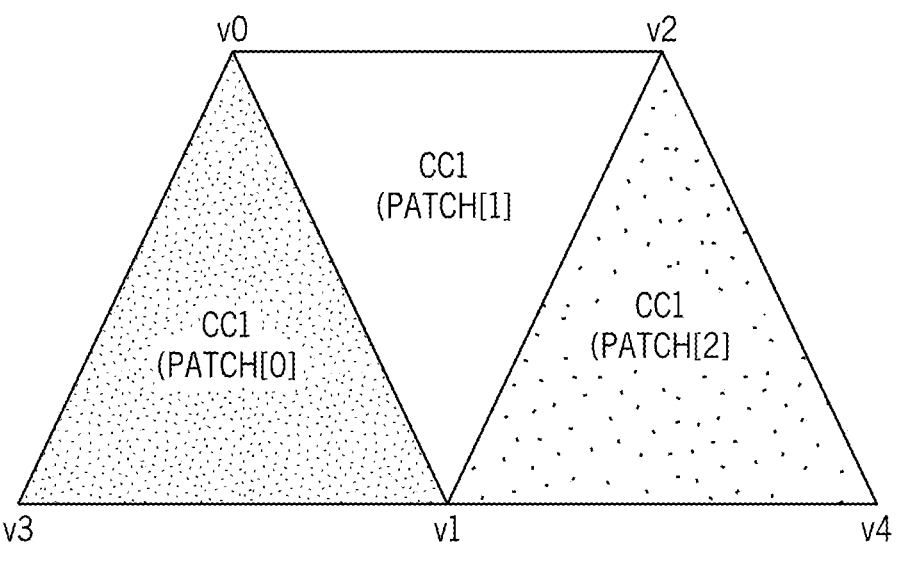
FIG. 36 illustrates an example of a simple base mesh.
Figure 37:
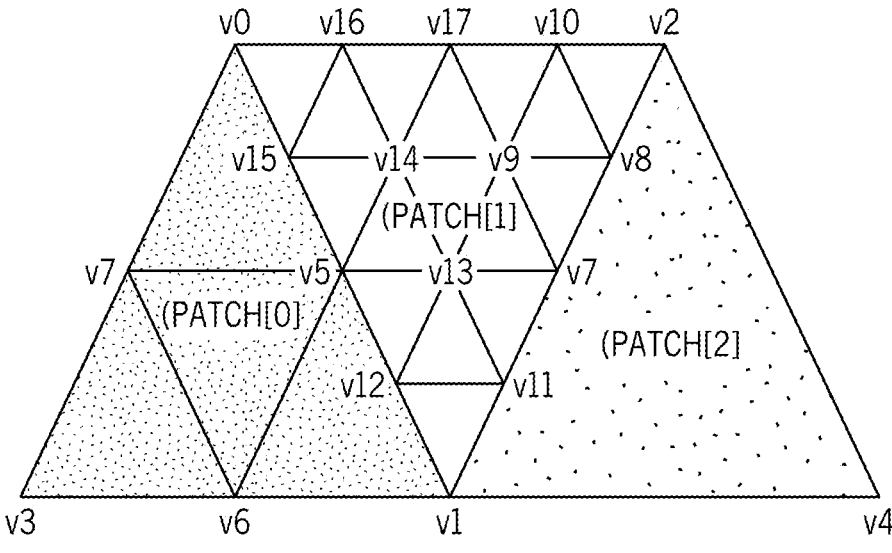
FIG. 37 illustrates an example of an interpolated mesh.

Having discussed the inputs and outputs of the mesh normalization process 3210, the discussion turns to an example of the subdivision process described herein. FIGS. 36 and 37 provide a simplified example of the current process. Starting first with FIG. 36, assuming v0, v1, and v3 are connected (cc0), v0, v1, and v2 are connected (cc1), and v2, v1, and v4 are connected(cc2). The connected components correspond to a patch, patch[0], patch[1] and patch[2], respectively.

In this example, vmc_ext_subdivision_method=1 and vmc_ext_subdivision_iteration_count=2. Further:

1) For patch[0], mdu_patch_subdivisionmethod_enable_flag is true and mdu_subdivision_method_index is 1 and mdu_subdivision_iteration_count is 1. Then, as illustrated in patch [0] of FIG. 37, the area corresponding to the patch, the triangle constructed by v0, v1 and v3, is populated with vertices by a method whose index is 1 and the iteration count will be 1. mdu_vertex_index_list is set as {v0, v1, v3, v5, v6, v7}. The order of vertex indices can be determined by subdivision method and the order of the corresponding displacement is aligned with this order.

2) For patch[1], mdu_patch_subdivisionmethod_enable_flag can be false. Therefore the subdivision method is set as vmc_ext_subdivision_method and mdu_subdivision_iteration_count is set as vmc_ext_subdivision_iteration_count. As illustrated in FIG. 37, the area corresponding to the patch, the triangle constructed by v0, v1 and v2, is populated with vertices accordingly. mdu_vertex_index_list is set as {v0, v1, v2, v5, v7, v8, v9, v10, v11, v12, v13, v14, v15, v16, v17}. The order of vertex indices can be determined by subdivision method and the order of the corresponding displacement is aligned with this order.

3) And for patch [2] mdu_patch_subdivisionmethod_enable_flag is true and mdu_subdivision_method_index is 0. Therefore, as illustrated in FIG. 37, the area corresponding to the patch, the triangle constructed by v2, v1 and v4, remains as same as the input. mdu_vertex_index_list is set as {v2, v1, v4}. The order of vertex indices can be determined by subdivision method and the order of the corresponding displacement is aligned with this order.

Thus, the mesh normalization process 3210 may result in different numbers of subdivisions and therefore a dynamically adjustable number of vertices for different patches within a mesh. In this manner, the mesh normalization process may provide significant flexibility in determining of a level of refinement associated with each patch (or subsets of patches) of a 3D mesh.

Having discussed the mesh normalization the process 3210, the discussion now turns to the geometry normalization process 3212. As mentioned above, the geometry images decoded from the Geometry subbitstream 3204, de-multiplexed from the encoded bitstream, may be normalized via a geometry normalization process 3212. In the Geometry normalization process 3212, the outputs of the geometry video subbitstreams 3204 are processed to be added to the outputs of the mesh normalization process 3210. The inputs of this process 3212 are the output geometry images of the geometry video subbitstreams 3204, vmesh extension in the atlas data subbitsstreams 3206 and patch information (e.g., from the parameter set 3202). The pixel values in the corresponding area in the geometry image can converted by the methods described in Section 1, above. The converted values, namely, displacement values, are added to corresponding vertices as indicated in the patches. If mdu_transform_index is NONE, the pixel value of n-th pixel in the area is added to the position of the vertex with n-th index in the mdu_vertex_index_list without any conversion. Otherwise, the displacement generated from n-th pixel value is added to the position of the vertex whose index is n-th index in the mdu_vertex_index_list.

Figure 38:
FIG. 38 illustrates a luma plane of a geometry image.
Figure 39:
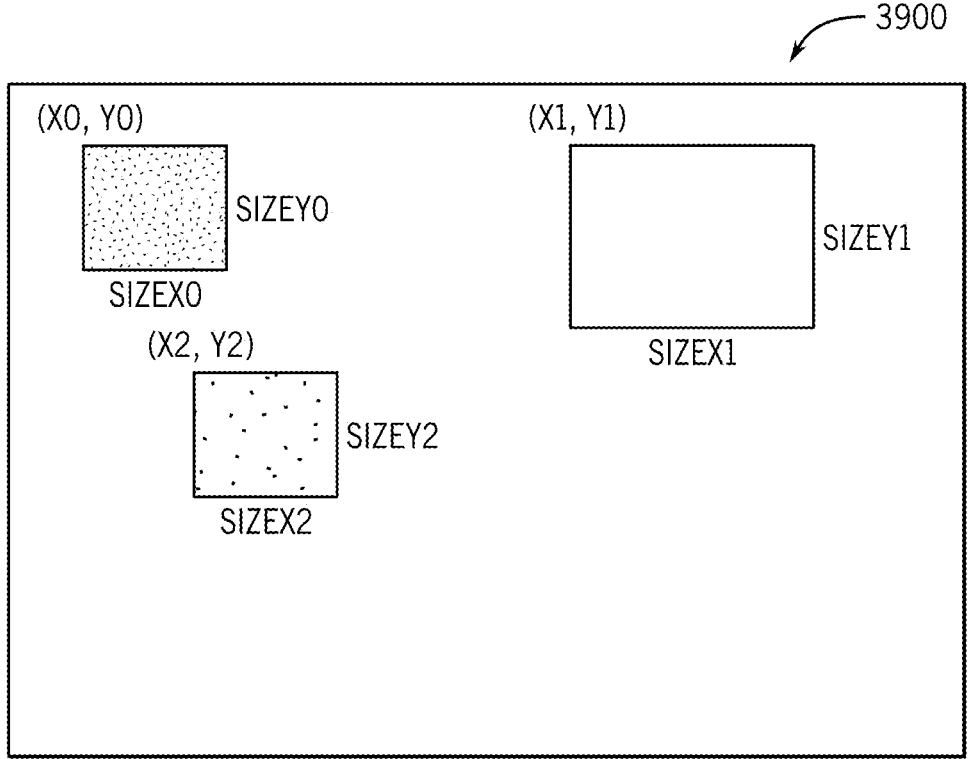
FIG. 39 illustrates an example of a geometry image.

FIG. 38 illustrates a luma plane 3800 of a geometry image and FIG. 39 illustrates an example of the geometry image. In this example the size of image is 256×48. The figure only shows one of 3 planes. The first few pixels triplets of the plane are depicted herein. Even in this case, the attribute image can be 2048×2048.

```
(512, 511, 512) (517, 512, 514) (508, 513, 512) (512, 510, 511)
(501, 511, 513) (512, 511, 512) (492, 513, 513) (503, 511, 512)
(504, 512, 511) (506, 512, 511) (505, 513, 512) (515, 510, 512)
(525, 513, 514) (508, 513, 510) (510, 512, 512)(526, 514, 512)
(511, 513, 512) (520, 510, 513) (504, 513, 512) (511, 513, 511)
(510, 514, 509) (509, 509, 513) (508, 511, 513) (517, 513, 513)
(521, 512, 511) (507, 512, 513) (521, 512, 513) (519, 511, 512)...
```

The pixel values in the geometry image corresponding to each patch (e.g., patch 0 in FIG. 38) are converted to the displacements and added to vertices in the corresponding area in the base mesh(in this example, patch 0 in FIG. 35).

Assuming, for patch[0], (mdu_geometry_2d_pos_x, mdu_geometry_2d_pos_y) is (X0, Y0) and (mdu_geometry_2d_size_x_minus1, mdu_geometry_2d_size_y_minus1) is (sizeX0-1, sizeY0-1):

1. For patch[0], I(X0,Y0), pixel value at (X0, Y0) is converted to D(X0,Y0) as described in Section 1, above. D(X0,Y0) is added to the position of vertex

[mdu_vertex_index_list [0]], vertex[v0]. And I(X0+1, Y0), pixel value at (X0+1, Y0) is converted to D(X0+1,Y0). D(X0+1,Y0) is added to the position of vertex [v1].

2. I(x,y) indicates a 3-tuple value at (x,y). It can indicate 3 numbers from 3 different planes.
3. In some embodiments, 3 values of the 3-tuple can spread over a plane. For example, I(x,y)[0]=pixel_value_y(x,y), I(x,y)[1]=pixel_value_y (x+m, y+n), I(x,y)[2]=pixel_value_y (x+k, y+l), when pixel_value_y indicates a pixel value of a certain plane such as the luma plane.
4. The generalized procedure for each patch can be as the following:
   i. pos(i) indicates the position of i-th vertex in the output mesh of the v-mesh bitstream.
   ii. mdu_vertex_count_minus1+1 indicates the total number of vertices corresponding to the current patch in the normalized mesh.
   iii. geometryVideoBlockSize indicates 1<<asps_log2_patch_packing_block_size.
   iv. patchWidthInBlocks is set as (mdu_geometry_2d_size_x_minus1+1))/geometryVideoBlockSize.

```
for(v=0; v<=mdu_vertex_count_minus1 ;v++){
    blockIndex = v / (geometryVideoBlockSize * geometryVideoBlockSize)
    xv = mdu_geometry_2d_pos_x + (blockIndex % patchWidthInBlocks) *
geometryVideoBlockSize
    yv = mdu_geometry_2d_pos_y +
(blockIndex / patchWidthInBlocks) * geometryVideoBlockSize
    D(xv,yv) = Convert(I(xv, yv))
    Pos(mdu_vertex_index_list[v]) = apply(D(xv,yv),
pos(mdu_vertex_index_list[v]))
}
```

The process of Convert(I(xv,yv)) and apply(D, pos) are described in Section 1, above.

5. If a patch is RAW_MESH, the pixel values in the area corresponding to the patch in the geometry image are directly interpreted as positions of the mesh. The process can be described as the following:
   a. patchWidthInBlocks is set as (rmdu_geometry_2d_size_x_minus1+1))/geometryVideoBlockSize
   b. and other values are set as described above.

```
for(v=0; v<= rmdu_vertex_count_minus1;v++){
    blockIndex = v / (geometryVideoBlockSize * geometryVideoBlockSize)
    xv = rmdu_geometry_2d_pos_x + (blockIndex % patchWidthInBlocks)
*
geometryVideoBlockSize
    yv = rmdu_geometry_2d_pos_y +
(blockIndex / patchWidthInBlocks) * geometryVideoBlockSize
    Pos(rmdu_head_vertex_index +v)= I(xv,yv)
}
```

6. In some embodiments, the process can be described as the following:

```
for(v=0; v<= rmdu_vertex_count_minus1;v++){
    blockIndex = v / (geometryVideoBlockSize * geometryVideoBlockSize)
    xv = rmdu_geometry_2d_pos_x + (v % (rmdu_geometry_2d_size_x_minus1 +1))
    yv = rmdu_geometry_2d_pos_y + (v / (rmdu_geometry_2d_size_x_minus1+1))
    Pos(rmdu_head_vertex_index +v)= I(xv,yv)
}
```

If a patch is RAW_MESH the pixel values in the area corresponding to the patch in the attribute image are directly interpreted as positions of the mesh. The process can be described as the following:

patchWidthInBlocks is set as (rmdu_attribute_2d_size_x_minus1+1)) geometryVideoBlockSize. And other values are described as above.

```
for(v=0; v<= rmdu_vertex_count_minus1;v++){
    blockIndex = v / (geometryVideoBlockSize * geometryVideoBlockSize)
    xv = rmdu_attribute_2d_pos_x + (blockIndex % patchWidthInBlocks) *
geometryVideoBlockSize
    yv = rmdu_attribute_2d_pos_y +
(blockIndex / patchWidthInBlocks) * geometryVideoBlockSize
    Pos(rmdu_head_vertex_index +v)= I(xv,yv)
}
```

1) In other embodiment, the process can be described as the following:

```
for(v=0; v<= rmdu_vertex_count_minus1;v++){
    blockIndex = v / (geometryVideoBlockSize * geometryVideoBlockSize)
    xv = rmdu_attribute _2d_pos_x + (v % (rmdu_ attribute
_2d_size_x_minus1+1))
    yv = rmdu_g attribute _2d_pos_y + ( v / (rmdu_attribute
_2d_size_x_minus1+1))
    Pos(rmdu_head_vertex_index +v)= I(xv,yv)
}
```

Decoding

The positions of the mesh is reconstructed by adding the i-th displacement in the area corresponding to the current patch data unit in the displacement video to the i-th vertex in the subpart associated with the current patch data unit in the resampled base mesh.

The location of the displacement(i) is counted from geometry_2d_pos_x and geometry_2d_pos_y (left top corner of the corresponding area) of the current patch.

The list of vertices is created from the triangle faces (with the same facegroup id) associated with the current patch. The non-overlapping vertex indices are saved into the list based on the order of their appearance.

To illustrate this, FIG. 40 provides an example of vertex indices in a subpart associated with a patch. Looking at the example of FIG. 40, if a patch (mesh_intra_patch_data_unit [0]) has subpart_id 0, then triangle faces with fi(facegroupId) 0 are associated with this patch, which are f 1/2/4, f 2/4/5 and f 0/1/2. As illustrated in the example of FIG. 40, in some embodiments, this correlation between triangle faces and facegroupId's may be indicated via a correlated ordering between a listing of the triangle faces and a list of associated facegroupId's. For example, in FIG. 40, the ordered list of triangle faces (e.g., f 1/2/4, f 2/4/5, f 2/5/3, and f 0/1/2) and corresponding ordered list of facegroupId's (e.g., fi 0, fi 0, fi 1, and fi0) indicate that each of f 1/2/4, f 2,/4/5, and f 0/1/2) are associated with facegroupId 0 and that triangle face f 2/5/3 is associated with facegroupId 1.

Then, the associated vertices are ordered as 1,2,4,5,0. Therefore, the first displacement is added to vertex1(x1,y1, z1) and the last displacement is added to vertex0(x0,y0,z0). For patch[1], the associated vertices are ordered as 2,5,3.

In some embodiments, the non-overlapped vertex indices are saved into the list by the order of the size. In the same example above, the associated vertices are ordered as 0,1, 2,4,5. The first displacement is added to vertex0(x0,y0,z0) and the last displacement is added to vertex5(x5,y5,z5). For patch[1], the associated vertices are ordered as 2,5,3.

When the vertices shared by two patches (v2 and v5 in the example) result in different geometry positions, they can be merged by the method indicated by asps_vmc_ext_multilocated_vertex_merge_method.

In some embodiments, the displacements for the vertices shared by multiple patches are signalled only once in the geometry image. For example, the displacements corresponding to vertex2 and 5 in patch[1] don't exist in the displacement image, therefore nothing is added to vertex2 and vertex5. The number of displacements in the area corresponding to patch0 is 5 and the number for patch1 is 1.

In some embodiments, the displacements for the vertices shared by multiple patches are ignored after the first appearance. For example, the displacements corresponding to vertex2 and 5 in patch[1] still exist in the displacement image but they are not added to the vertices. The number of displacements in the area corresponding to patch0 is 5 and the number for patch1 is 3.

In some embodiments, the displacement that is added to the i-th vertex in the segment indicated by the current patch data unit is determined by the geometry positions in the tile associated with the current patch data unit. The location of the displacement(i) is counted from ath_geometry_2d_pos_x and ath_geometry_2d_pos_y in the atlas tile header.

The list of vertices is created from the triangle faces (with the same facegroup id) associated with the current patch. The non-overlapping vertex indices are saved into the list based on the order of their appearance. In the example of FIG. 40, the associated vertices are ordered as 1,2,4,5,0,3. Then, the first displacement (at ath_geometry_2d_pos_x, ath_geometry_2d_pos_y) is added to vertex1(x1,y1,z1) and the last displacement is added to vertex3(x3,y3,z3). In some embodiments, the non-overlapped vertex indices are saved into a list by the order of their size.

References for the preceding section relating to V-Mesh Bitstream Structure Including Syntax Elements and Decoding Process with Reconstruction, each of which is incorporated by reference in its entirety:

[E1] ISO/IEC 23090-5 ISO/IEC Information technology—Coded Representation of Immersive Media—Part 5: Visual Volumetric Video-based Coding (V3C) and Video-based Point Cloud Compression (V-PCC)

[E2] K. Mammou, J. Kim, A. Tourapis, D. Podborski, K. Kolarov, "[V-CG] Apple's Dynamic Mesh Coding CP Response," ISO/IEC JTC1/SC29/WG7/m59281, Online, April 2022.

[E3] A. Tourapis, J. Kim, D. Podborski, K. Mammou, "Base mesh data substream format for VDMC," ISO/IEC JTC1/SC29/WG7/m60362, Online, July 2022.

Section 6: Adaptive Tessellation for Efficient Dynamic Mesh Encoding, Decoding, Processing, and Rendering As described above, a static/dynamic mesh can be represented as a set of 3D Meshes M(0), M(1), M(2), . . . , M(n). Each mesh M(i) can be defined by be a connectivity C(i), a geometry G(i), texture coordinates T(i), and a texture connectivity CT(i). Each mesh M(i) can be associated with one or more 2D images A(i, 0), A(i, 1) . . . , A(i, D−1), called also attribute maps, describing a set of attributes associated with the mesh surface. An example of attribute would be texture information (see FIGS. 2-3). A set of vertex attributes could also be associated with the vertices of the mesh such as colors, normal, transparency, etc.

While geometry and attribute information could again be mapped to 2D images and efficiently compressed by using video encoding technologies, connectivity information cannot be encoded efficiently by using a similar scheme. Dedicated coding solutions optimized for such information are needed. In the next sections we present an efficient framework for static/dynamic mesh compression.

FIGS. 4 and 5 show a high-level block diagram of the proposed encoding and decoding processes, respectively. Note that the feedback loop during the encoding process makes it possible for the encoder to guide the pre-processing step and changes its parameters to achieve the best possible compromise according to various criteria, including but not limited to:

Rate-distortion,

Encode/decode complexity,

Random access,

Reconstruction complexity,

Terminal capabilities,

Encode/decode power consumption, and/or

Network bandwidth and latency.

On the decoder side, an application consuming the content could provide feedback to guide both the decoding and the post-processing blocks. As but one example, based on the position of the dynamic mesh with respect to a camera frustum, the decoder and the post processing block may adaptively adjust the resolution/accuracy of the produced mesh and/or its associated attribute maps.

Post-Processing

Additional post-processing modules could also be applied to improve the visual/objective quality of the decoded meshes and attribute maps and/or adapt the resolution/ quality of the decoded meshes and attribute maps to the viewing point or terminal capabilities. One example of such post processing includes adaptive tessellation, as described in References [EA], [EB], [EC], [ED].

The dynamic mesh compression scheme described in Section 1 teaches, among other things, a subdivision structure to achieve high rate distortion compression performance. While optimization and control of compression performance can help enable a wide variety of applications (e.g., augmented reality/virtual reality (AR/VR), 3D mapping, autonomous driving, etc.), other functionalities, such as scalable decoding and rendering, can also be useful to allow for a wide deployment through various networks (e.g., with different bandwidth and latency properties and constraints) as well as on various platforms (e.g., with different processing/rendering capabilities and power constraints). Described below is an adaptive tessellation scheme that can adapts the resolution of a dynamic mesh (e.g., number of vertices/faces, resolution of the attribute maps, etc.) to adapt to network conditions and/or the capabilities and constraints of a consuming device/platform.

Adaptive Tessellation as Post-Processing

FIG. 5, discussed above, shows the interactions between: (1) the adaptive tessellation post-processor module 503, (2) the decoder 502, and (3) application modules 501. More specifically, the adaptive tessellation module 503 can take as inputs:

Metadata metadata(i) describing various information about the mesh structure. For example, this could include patch/patch group information, subdivision scheme, subdivision iteration count, bounding box, tiles, etc.;

A decoded base mesh m'(i), which may (but need not) have per vertex/face/edge attributes describing saliency and importance/priority information;

A set of displacements d'(i) associated with the subdivided mesh vertices; and

Optionally, one or multiple attribute maps A'(i) describing information associated with the mesh surface.

These inputs may be computed or otherwise determined as described above.

The application module 501 can provide control parameters to guide both the decoding module 502 and the adaptive tessellation module 503. Such control parameters could include:

Current and/or future (potentially predicted) 3D camera position and viewing frustum;

Available processing and rendering capabilities, such as capabilities of the Application and/or the device on which it runs;

Power consumption constraints of the Application and/or the device on which it runs; and Region of Interest (ROI) information that identifies one or more portions of the mesh as regions of interest where more detail may be desired as compared to other regions of the mesh.

Figure 41:
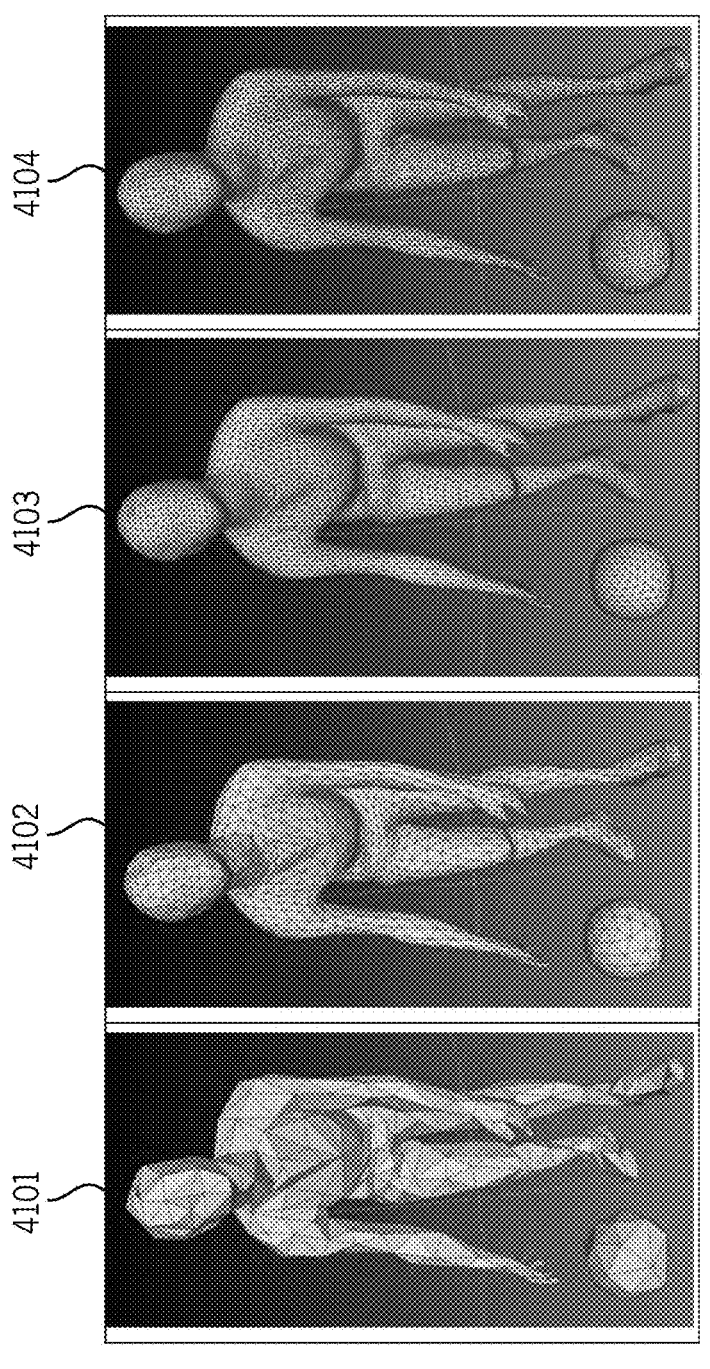
FIG. 41 illustrates adjusting global mesh resolution through varying subdivision iteration count.

The tessellation module 503 can take advantage of the subdivision structure described above, together with information provided by the decoder 502 and/or the application 501 to generate the mesh M"(i) to be used for rendering or for processing by the application 501. (One example of processing by the application 501 could include collision detection, although any of a variety of operations on the mesh M"(i) are contemplated.) Exemplary strategies to take advantage of the subdivision structure can include adjusting global mesh resolution through varying the subdivision iteration count (see FIG. 41). For example, the adaptive tessellation module 503 may produce the base mesh 4201 if the model is far away from the camera or if the terminal has limited rendering capability. The adaptive tessellation module 503 could then progressively switch to higher resolutions meshes such as 4102, 4103, and 4104 as the object approaches the camera. These higher resolution meshes 4102-4104 correspond to subdivision iteration performed on the base mesh. As an example, mesh 4102 can correspond to one subdivision of base mesh 4101. Mesh 4103 can correspond to a further subdivision of mesh 4102, i.e., two subdivisions of base mesh 4101. Mesh 4104 can correspond to a further subdivision of mesh 4103, i.e., three subdivisions of base mesh 4101.

An alternative strategy to take advantage of the subdivision structure can include locally adjusting the mesh resolution in certain areas based on various criteria. Various approaches to localized mesh adjustment are possible, including those described in References [E1], [E2], [E3], [E4], [E5], [E6], [E7], [E8], [E9]. An example of a localized mesh resolution that is simple and efficient solution could proceed as follows:

Analyze the local properties of the mesh such as:

Displacements associated with vertices of the mesh;

Explicitly encoded attributes associated with the base mesh or the subdivided mesh describing saliency and importance/priority information;

Implicitly derived saliency and importance/priority information obtained by analyzing the mesh and attribute information. Examples could include surface curvature, gradient of vertex attributes or attribute maps, edge length, etc.;

Based on the analyzed local properties, determine for each edge of the mesh whether that should be subdivided it or not. For example, if the displacements associated with the vertices of an edge are lower than a user-defined or automatically-derived threshold, one might decide not to subdivide the edge. Otherwise, (if there are relatively larger displacements associated with the edge/vertices) one might decide to subdivide it;

For each triangle (or other polygon), based on the number of edges to be subdivided, apply a subdivision scheme. An exemplary subdivision scheme (for triangles) is illustrated in FIG. 42.

Repeat the above steps N times, with N being the number of subdivision iteration count to generate the final output mesh.

Figure 42:
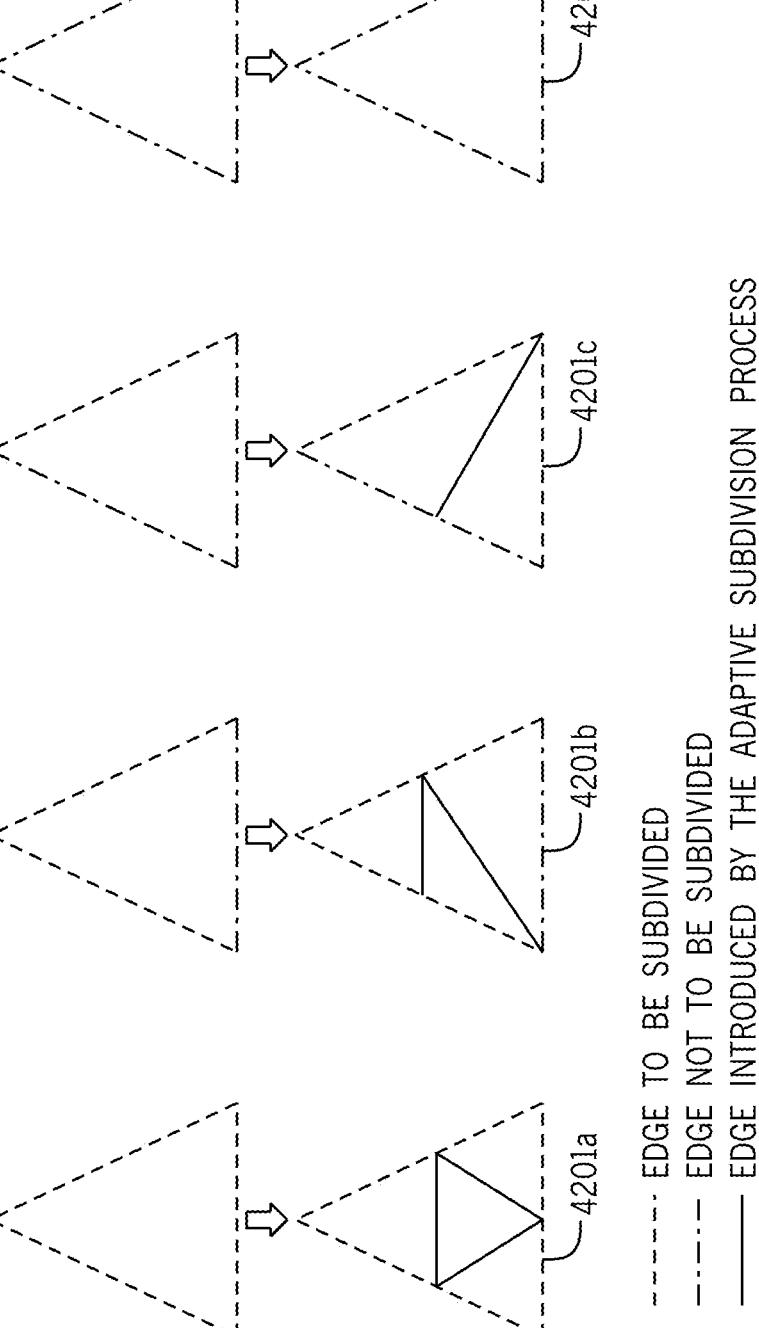
FIG. 42 illustrates rules for adaptively subdividing a triangle.

FIG. 42 (cf. FIG. 11) illustrates a technique for subdividing a triangle based on the number of edges determined to be subdivided based on the algorithm described above. In 4201a, each edge is to be subdivided, resulting in the triangle being split into four triangles as shown. In (b), two edges of the triangle are to be subdivided (the edges other than the base), resulting in the triangle being split into three triangles as shown. In (c) only one edge is to be subdivided, resulting in the triangle being split into two triangles as shown. In (d), no edges are to be subdivided, meaning the original triangle is preserved. This is just one possible approach, and other subdivision approaches could be applied, for example in the case of higher order polygons, etc.

Adaptive Tessellation for Progressive/Scalable Encoding

Adaptive tessellation could also be achieved during the pre-processing and encoding stages by adaptively adjusting the subdivision scheme based on various criteria. Such criteria could include:

Available processing on both the encoder and decoder side. In general, if more processing is available, more detailed meshes (e.g., meshes with more vertices, edges, higher resolution attribute maps, etc.) may be provided and vice versa.

Rendering capabilities of the consuming terminal(s). Relatedly, if the consuming terminal(s) have limited rendering capabilities, less detailed meshes (e.g., meshes with fewer vertices, edges, lower resolution attribute maps, etc.) may be provided and vice versa. In some cases, the scalable nature of the encoding process may allow for different layers of mesh information to be provided, with more capable terminals consuming multiple layers to provide higher levels of detail and less capable terminals consuming fewer layers, or even just a base layer, to provide lower levels of detail.

Power consumption constraints on the encoder and decoder sides. Like processing capability, power consumption limits (such as battery powered mobile devices) may serve to limit the ability of a consuming device to process, render, and/or display higher resolution meshes, even if the computational resources would otherwise be available. In such cases, the tessellation may be tailored to the power consumption constraints, which may be thought of as acting as a constraint on computational limits of a consuming device or devices.

Region of Interest (ROI) information. As described above, for some applications certain region of a mesh may be more important than others. As one example the facial region of a mesh representing a person may be of more interest than a body region. In such cases, region of interest may be taken into account to guide the subdivision on the pre-processor/encoder side. Region of interest may either be given explicitly by the consuming application or may be inferred implicitly from information about the meshes.

Saliency and importance/priority information provided by the user or obtained by analyzing the mesh and attribute data (such as, surface curvature, gradient of the vertex attributes or attribute maps, edge length). Like ROI information, other forms of saliency and importance/priority information may be used to inform the encoder/pre-processor side tessellation process.

For any combination of the foregoing, behavior of the subdivision scheme could be adjusted in the same manner as described above with respect to decoder/post-processor side tessellation. In the encoder/pre-processor side case, displacement and vertex attribute information can be encoded based on the adaptively subdivided mesh.

In some embodiments, the decimation stage described in Section 2 could be updated to consider the criteria described above while generating the base mesh. For instance, a higher resolution could be generated in a ROI provided by the user or by analyzing the attribute map information associated with the region.

References for the preceding section relating to Adaptive Tessellation for Efficient Dynamic Mesh Encoding, Decoding, Processing, and Rendering, each of which is incorporated by reference in its entirety:

[FA] https://developer.nvidia.com/gpugems/gpugems2/part-i-geometric-complexity/chapter-7-adaptive-tessellation-subdivision-surfaces

[FB] https://niessnerlab.org/papers/2015/0dynamic/schaefer2015dynamic.pdf

[FC] https://giv.cpsc.ucalgary.ca/publication/c5/

[FD] https://projet.liris.cnrs.fr/imagine/pub/proceedings/ICME-2007/pdfs/0000468.pdf

[F1] https://www.researchgate.net/publication/221434740_Incremental_Adaptive_Loop_Subdivision

[F2] https://www.researchgate.net/publication/2554610_Adaptive_Subdivision_Schemes_for_Triangular_Meshes/link/546e58c30cf2b5fc176074c3/download

[F3] http://diglib.eg.org/bitstream/handle/10.2312/osg20031418/05settgast.pdf

[F4] http://www.graphics.stanford.edu/~niessner/brainerd2016efficient.html

[F5] https://www.researchgate.net/publication/220954613_Near-Optimum_Adaptive_Tessellation_of_General_Catmull-Clark_Subdivision_Surfaces/link/00b7d53ae32d0c726a000000/download

[F6] https://www.cs.cmu.edu/afs/cs/academic/class/15869-f11/www/readings/fisher09_diagsplit.pdf

[F6] http://www.graphics.stanford.edu/~niessner/papers/2015/0dynamic/schaefer2015dynamic.pdf

[F7] https://www.cise.ufl.edu/research/SurfLab/papers/05adapsub.pdf

[F8] https://anjulpatney.com/docs/papers/2009_Patney_PVT.pdf

[F9] http://research.michael-schwarz.com/publ/files/cuda-tess-eg09.pdf

CONCLUSION

The foregoing describes exemplary embodiments of mesh encoders and decoders employing video/image encoders/decoders for displacements and attributes. Although numerous specific features and various embodiments have been described, it is to be understood that, unless otherwise noted as being mutually exclusive, the various features and embodiments may be combined various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

Figure 43:
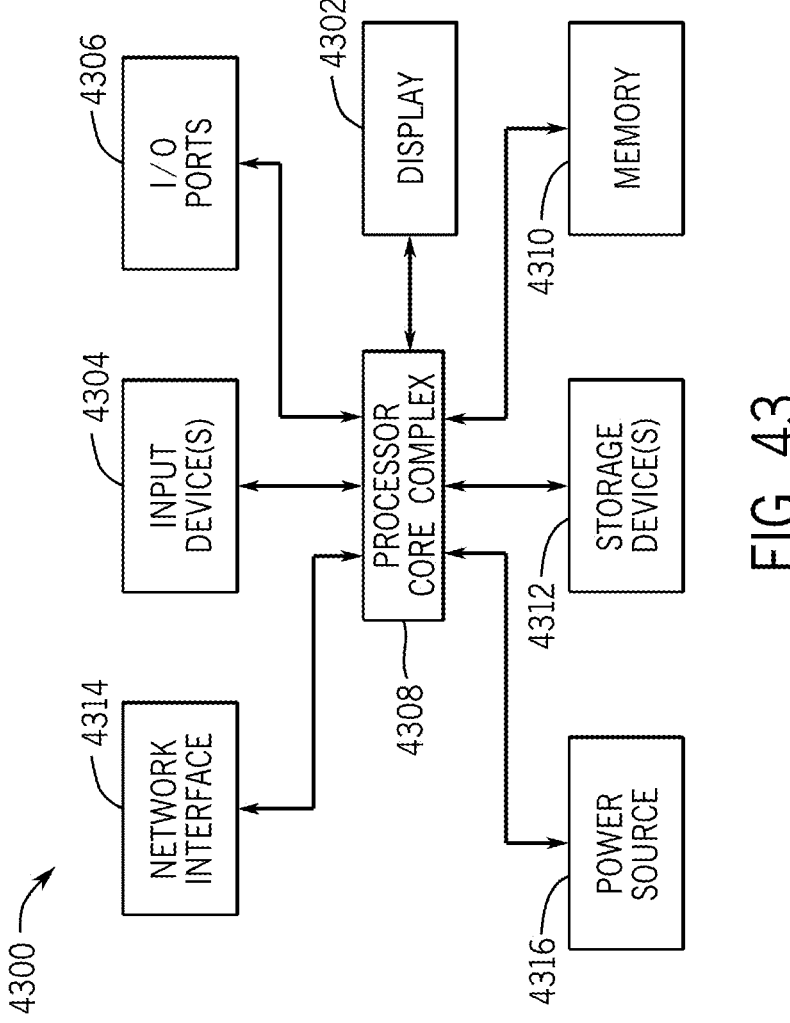
FIG. 43 illustrates an embodiment of a system for implementing video dynamic mesh coding (v-DMC).

With the preceding in mind and to help illustrate machines that may be used to implement the processes described herein, an electronic device 4300 including an electronic display 4302 is shown in FIG. 43. As is described in more detail below, the electronic device 4300 may be any suitable electronic device, such as a computer, a mobile phone, a portable media device, a tablet, a television, a virtual-reality headset, a vehicle dashboard, and the like. Thus, it should be noted that FIG. 43 is merely one example of a particular implementation and is intended to illustrate the types of components that may be present in an electronic device 4300.

The electronic device 4300 includes the electronic display 4302, one or more input devices 4304, one or more input/output (I/O) ports 4306, a processor core complex 4308 having one or more processing circuitry(s) or processing circuitry cores, local memory 4310, a main memory storage device 4312, a network interface 4314, and a power source 4316 (e.g., power supply). The various components described in FIG. 43 may include hardware elements (e.g., circuitry), software elements (e.g., a tangible, non-transitory computer-readable medium storing executable instructions), or a combination of both hardware and software elements. It should be noted that the various depicted components may be combined into fewer components or separated into additional components. For example, the local memory 4310 and the main memory storage device 22 may be included in a single component.

The processor core complex 4308 is operably coupled with local memory 4310 and the main memory storage device 4312. Thus, the processor core complex 4308 may execute instructions stored in local memory 4310 or the main memory storage device 4312 to perform operations, such as generating or transmitting image data to display on the electronic display 4302. As such, the processor core complex 4308 may include one or more general purpose microprocessors, one or more application specific integrated circuits (ASICs), one or more field programmable logic arrays (FPGAs), or any combination thereof.

In addition to program instructions, the local memory 4310 or the main memory storage device 4312 may store data to be processed by the processor core complex 4308. Thus, the local memory 4310 and/or the main memory storage device 4312 may include one or more tangible, non-transitory, computer-readable media. For example, the local memory 4310 may include random access memory (RAM) and the main memory storage device 4312 may include read-only memory (ROM), rewritable non-volatile memory such as flash memory, hard drives, optical discs, or the like.

The network interface 4314 may communicate data with another electronic device or a network. For example, the network interface 4314 (e.g., a radio frequency system) may enable the electronic device 4300 to communicatively couple to a personal area network (PAN), such as a Bluetooth network, a local area network (LAN), such as an 802.11x Wi-Fi network, or a wide area network (WAN), such as a 4G, Long-Term Evolution (LTE), or 5G cellular network. The power source 4316 may provide electrical power to one or more components in the electronic device 4300, such as the processor core complex 4308 or the electronic display 4302. Thus, the power source 4316 may include any suitable source of energy, such as a rechargeable lithium polymer (Li-poly) battery or an alternating current (AC) power converter. The I/O ports 4306 may enable the electronic device 4300 to interface with other electronic devices. For example, when a portable storage device is connected, the I/O port 4306 may enable the processor core complex 4308 to communicate data with the portable storage device.

The input devices 4304 may enable user interaction with the electronic device 4300, for example, by receiving user inputs via a button, a keyboard, a mouse, a trackpad, or the like. The input device 4304 may include touch-sensing components in the electronic display 4302. The touch sensing components may receive user inputs by detecting occurrence or position of an object touching the surface of the electronic display 4302.

In some embodiments, pixel or image data may be generated by an image source, such as the processor core complex 4308, a graphics processing unit (GPU), or an image sensor. Additionally, in some embodiments, image data may be received from another electronic device 4300, for example, via the network interface 4314 and/or an I/O port 4306. Similarly, the electronic display 4302 may display frames based on pixel or image data generated by the processor core complex 4308, or the electronic display 4302 may display frames based on pixel or image data received via the network interface 4314, an input device, or an I/O port 4306.

Entities implementing the present technology should take care to ensure that, to the extent any sensitive information is used in particular implementations, that well-established privacy policies and/or privacy practices are complied with. In particular, such entities would be expected to implement and consistently apply privacy practices that are generally recognized as meeting or exceeding industry or governmental requirements for maintaining the privacy of users. Implementers should inform users where personally identifiable information is expected to be transmitted, and allow users to "opt in" or "opt out" of participation.

Risk can be minimized by limiting the collection of data and deleting data once it is no longer needed. In addition, and when applicable, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy. Robust encryption may also be utilized to reduce the likelihood that communication between inductively coupled devices are spoofed.

The invention claimed is:

1. A method of encoding motion data associated with an input data corresponding to a set of 3D meshes M(i), the motion data including at least one of geometry and vertex attribute changes from one frame to another, the method comprising:

dividing input mesh M(i) into a set of patches P(i, j), each patch P(i, j) corresponding to a corresponding patch P(k, l) in a previously encoded reference frame;

quantizing at least one of vertices and attributes of each patch P(i, j);

predicting residuals based on a difference between the quantized vertices or attributes of each patch P(i, j) with respect to a corresponding patch P(k, l) in the previously encoded reference frame; and entropy encoding the predicted residuals;

wherein the input data is time consistent so that P(i, j) and P(k, l) have the same connectivity.

2. The method of claim 1, wherein quantizing at least one of the vertices and attributes of each patch P(i, j) further comprises applying uniform quantization to all vertices or attributes.

3. The method of claim 1, wherein quantizing at least one of the vertices and attributes of each patch P(i, j) further comprises applying adaptive quantization that changes a quantization level based on at least one of user input or analysis of mesh M(i).

4. The method of claim 1, wherein predicting the residuals based on a difference between quantized vertices or attributes of each patch P(i, j) with respect to corresponding patch P(k, l) in the previously encoded reference frame comprises making at least one of spatial and temporal predictions.

5. The method of claim 1, wherein predicting the residuals based on the difference between quantized vertices or attributes of each patch P(i, j) with respect to the corresponding patch P(k, l) in the previously encoded reference frame comprises using a delta temporal predictor.

6. The method of claim 1, wherein predicting the residuals based on the difference between quantized vertices or attributes of each patch P(i, j) with respect to the corresponding patch P(k, l) in the previously encoded reference frame comprises using an average spatial predictor.

7. The method of claim 1, wherein predicting the residuals based on the difference between quantized vertices or attributes of each patch P(i, j) with respect to the corresponding patch P(k, l) in the previously encoded reference frame comprises using an average predictor using temporal and spatial information.

8. The method of claim 1, wherein predicting the residuals based on the difference between quantized vertices or attributes of each patch P(i, j) with respect to the corresponding patch P(k, l) in the previously encoded reference frame comprises using a spatial-temporal parallelogram predictor.

9. The method of claim 1, wherein predicting the residuals based on the difference between quantized vertices or attributes of each patch P(i, j) with respect to the corresponding patch P(k, l) in the previously encoded reference frame comprises using a spatial parallelogram predictor.

10. The method of claim 1, wherein predicting the residuals based on the difference between quantized vertices or attributes of each patch P(i, j) with respect to the corresponding patch P(k, l) in the previously encoded reference frame comprises using geometry-guided predictors.

11. The method of claim 1, wherein entropy encoding the predicted residuals comprises using an entropy coder that is a context adaptive binary arithmetic conder (CABAC).

12. The method of claim 11, further comprising employing a CABAC encoder together with Exponential Golomb codes to compress both predictor index and prediction residuals.

13. A method of encoding motion data associated with an input data corresponding to set of 3D meshes M(i), the motion data including at least one of geometry and vertex attribute changes from one frame to another, the method comprising:

dividing input mesh M(i) into a set of patches P(i, j), each patch P(i, j) corresponding to a corresponding patch P(k, l) in a previously encoded reference frame;

quantizing at least one of vertices and attributes of each patch P(i, j);

predicting residuals based on a difference between quantized vertices or attributes of each patch P(i, j) with respect to corresponding patch P(k, l) in the previously encoded reference frame; and entropy encoding the predicted residuals;

wherein predicting the residuals based on the difference between the quantized vertices or attributes of each patch P(i, j) with respect to the corresponding patch P(k, l) in the previously encoded reference frame comprises comparing the residuals using two or more predictors and selecting the residuals based on rate distortion performance of the two or more predictors.

14. The method of claim 13, wherein the two or more predictors are selected from the group consisting of:

a delta temporal predictor;

a average spatial predictor;

an average predictor using temporal and spatial information;

a spatial parallelogram predictor;

a spatial-temporal parallelogram predictor; or geometry-guided predictors.

15. A method of encoding motion data associated with an input data corresponding to set of 3D meshes M(i), the motion data including at least one of geometry and vertex attribute changes from one frame to another, the method comprising:

dividing input mesh M(i) into a set of patches P(i, j), each patch P(i, j) corresponding to a corresponding patch P(k, l) in a previously encoded reference frame;

quantizing at least one of the vertices and attributes of each patch P(i, j);

predicting residuals based on a difference between quantized vertices or attributes of each patch P(i, j) with respect to the corresponding patch P(k, l) in the previously encoded reference frame; and entropy encoding the predicted residuals;

wherein if the input data is not time consistent, the method further comprises preprocessing the input data by applying a time consistent remeshing process so that P(i, j) and P(k, l) have the same connectivity.

16. The method of claim 15, wherein quantizing at least one of the vertices and attributes of each patch P(i, j) further comprises applying uniform quantization to all vertices or attributes.

17. The method of claim 15, wherein quantizing at least one of the vertices and attributes of each patch P(i, j) further comprises applying adaptive quantization that changes a quantization level based on at least one of user input or analysis of mesh M(i).

18. The method of claim 15, wherein predicting the residuals based on the difference between the quantized vertices or attributes of each patch P(i, j) with respect to the corresponding patch P(k, l) in the previously encoded reference frame comprises making at least one of the spatial and temporal predictions.

19. The method of claim 15, wherein predicting the residuals based on the difference between quantized vertices or attributes of each patch P(i, j) with respect to the corresponding patch P(k, l) in the previously encoded reference frame comprises using a delta temporal predictor.

20. The method of claim 15, wherein predicting the residuals based on the difference between quantized vertices or attributes of each patch P(i, j) with respect to the corresponding patch P(k, l) in the previously encoded reference frame comprises using an average spatial predictor.

21. The method of claim 15, wherein predicting the residuals based on the difference between quantized vertices or attributes of each patch P(i, j) with respect to the corresponding patch P(k, l) in the previously encoded reference frame comprises using an average predictor using temporal and spatial information.

22. The method of claim 15, wherein predicting the residuals based on the difference between quantized vertices or attributes of each patch P(i, j) with respect to the corresponding patch P(k, l) in the previously encoded reference frame comprises using a spatial-temporal parallelogram predictor.

23. The method of claim 15, wherein predicting the residuals based on the difference between quantized vertices or attributes of each patch P(i, j) with respect to the corresponding patch P(k, l) in the previously encoded reference frame comprises using a spatial parallelogram predictor.

24. The method of claim 15, wherein predicting the residuals based on the difference between quantized vertices or attributes of each patch P(i, j) with respect to the corresponding patch P(k, l) in the previously encoded reference frame comprises using geometry-guided predictors.

25. The method of claim 15, wherein entropy encoding the predicted residuals comprises using an entropy coder that is a context adaptive binary arithmetic coder (CABAC).

26. The method of claim 25, further comprising employing a CABAC encoder together with Exponential Golomb codes to compress both predictor index and prediction residuals.

* * * * *